(12) United States Patent
Wysong

(10) Patent No.: US 11,987,685 B2
(45) Date of Patent: May 21, 2024

(54) INSULATION PERFORMANCE FOAMS

(71) Applicant: THE CHEMOURS COMPANY FC, LLC, Wilmington, DE (US)

(72) Inventor: Ernest Byron Wysong, Chadds Ford, PA (US)

(73) Assignee: THE CHEMOURS COMPANY FC, LLC, Wilmington, DE (US)

( * ) Notice: Subject to any disclaimer, the term of this patent is extended or adjusted under 35 U.S.C. 154(b) by 0 days.

(21) Appl. No.: 17/052,633

(22) PCT Filed: May 3, 2019

(86) PCT No.: PCT/US2019/030517
§ 371 (c)(1),
(2) Date: Nov. 3, 2020

(87) PCT Pub. No.: WO2019/213463
PCT Pub. Date: Nov. 7, 2019

(65) Prior Publication Data
US 2021/0238378 A1 Aug. 5, 2021

Related U.S. Application Data

(60) Provisional application No. 62/667,192, filed on May 4, 2018.

(51) Int. Cl.
| | |
|---|---|
| *C08G 18/42* | (2006.01) |
| *C08J 9/00* | (2006.01) |
| *C08J 9/14* | (2006.01) |
| *C08K 5/00* | (2006.01) |
| *C08K 5/521* | (2006.01) |

(52) U.S. Cl.
CPC ............ *C08J 9/146* (2013.01); *C08G 18/42* (2013.01); *C08J 9/0038* (2013.01); *C08J 9/141* (2013.01); *C08J 9/149* (2013.01); *C08K 5/0066* (2013.01); *C08J 2203/14* (2013.01); *C08J 2203/162* (2013.01); *C08J 2203/182* (2013.01); *C08J 2205/052* (2013.01); *C08J 2207/04* (2013.01); *C08J 2375/06* (2013.01)

(58) Field of Classification Search
None
See application file for complete search history.

(56) References Cited

U.S. PATENT DOCUMENTS

| | | | |
|---|---|---|---|
| 8,658,708 B2 * | 2/2014 | Loh ................... | C08G 18/7664 |
| | | | 521/131 |
| 2010/0078585 A1 * | 4/2010 | Robin .................... | C09K 5/045 |
| | | | 252/2 |
| 2010/0102272 A1 | 4/2010 | Basu et al. | |
| 2010/0105788 A1 | 4/2010 | Chen | |
| 2010/0163776 A1 * | 7/2010 | Robin .................. | C11D 7/5054 |
| | | | 252/2 |
| 2011/0144216 A1 * | 6/2011 | Hulse ................. | C08G 18/4018 |
| | | | 514/757 |
| 2011/0303867 A1 | 12/2011 | Ling et al. | |
| 2015/0210798 A1 * | 7/2015 | Ling .................. | C08G 18/4018 |
| | | | 521/131 |
| 2015/0210818 A1 * | 7/2015 | Loh .......................... | C08J 9/146 |
| | | | 521/172 |
| 2016/0009847 A1 | 1/2016 | Van Der Puy | |
| 2016/0200889 A1 * | 7/2016 | Parenti ............... | C08G 18/6688 |
| | | | 521/131 |
| 2016/0326330 A1 | 11/2016 | Schuette | |
| 2017/0009037 A1 | 1/2017 | Hamajima | |
| 2017/0158834 A1 * | 6/2017 | Williams .............. | F25D 23/064 |
| 2017/0313806 A1 | 11/2017 | Yu et al. | |
| 2017/0355893 A1 | 12/2017 | Ling et al. | |
| 2017/0369630 A1 * | 12/2017 | Ling ...................... | C08G 18/71 |
| 2018/0030232 A1 * | 2/2018 | Kurita ................ | C08G 18/2063 |
| 2018/0134861 A1 * | 5/2018 | Schilling ................ | C08G 18/482 |
| 2018/0230283 A1 * | 8/2018 | Ihara ..................... | C08J 9/146 |
| 2018/0264303 A1 * | 9/2018 | Robin ...................... | C08J 9/146 |
| 2019/0248976 A1 * | 8/2019 | Mukaiyama ............ | C08J 9/149 |
| 2019/0256679 A1 * | 8/2019 | Wysong .................. | C08J 9/145 |

FOREIGN PATENT DOCUMENTS

| | | | |
|---|---|---|---|
| CN | 107266699 A | 10/2017 | |
| EP | 3202464 A2 | 8/2017 | |
| WO | 2009/085857 A2 | 7/2009 | |
| WO | 2012/115936 A2 | 8/2012 | |
| WO | WO-2013081809 A1 * | 6/2013 | ......... C08G 18/4825 |
| WO | WO-2014137969 A1 * | 9/2014 | ......... C08G 18/1808 |
| WO | 2018/093709 A | 5/2018 | |

OTHER PUBLICATIONS

PCT International Search Report and Written Opinion dated Aug. 30, 2019.

* cited by examiner

*Primary Examiner* — Melissa A Rioja

(57) ABSTRACT

The present application provides foams having improved insulation and thermal performance and processes of forming said foams. Exemplary foams described herein are prepared according to a process comprising reacting or extruding a foamable composition comprising (i) a compound selected from E-CHCl=CHCF$_3$, Z-CF$_3$CH=CHCF$_3$, and E-CF$_3$CH=CHCF$_3$, or any mixture thereof, and (2) a C$_5$ hydrocarbon (e.g. cyclopentane), under conditions effective to form the foam.

19 Claims, 37 Drawing Sheets

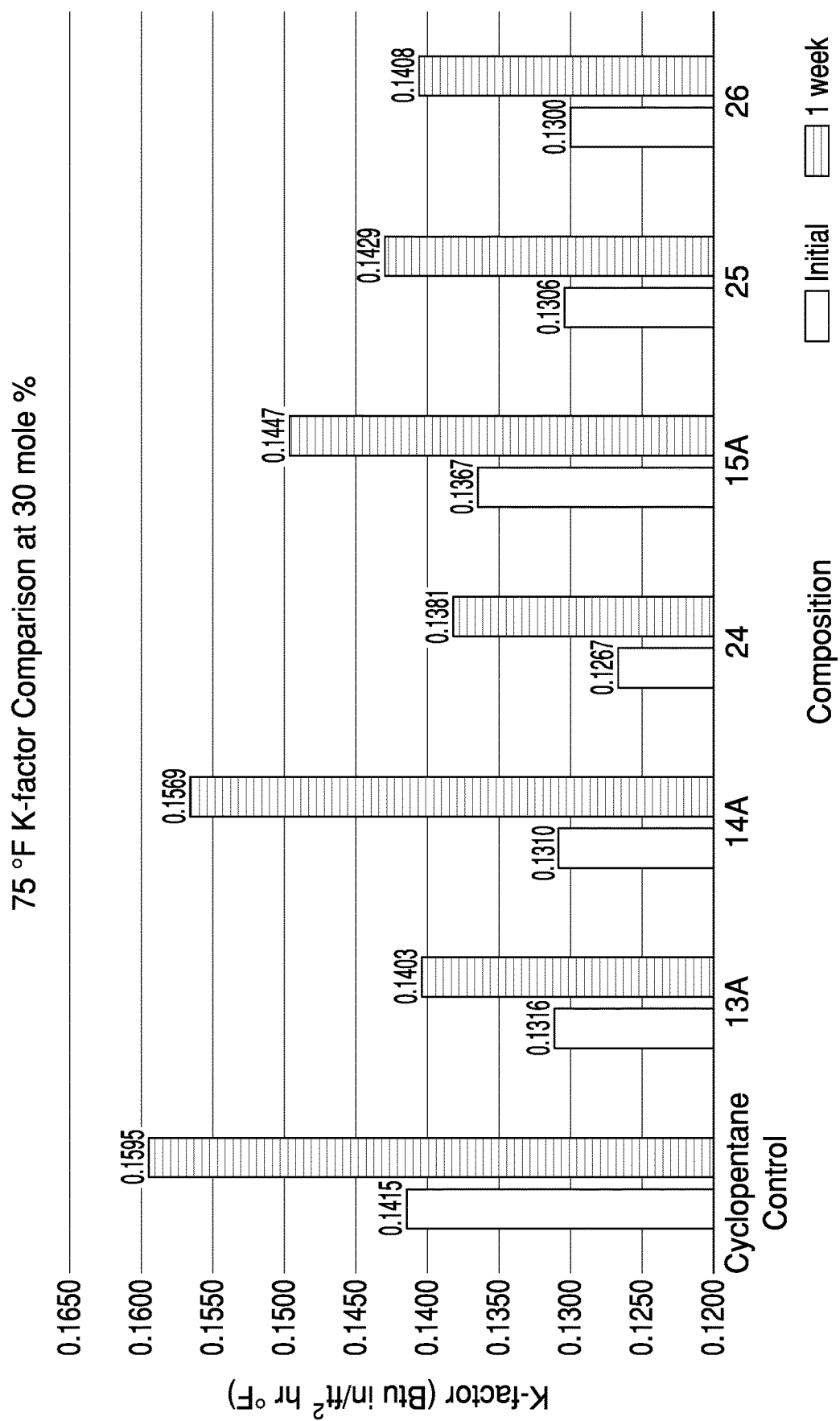

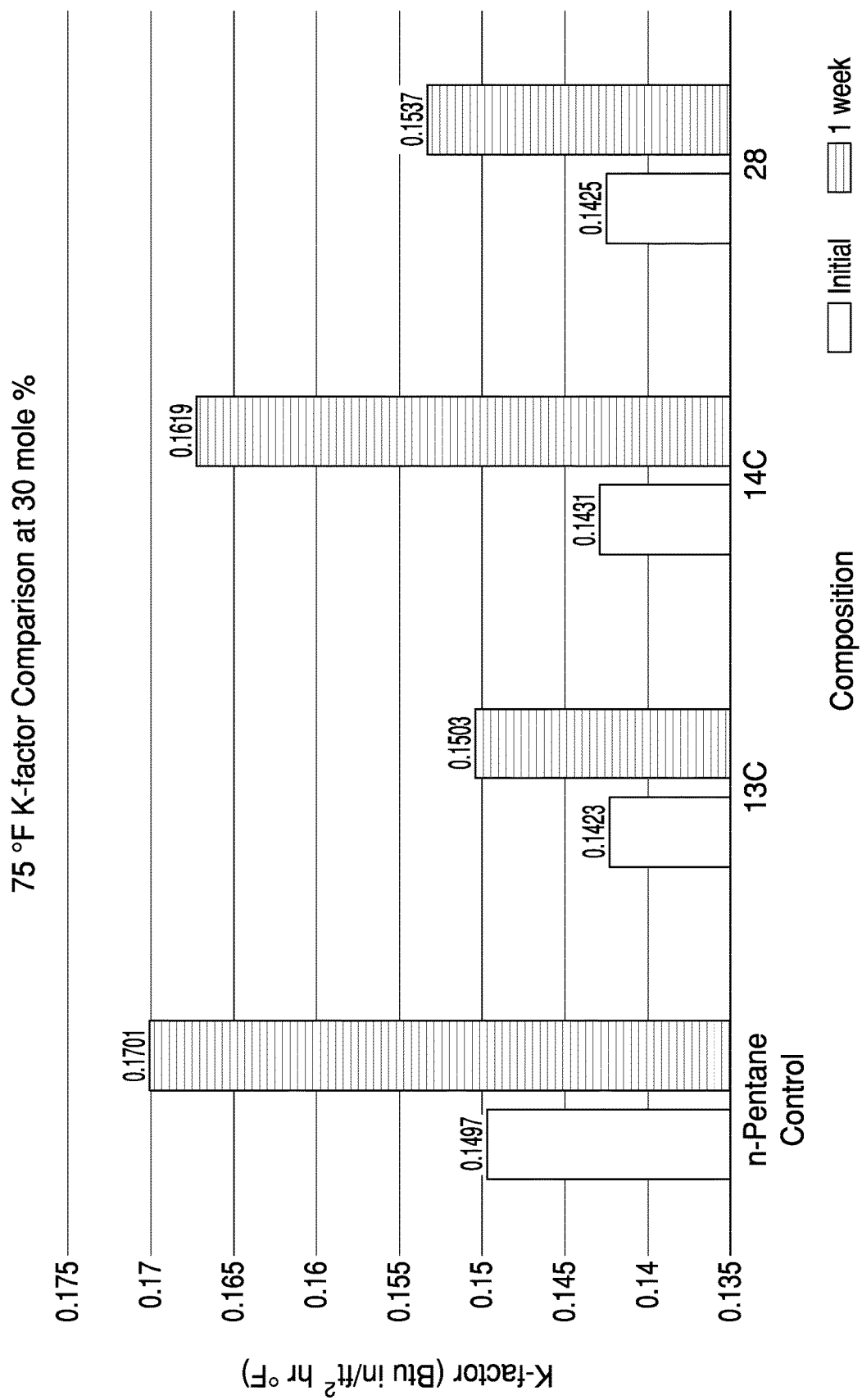

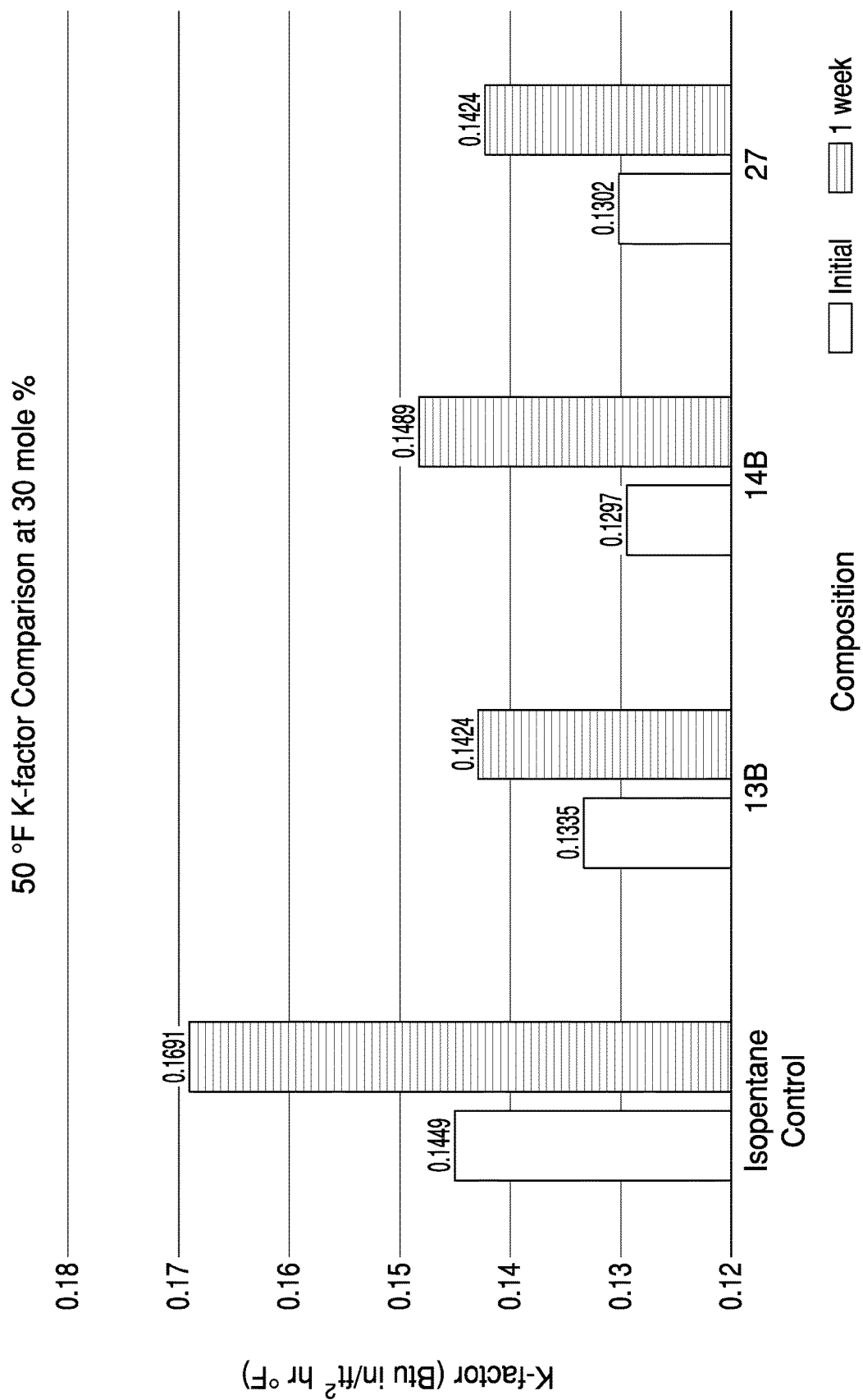

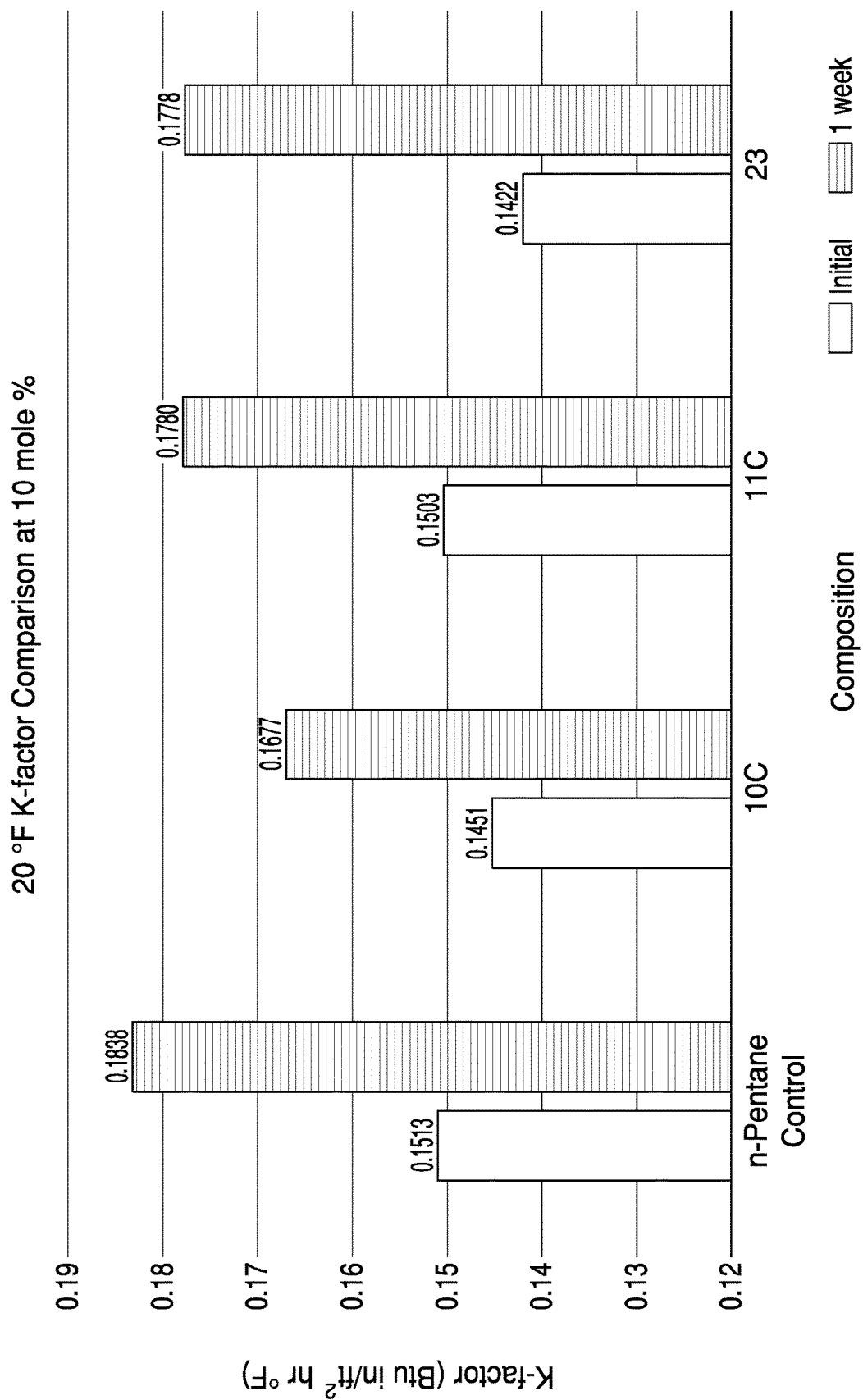

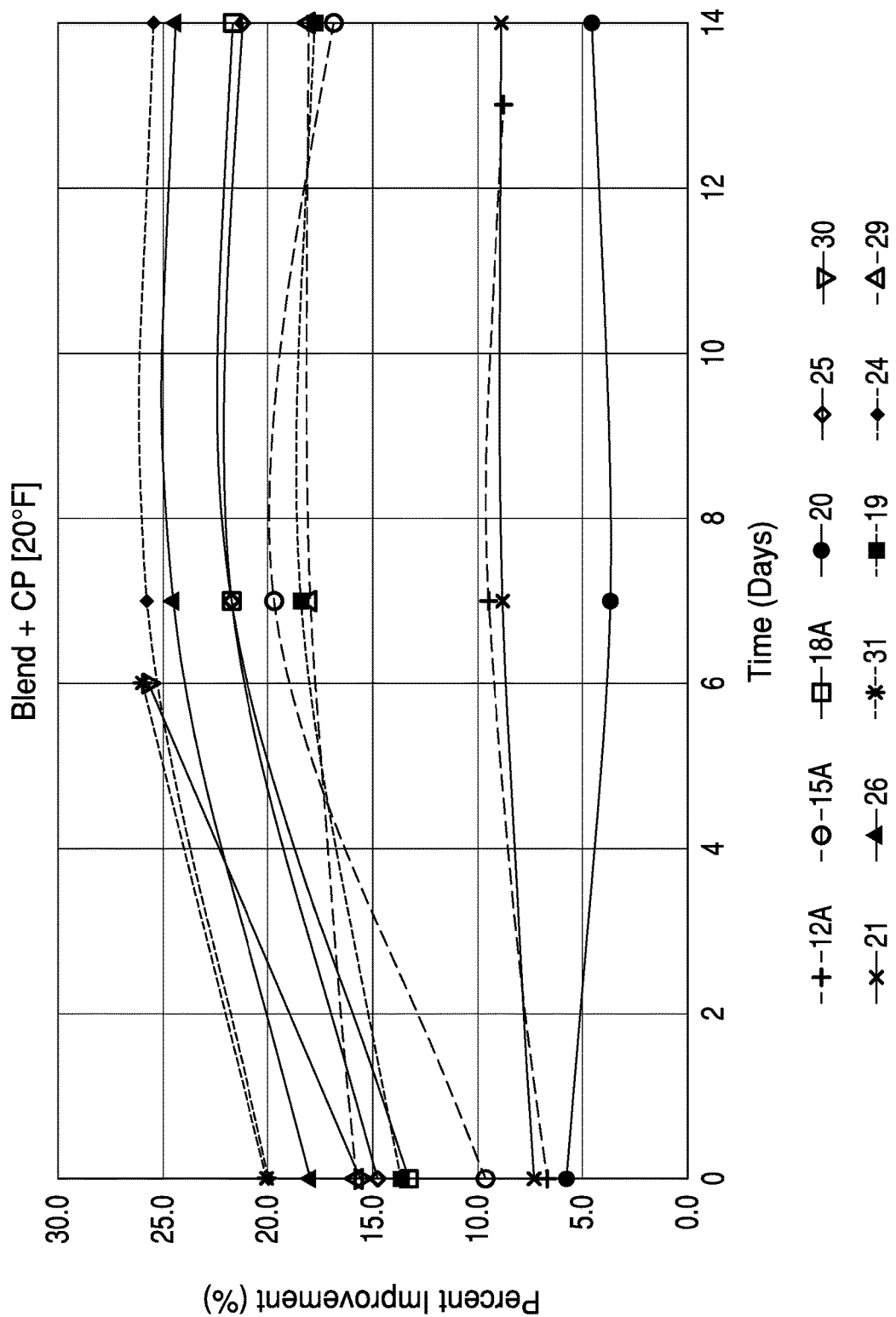

INSULATION PERFORMANCE FOAMS

CROSS REFERENCE TO RELATED APPLICATIONS

This application is a national filing under 35 U.S.C. 371 of International Application No. PCT/US2019/030517 filed May 3, 2019, and claims priority of U.S. Provisional Application No. 62/667,192 filed May 4, 2018, the disclosures of which are incorporated herein by reference in its entirety.

TECHNICAL FIELD

This invention relates to foams having improved insulation and thermal performance, processes of forming said foams, and foamable compositions useful for preparing said foams. The processes described herein comprise reacting or extruding a foamable composition comprising (i) a compound selected from E-CHCl=CHCF$_3$, Z—CF$_3$CH=CHCF$_3$, and E-CF$_3$CH=CHCF$_3$, or any mixture thereof, and (2) a C$_5$ hydrocarbon (e.g. cyclopentane), under conditions effective to form the foam.

BACKGROUND

Closed-cell polyisocyanate-based foams are widely used for insulation purposes, for example, in building construction and in the manufacture of energy efficient electrical appliances. In the construction industry, polyurethane (polyisocyanurate) board stock is used in roofing and siding for its insulation and load-carrying capabilities. Poured and sprayed polyurethane foams are widely used for a variety of applications including insulating roofs, insulating large structures such as storage tanks, insulating appliances such as refrigerators and freezers, insulating refrigerated trucks and railcars, etc.

All of these various types of polyurethane foams require blowing (expansion) agents for their manufacture. Insulating foams depend on the use of halocarbon blowing agents, not only to foam the polymer, but also for their low vapor thermal conductivity, a very important characteristic for insulation value. Historically, polyurethane foams used CFCs (chlorofluorocarbons, for example CFC-11, trichlorofluoromethane), HCFCs (hydrochlorofluorocarbons, for example HCFC-141b, 1,1-dichloro-1-fluoroethane), and HFCs (hydrofluorocarbons, for example, HFC-245fa, HFC-365mfc) as the primary blowing agents.

In general, CFCs produce foams exhibiting good thermal insulation, low flammability, and excellent dimensional stability. However, despite these advantages, CFCs have fallen into disfavor due to the implication of chlorine-containing molecules in the destruction of stratospheric ozone. Further, the production and use of CFCs has been restricted by the Montreal Protocol. HCFCs have been proposed as CFC substitutes, and are currently employed as foam blowing agents. However, HCFCs have also been shown to contribute to the depletion of stratospheric ozone, and as a result their use has come under scrutiny. The widespread use of HCFCs is scheduled for eventual phase out under the Montreal Protocol.

SUMMARY

The present application provides, inter alia, foam blowing compositions comprising i) about 0.3 to about 16.5 weight percent E-CF$_3$CH=CHCF$_3$; and ii) about 6.5 to about 15.5 weight percent cyclopentane.

The present application further provides a process of forming a foam, comprising reacting or extruding the foamable composition described herein under conditions effective to form a foam.

The present application further provides a foam (e.g., polyisocyanurate or a polyurethane) prepared from a foamable composition according to a process described herein.

Unless otherwise defined, all technical and scientific terms used herein have the same meaning as commonly understood by one of ordinary skill in the art to which this invention belongs. Methods and materials are described herein for use in the present invention; other, suitable methods and materials known in the art can also be used. The materials, methods, and examples are illustrative only and not intended to be limiting. All publications, patent applications, patents, sequences, database entries, and other references mentioned herein are incorporated by reference in their entirety. In case of conflict, the present specification, including definitions, will control.

DESCRIPTION OF DRAWINGS

FIGS. 12A-12C shows the comparative thermal performance of foams prepared from B-side compositions containing 30 mol % HFO or HCFO and cyclopentane (FIG. 12A), isopentane (FIG. 12B), and n-pentane (FIG. 12C) at 75° F. (24° C.). Initial thermal performance and thermal performance after 7 days aging at 70° C. are shown.

FIGS. 15A-15C shows the comparative thermal performance of foams prepared from B-side compositions containing 30 mol % HFO or HCFO and cyclopentane (FIG. 15A), isopentane (FIG. 15B), and n-pentane (FIG. 15C) at 50° F. (10° C.). Initial thermal performance and thermal performance after 7 days aging at 70° C. are shown.

FIGS. 17A-17C shows the comparative thermal performance of foams prepared from B-side compositions containing 10 mol % HFO or HCFO and cyclopentane (FIG. 17A), isopentane (FIG. 17B), and n-pentane (FIG. 17C) at 20° F. (−6.7° C.). Initial thermal performance and thermal performance after 7 days aging at 70° C. are shown.

FIGS. 20A-20C show thermal performance of representative foams prepared from B-side compositions described in Example 3 as a function of aging at 70° C. over a period of 14 days. Data are shown as a percent improvement compared to a foam prepared using cyclopentane as the blowing agent. Thermal performance was analyzed at 75° F. (FIG. 20A), 50° F. (FIG. 20B), and 20° F. (FIG. 20C).

DETAILED DESCRIPTION

Figure 1:
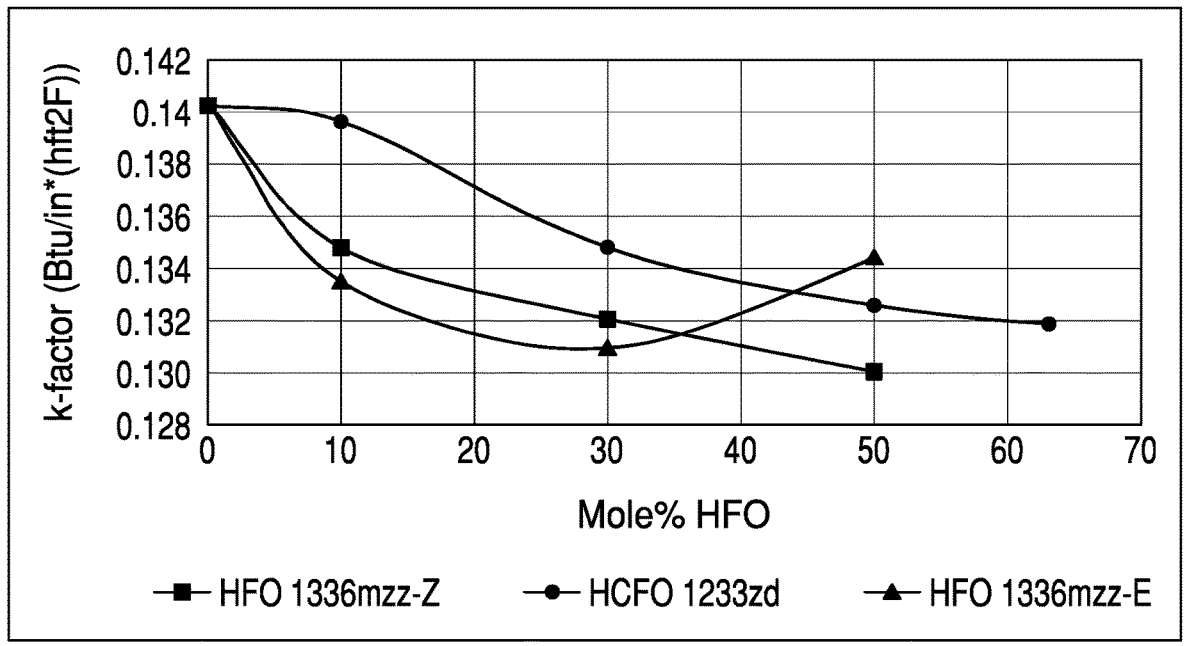
FIG. 1 shows the measured thermal performance (K-factor at 75° F., 24° C.) of a foam as a function of the amount of HFO or HCFO used to prepare the B-side composition. The mole % shown is based on the total amount of HFO or HCFO, cyclopentane, and water used to prepare the B-side composition.

Polyisocyanurate (PIR) foam is a growing important market segment in the rigid insulation industry due to its excellent thermal performance and fire classification capability. The predominate blowing agents used for PIR panel foams are $C_5$ hydrocarbons, such as cyclopentane, n-pentane, isopentane, or mixtures thereof. Although these $C_5$ blowing agents can provide adequate thermal insulation performance for current requirements, increasingly stringent energy efficiency regulations are driving further improvements. Hydrofluoroolefins (HFOs) represent a class of compounds being used as blowing agents in polyurethane and related foams. Further, many HFOs react and decompose in the atmosphere relatively quickly. Thus, many HFOs have no or very low global warming potential (GWP) and do not contribute to the depletion of stratospheric ozone and global warming. HFOs have been shown to have improved insulation performance in comparison to $C_5$ hydrocarbons, but are considerably more expensive. Therefore, a need for adding a minimum amount of HFO to $C_5$ hydrocarbons to deliver a maximum improvement in insulation performance is needed.

Spray polyurethane foam (SPF) is a growing important market segment in the rigid insulation industry due to its excellent thermal performance and building envelope sealing capability. When applied, the speed and quality of the applied layers is critical for effective application and efficiency of performance parameters, including density and surface appearance. In addition, such foams are applied in situ in the buildings of interest under a variety of environmental conditions, including cold winter time temperatures. Typical physical foam expansion agents require heat to evaporate and expand. This becomes difficult in cold temperatures when the catalysis of the polyurethane polymerization is slowed, thus diminishing the only source of heat on the surface of the sprayed area. Therefore, providing a means of applying SPF with efficient lay down and under cold conditions represents a benefit for the industry.

Foamable Compositions and Process of Preparing a Foam

The present application provides a process of forming a foam, comprising reacting or extruding a foamable composition comprising i) a compound selected from E-$CF_3CH$=$CHCF_3$ (HFO-1336mzz-E), Z—$CF_3CH$=$CHCF_3$ (HFO-1336mzz-Z), and E-CHCl=$CHCF_3$ (HCFO-1233zd-E), or any mixture thereof, and ii) a $C_5$ hydrocarbon, under conditions effective to form a foam.

In some embodiments, the process comprises reacting or extruding a foamable composition comprising i) E-$CF_3CH$=$CHCF_3$ (HFO-1336mzz-E); and ii) a $C_5$ hydrocarbon, under conditions effective to form a foam.

In some embodiments, the process comprises reacting or extruding a foamable composition comprising i) Z—$CF_3CH$=$CHCF_3$ (HFO-1336mzz-Z) and ii) a $C_5$ hydrocarbon, under conditions effective to form a foam.

In some embodiments, the process comprises reacting or extruding a foamable composition comprising i) a mixture of Z—$CF_3CH$=$CHCF_3$ (HFO-1336mzz-Z) and E-$CF_3CH$=$CHCF_3$ (HFO-1336mzz-E) and ii) a $C_5$ hydrocarbon, under conditions effective to form a foam.

In some embodiments, the process comprises reacting or extruding a foamable composition comprising i) E-CHCl=$CHCF_3$ (HCFO-1233zd-E) and ii) a $C_5$ hydrocarbon, under conditions effective to form a foam.

In some embodiments, the process comprises reacting or extruding a foamable composition comprising i) a mixture of Z—$CF_3CH$=$CHCF_3$ (HFO-1336mzz-Z) and E-CHCl=$CHCF_3$ (HCFO-1233zd-E) and ii) a $C_5$ hydrocarbon, under conditions effective to form a foam.

In some embodiments, the process comprises reacting or extruding a foamable composition comprising i) a mixture of E-CF$_3$CH=CHCF$_3$ (HFO-1336mzz-E) and E-CHCl=CHCF$_3$ (HCFO-1233zd-E) and ii) a C$_5$ hydrocarbon, under conditions effective to form a foam.

In some embodiments, the C$_5$ hydrocarbon is a C$_5$ alkane. In some embodiments, the C$_5$ hydrocarbon is selected from cyclopentane, isopentane, and n-pentane. In some embodiments, the C$_5$ hydrocarbon is cyclopentane. In some embodiments, the C$_5$ hydrocarbon is isopentane. In some embodiments, the C$_5$ hydrocarbon is n-pentane.

In some embodiments, the present application provides a process of forming a foam, comprising reacting or extruding a foamable composition comprising i) about 3.0 to about 15.0 weight percent of a compound selected from E-CF$_3$CH=CHCF$_3$ (HFO-1336mzz-E), Z—CF$_3$CH=CHCF$_3$ (HFO-1336mzz-Z), and E-CHCl=CHCF$_3$ (HCFO-1233zd-E), or any mixture thereof, and ii) about 6.5 to about 14.0 weight percent C$_5$ hydrocarbon, under conditions effective to form a foam.

In some embodiments, the present application provides a process of forming a foam, comprising reacting or extruding a foamable composition comprising:
 i) about 3.0 to about 15.0 weight percent of a mixture of
  (a) E-CF$_3$CH=CHCF$_3$ (HFO-1336mzz-E) or Z—CF$_3$CH=CHCF$_3$ (HFO-1336mzz-Z); and (b) E-CHCl=CHCF$_3$ (HCFO-1233zd-E); and
 ii) about 6.5 to about 14.0 weight percent C$_5$ hydrocarbon, under conditions effective to form a foam.

In some embodiments, the process comprises reacting or extruding a foamable composition comprising i) about 3.5 to about 16.5 weight percent of a mixture of E-CF$_3$CH=CHCF$_3$ and Z—CF$_3$CH=CHCF$_3$; and ii) about 6.5 to about 14.0 weight percent C$_5$ hydrocarbon, under conditions effective to form a foam.

In some embodiments, the foamable composition comprises about 3.5 to about 16.25 weight percent of a mixture of E-CF$_3$CH=CHCF$_3$ and Z—CF$_3$CH=CHCF$_3$, for example, about 3.5 to about 10.2 weight percent, about 10.2 to about 16.5 weight percent, or about 10.2 to about 16.25 weight percent of a mixture of E-CF$_3$CH=CHCF$_3$ and Z—CF$_3$CH=CHCF$_3$.

In some embodiments, the process comprises reacting or extruding a foamable composition comprising i) about 3.0 to about 15.0 weight percent of a mixture of E-CHCl=CHCF$_3$ and Z—CF$_3$CH=CHCF$_3$; and ii) about 6.5 to about 14.0 weight percent C$_5$ hydrocarbon, under conditions effective to form a foam.

In some embodiments, the foamable composition comprises about 3.0 to about 15.0 weight percent of a mixture of E-CHCl=CHCF$_3$ and Z—CF$_3$CH=CHCF$_3$, for example, about 3.0 to about 14.8 weight percent, about 3.0 to about 9.0 weight percent, about 9.0 to about 15.0, or about 9.0 to about 14.8 weight percent of a mixture of E-CHCl=CHCF$_3$ and Z—CF$_3$CH=CHCF$_3$.

In some embodiments, the process comprises reacting or extruding a foamable composition comprising i) about 3.0 to about 15.0 weight percent of a mixture of E-CHCl=CHCF$_3$ and E-CF$_3$CH=CHCF$_3$; and ii) about 6.5 to about 14.0 weight percent C$_5$ hydrocarbon, under conditions effective to form a foam.

In some embodiments, the foamable composition comprises about 3.0 to about 15.0 weight percent of a mixture of E-CHCl=CHCF$_3$ and E-CF$_3$CH=CHCF$_3$, for example, about 3.0 to about 14.8 weight percent, about 3.0 to about 9.0 weight percent, about 9.0 to about 15.0, or about 9.0 to about 14.8 weight percent of a mixture of E-CHCl=CHCF$_3$ and E-CF$_3$CH=CHCF$_3$.

In some embodiments, the foamable composition comprises about 6.5 to about 14.0 weight percent cyclopentane, for example, about 6.5 to about 13.8 weight percent, about 6.5 to about 10.5 weight percent, about 6.5 to about 10.1 weight percent, about 6.5 to about 7.0 weight percent, about 7.0 to about 14.0 weight percent, about 7.0 to about 13.8 weight percent, about 7.0 to about 10.5 weight percent, about 7.0 to about 10.1 weight percent, about 10.1 to about 14.0 weight percent, about 10.1 to about 13.8 weight percent, about 10.1 to about 10.5 weight percent, about 10.5 to about 14.0 weight percent, about 10.5 to about 13.8 weight percent, or about 13.8 to about 14.0 weight percent cyclopentane.

In some embodiments, the foamable composition comprises about 6.5 to about 14.0 weight percent isopentane, for example, about 6.5 to about 13.8 weight percent, about 6.5 to about 10.5 weight percent, about 6.5 to about 10.1 weight percent, about 6.5 to about 7.0 weight percent, about 7.0 to about 14.0 weight percent, about 7.0 to about 13.8 weight percent, about 7.0 to about 10.5 weight percent, about 7.0 to about 10.1 weight percent, about 10.1 to about 14.0 weight percent, about 10.1 to about 13.8 weight percent, about 10.1 to about 10.5 weight percent, about 10.5 to about 14.0 weight percent, about 10.5 to about 13.8 weight percent, or about 13.8 to about 14.0 weight percent isopentane.

In some embodiments, the foamable composition comprises about 6.5 to about 14.0 weight percent n-pentane, for example, about 6.5 to about 13.8 weight percent, about 6.5 to about 10.5 weight percent, about 6.5 to about 10.1 weight percent, about 6.5 to about 7.0 weight percent, about 7.0 to about 14.0 weight percent, about 7.0 to about 13.8 weight percent, about 7.0 to about 10.5 weight percent, about 7.0 to about 10.1 weight percent, about 10.1 to about 14.0 weight percent, about 10.1 to about 13.8 weight percent, about 10.1 to about 10.5 weight percent, about 10.5 to about 14.0 weight percent, about 10.5 to about 13.8 weight percent, or about 13.8 to about 14.0 weight percent n-pentane.

In some embodiments, the process comprises reacting or extruding a foamable composition comprising i) about 3.5 to about 16.5 weight percent of a mixture of E-CF$_3$CH=CHCF$_3$ and Z—CF$_3$CH=CHCF$_3$; and ii) about 6.5 to about 14.0 weight percent cyclopentane, under conditions effective to form a foam.

In some embodiments, the process comprises reacting or extruding a foamable composition comprising i) about 3.5 to about 16.5 weight percent of a mixture of E-CF$_3$CH=CHCF$_3$ and Z—CF$_3$CH=CHCF$_3$; and ii) about 6.9 to about 13.5 weight percent cyclopentane, under conditions effective to form a foam.

In some embodiments, the process comprises reacting or extruding a foamable composition comprising i) about 3.5 to about 16.5 weight percent of a mixture of E-CF$_3$CH=CHCF$_3$ and Z—CF$_3$CH=CHCF$_3$; and ii) about 7.1 to about 13.8 weight percent isopentane, under conditions effective to form a foam.

In some embodiments, the process comprises reacting or extruding a foamable composition comprising i) about 3.5 to about 16.5 weight percent of a mixture of E-CF$_3$CH=CHCF$_3$ and Z—CF$_3$CH=CHCF$_3$; and ii) about 7.1 to about 13.5 weight percent n-pentane, under conditions effective to form a foam.

In some embodiments, the foamable composition comprises:

about 3.4 to about 3.6 weight percent of a mixture of E-CF$_3$CH=CHCF$_3$ and Z—CF$_3$CH=CHCF$_3$ and about 13.4 to about 13.6 weight percent cyclopentane; or about 10.1 to about 10.2 weight percent of a mixture of E-CF$_3$CH=CHCF$_3$ and Z—CF$_3$CH=CHCF$_3$ and about 10.0 to about 10.1 weight percent cyclopentane; or about 16.2 to about 16.3 weight percent of a mixture of E-CF$_3$CH=CHCF$_3$ and Z—CF$_3$CH=CHCF$_3$ and about 6.9 to about 7.0 weight percent cyclopentane; or about 3.4 to about 3.6 weight percent of a mixture of E-CF$_3$CH=CHCF$_3$ and Z—CF$_3$CH=CHCF$_3$ and about 13.7 to about 13.9 weight percent isopentane; or about 10.1 to about 10.2 weight percent of a mixture of E-CF$_3$CH=CHCF$_3$ and Z—CF$_3$CH=CHCF$_3$ and about 10.3 to about 10.4 weight percent isopentane; or about 16.2 to about 16.3 weight percent of a mixture of E-CF$_3$CH=CHCF$_3$ and Z—CF$_3$CH=CHCF$_3$ and about 7.1 to about 7.2 weight percent isopentane; or about 3.4 to about 3.6 weight percent of a mixture of E-CF$_3$CH=CHCF$_3$ and Z—CF$_3$CH=CHCF$_3$ and about 13.4 to about 13.6 weight percent n-pentane; or about 10.1 to about 10.2 weight percent of a mixture of E-CF$_3$CH=CHCF$_3$ and Z—CF$_3$CH=CHCF$_3$ and about 10.3 to about 10.4 weight percent n-pentane; or about 16.2 to about 16.3 weight percent of a mixture of E-CF$_3$CH=CHCF$_3$ and Z—CF$_3$CH=CHCF$_3$ and about 7.1 to about 7.2 weight percent n-pentane.

In some embodiments, the process comprises reacting or extruding a foamable composition comprising i) about 0.3 to about 16.5 weight percent E-CF$_3$CH=CHCF$_3$; and ii) about 6.5 to about 15.5 weight percent cyclopentane, under conditions effective to form a foam.

In some embodiments, the process comprises reacting or extruding a foamable composition comprising i) about 3.0 to about 15.0 weight percent of a mixture of E-CHCl=CHCF$_3$ and Z—CF$_3$CH=CHCF$_3$; and ii) about 6.5 to about 14.0 weight percent cyclopentane, under conditions effective to form a foam.

In some embodiments, the process comprises reacting or extruding a foamable composition comprising i) about 3.0 to about 4.0 weight percent of a mixture of E-CHCl=CHCF$_3$ and Z—CF$_3$CH=CHCF$_3$; and ii) about 13.0 to about 14.0 weight percent cyclopentane, under conditions effective to form a foam.

In some embodiments, the process comprises reacting or extruding a foamable composition comprising i) about 10.0 to about 11.0 weight percent of a mixture of E-CHCl=CHCF$_3$ and Z—CF$_3$CH=CHCF$_3$; and ii) about 9.0 to about 10.0 weight percent cyclopentane, under conditions effective to form a foam.

In some embodiments, the process comprises reacting or extruding a foamable composition comprising i) about 14.0 to about 15.0 weight percent of a mixture of E-CHCl=CHCF$_3$ and Z—CF$_3$CH=CHCF$_3$; and ii) about 7.0 to about 8.0 weight percent cyclopentane, under conditions effective to form a foam.

In some embodiments, the process comprises reacting or extruding a foamable composition comprising i) about 3.0 to about 15.0 weight percent of a mixture of E-CHCl=CHCF$_3$ and Z—CF$_3$CH=CHCF$_3$; and ii) about 6.5 to about 14.0 weight percent isopentane, under conditions effective to form a foam.

In some embodiments, the process comprises reacting or extruding a foamable composition comprising i) about 3.0 to about 4.0 weight percent of a mixture of E-CHCl=CHCF$_3$ and Z—CF$_3$CH=CHCF$_3$; and ii) about 13.0 to about 14.0 weight percent isopentane, under conditions effective to form a foam.

In some embodiments, the process comprises reacting or extruding a foamable composition comprising i) about 10.0 to about 11.0 weight percent of a mixture of E-CHCl=CHCF$_3$ and Z—CF$_3$CH=CHCF$_3$; and ii) about 9.0 to about 10.0 weight percent isopentane, under conditions effective to form a foam.

In some embodiments, the process comprises reacting or extruding a foamable composition comprising i) about 14.0 to about 15.0 weight percent of a mixture of E-CHCl=CHCF$_3$ and Z—CF$_3$CH=CHCF$_3$; and ii) about 7.0 to about 8.0 weight percent isopentane, under conditions effective to form a foam.

In some embodiments, the process comprises reacting or extruding a foamable composition comprising i) about 3.0 to about 15.0 weight percent of a mixture of E-CHCl=CHCF$_3$ and Z—CF$_3$CH=CHCF$_3$; and ii) about 6.5 to about 14.0 weight percent n-pentane, under conditions effective to form a foam.

In some embodiments, the process comprises reacting or extruding a foamable composition comprising i) about 3.0 to about 4.0 weight percent of a mixture of E-CHCl=CHCF$_3$ and Z—CF$_3$CH=CHCF$_3$; and ii) about 13.0 to about 14.0 weight percent n-pentane, under conditions effective to form a foam.

In some embodiments, the process comprises reacting or extruding a foamable composition comprising i) about 10.0 to about 11.0 weight percent of a mixture of E-CHCl=CHCF$_3$ and Z—CF$_3$CH=CHCF$_3$; and ii) about 9.0 to about 10.0 weight percent n-pentane, under conditions effective to form a foam.

In some embodiments, the process comprises reacting or extruding a foamable composition comprising i) about 14.0 to about 15.0 weight percent of a mixture of E-CHCl=CHCF$_3$ and Z—CF$_3$CH=CHCF$_3$; and ii) about 7.0 to about 8.0 weight percent n-pentane, under conditions effective to form a foam.

In some embodiments, the process comprises reacting or extruding a foamable composition comprising i) about 3.0 to about 15.0 weight percent of a mixture of E-CHCl=CHCF$_3$ and E-CF$_3$CH=CHCF$_3$; and ii) about 6.5 to about 14.0 weight percent cyclopentane, under conditions effective to form a foam.

In some embodiments, the process comprises reacting or extruding a foamable composition comprising i) about 3.0 to about 4.0 weight percent of a mixture of E-CHCl=CHCF$_3$ and E-CF$_3$CH=CHCF$_3$; and ii) about 13.0 to about 14.0 weight percent cyclopentane, under conditions effective to form a foam.

In some embodiments, the process comprises reacting or extruding a foamable composition comprising i) about 10.0 to about 11.0 weight percent of a mixture of E-CHCl=CHCF$_3$ and E-CF$_3$CH=CHCF$_3$; and ii) about 9.0 to about 10.0 weight percent cyclopentane, under conditions effective to form a foam.

In some embodiments, the process comprises reacting or extruding a foamable composition comprising i) about 14.0 to about 15.0 weight percent of a mixture of E-CHCl=CHCF$_3$ and E-CF$_3$CH=CHCF$_3$; and ii) about 7.0 to about 8.0 weight percent cyclopentane, under conditions effective to form a foam.

In some embodiments, the process comprises reacting or extruding a foamable composition comprising i) about 3.0 to about 15.0 weight percent of a mixture of E-CHCl=CHCF$_3$ and E-CF$_3$CH=CHCF$_3$; and ii) about 6.5 to about 14.0 weight percent isopentane, under conditions effective to form a foam.

In some embodiments, the process comprises reacting or extruding a foamable composition comprising i) about 3.0 to about 4.0 weight percent of a mixture of E-CHCl=CHCF$_3$ and E-CF$_3$CH=CHCF$_3$; and ii) about 13.0 to about 14.0 weight percent isopentane, under conditions effective to form a foam.

In some embodiments, the process comprises reacting or extruding a foamable composition comprising i) about 10 to about 11 weight percent of a mixture of E-CHCl=CHCF$_3$ and E-CF$_3$CH=CHCF$_3$; and ii) about 9.0 to about 10.0 weight percent isopentane, under conditions effective to form a foam.

In some embodiments, the process comprises reacting or extruding a foamable composition comprising i) about 14.0 to about 15.0 weight percent of a mixture of E-CHCl=CHCF$_3$ and E-CF$_3$CH=CHCF$_3$; and ii) about 7.0 to about 8.0 weight percent isopentane, under conditions effective to form a foam.

In some embodiments, the process comprises reacting or extruding a foamable composition comprising i) about 3.0 to about 15.0 weight percent of a mixture of E-CHCl=CHCF$_3$ and E-CF$_3$CH=CHCF$_3$; and ii) about 6.5 to about 14.0 weight percent n-pentane, under conditions effective to form a foam.

In some embodiments, the process comprises reacting or extruding a foamable composition comprising i) about 3.0 to about 4.0 weight percent of a mixture of E-CHCl=CHCF$_3$ and E-CF$_3$CH=CHCF$_3$; and ii) about 13.0 to about 14.0 weight percent n-pentane, under conditions effective to form a foam.

In some embodiments, the process comprises reacting or extruding a foamable composition comprising i) about 10 to about 11 weight percent of a mixture of E-CHCl=CHCF$_3$ and E-CF$_3$CH=CHCF$_3$; and ii) about 9.0 to about 10.0 weight percent n-pentane, under conditions effective to form a foam.

In some embodiments, the process comprises reacting or extruding a foamable composition comprising i) about 14.0 to about 15.0 weight percent of a mixture of E-CHCl=CHCF$_3$ and E-CF$_3$CH=CHCF$_3$; and ii) about 7.0 to about 8.0 weight percent n-pentane, under conditions effective to form a foam.

In some embodiments, the foamable composition comprises:

about 3.0 to about 15.0 weight percent of a mixture of E-CHCl=CHCF$_3$ and Z—CF$_3$CH=CHCF$_3$ and about 6.5 to about 14.0 weight percent cyclopentane; or about 3.0 to about 4.0 weight percent of a mixture of E-CHCl=CHCF$_3$ and Z—CF$_3$CH=CHCF$_3$ and about 13.0 to about 14.0 weight percent cyclopentane; or about 10.0 to about 11.0 weight percent of a mixture of E-CHCl=CHCF$_3$ and Z—CF$_3$CH=CHCF$_3$ and about 9.0 to about 10.0 weight percent cyclopentane; or about 14.0 to about 15.0 weight percent of a mixture of E-CHCl=CHCF$_3$ and Z—CF$_3$CH=CHCF$_3$ and about 7.0 to about 8.0 weight percent cyclopentane; or about 3.0 to about 15.0 weight percent of a mixture of E-CHCl=CHCF$_3$ and Z—CF$_3$CH=CHCF$_3$ and about 6.5 to about 14.0 weight percent isopentane; or about 3.0 to about 4.0 weight percent of a mixture of E-CHCl=CHCF$_3$ and Z—CF$_3$CH=CHCF$_3$ and about 13.0 to about 14.0 weight percent isopentane; or about 10 to about 11 weight percent of a mixture of E-CHCl=CHCF$_3$ and Z—CF$_3$CH=CHCF$_3$ and about 9.0 to about 10.0 weight percent isopentane; or about 14.0 to about 15.0 weight percent of a mixture of E-CHCl=CHCF$_3$ and Z—CF$_3$CH=CHCF$_3$ and about 7.0 to about 8.0 weight percent isopentane; or about 3.0 to about 15.0 weight percent of a mixture of E-CHCl=CHCF$_3$ and Z—CF$_3$CH=CHCF$_3$ and about 6.5 to about 14.0 weight percent n-pentane; or about 3.0 to about 4.0 weight percent of a mixture of E-CHCl=CHCF$_3$ and Z—CF$_3$CH=CHCF$_3$ and about 13.0 to about 14.0 weight percent n-pentane; or about 10 to about 11 weight percent of a mixture of E-CHCl=CHCF$_3$ and Z—CF$_3$CH=CHCF$_3$ and about 9.0 to about 10.0 weight percent n-pentane; or about 14.0 to about 15.0 weight percent of a mixture of E-CHCl=CHCF$_3$ and Z—CF$_3$CH=CHCF$_3$ and about 7.0 to about 8.0 weight percent n-pentane; or about 3.0 to about 15.0 weight percent of a mixture of E-CHCl=CHCF$_3$ and E-CF$_3$CH=CHCF$_3$ and about 6.5 to about 14.0 weight percent cyclopentane; or about 3.0 to about 4.0 weight percent of a mixture of E-CHCl=CHCF$_3$ and E-CF$_3$CH=CHCF$_3$ and about 13.0 to about 14.0 weight percent cyclopentane; or about 10 to about 11 weight percent of a mixture of E-CHCl=CHCF$_3$ and E-CF$_3$CH=CHCF$_3$ and about 9.0 to about 10.0 weight percent cyclopentane; or about 14.0 to about 15.0 weight percent of a mixture of E-CHCl=CHCF$_3$ and E-CF$_3$CH=CHCF$_3$ and about 7.0 to about 8.0 weight percent cyclopentane; or about 3.0 to about 15.0 weight percent of a mixture of E-CHCl=CHCF$_3$ and E-CF$_3$CH=CHCF$_3$ and about 6.5 to about 14.0 weight percent isopentane; or about 3.0 to about 4.0 weight percent of a mixture of E-CHCl=CHCF$_3$ and E-CF$_3$CH=CHCF$_3$ and about 13.0 to about 14.0 weight percent isopentane; or about 10 to about 11 weight percent of a mixture of E-CHCl=CHCF$_3$ and E-CF$_3$CH=CHCF$_3$ and about 9.0 to about 10.0 weight percent isopentane; or about 14.0 to about 15.0 weight percent of a mixture of E-CHCl=CHCF$_3$ and E-CF$_3$CH=CHCF$_3$ and about 7.0 to about 8.0 weight percent isopentane; or about 3.0 to about 15.0 weight percent of a mixture of E-CHCl=CHCF$_3$ and E-CF$_3$CH=CHCF$_3$ and about 6.5 to about 14.0 weight percent n-pentane; or about 3.0 to about 4.0 weight percent of a mixture of E-CHCl=CHCF$_3$ and E-CF$_3$CH=CHCF$_3$ and about 13.0 to about 14.0 weight percent n-pentane; or about 10 to about 11 weight percent of a mixture of E-CHCl=CHCF$_3$ and E-CF$_3$CH=CHCF$_3$ and about 9.0 to about 10.0 weight percent n-pentane; or about 14.0 to about 15.0 weight percent of a mixture of E-CHCl=CHCF$_3$ and E-CF$_3$CH=CHCF$_3$ and about 7.0 to about 8.0 weight percent n-pentane.

In some embodiments, the foamable composition comprises about 0.37 to about 16.25 weight percent E-CF$_3$CH=CHCF$_3$, for example, about 0.37 to about 10.1, about 0.37 to about 3.5, about 3.5 to about 16.25, or about 3.5 to about 10.1 weight percent E-CF$_3$CH=CHCF$_3$.

In some embodiments, the foamable composition comprises about 3.5 to about 16.5 weight percent E-CF$_3$CH=CHCF$_3$.

In some embodiments, the foamable composition comprises about 0.3 to about 10.1 weight percent E-CF$_3$CH=CHCF$_3$.

In some embodiments, the foamable composition comprises about 0.3 to about 0.4 weight percent E-CF$_3$CH=CHCF$_3$.

In some embodiments, the foamable composition comprises about 3.5 to about 3.6 weight percent E-CF$_3$CH=CHCF$_3$.

In some embodiments, the foamable composition comprises about 10.1 to about 10.2 weight percent E-CF$_3$CH=CHCF$_3$.

In some embodiments, the foamable composition comprises about 16.2 to about 16.3 weight percent E-CF$_3$CH=CHCF$_3$.

In some embodiments, the foamable composition comprises about 6.9 to about 15.5 weight percent cyclopentane, for example, about 6.9 to about 13.5, about 6.9 to about 10.1, about 10.1 to about 15.5, about 10.1 to about 13.5, or about 13.5 to about 15.5 weight percent cyclopentane.

In some embodiments, the foamable composition comprises about 6.9 to about 13.5 weight percent cyclopentane.

In some embodiments, the foamable composition comprises about 10.1 to about 13.5 weight percent cyclopentane.

In some embodiments, the foamable composition comprises about 3.5 to about 16.5 weight percent E-CF$_3$CH=CHCF$_3$ and about 6.9 to about 13.5 weight percent cyclopentane.

In some embodiments, the foamable composition comprises about 0.3 to about 10.1 weight percent E-CF$_3$CH=CHCF$_3$ and about 10.1 to about 13.5 weight percent cyclopentane.

In some embodiments, the foamable composition comprises: about 0.3 to about 0.4 weight percent E-CF$_3$CH=CHCF$_3$ and about 15.1 to about 15.2 weight percent cyclopentane; or about 3.5 to about 3.6 weight percent E-CF$_3$CH=CHCF$_3$ and about 13.5 to about 13.6 weight percent cyclopentane; or about 10.1 to about 10.2 weight percent E-CF$_3$CH=CHCF$_3$ and about 10.1 to about 10.2 weight percent cyclopentane; or about 16.2 to about 16.3 weight percent E-CF$_3$CH=CHCF$_3$ and about 6.9 to about 7.0 weight percent cyclopentane.

In some embodiments, the foam prepared according to a process provided herein has a cream time of about 3 to about 30 seconds.

In some embodiments, the foam prepared according to a process provided herein has a cream time of about 20 to about 30 seconds.

In some embodiments, the foam prepared according to a process provided herein has a gel time of from about 25 seconds to about 80 seconds.

In some embodiments, the foam prepared according to a process provided herein has a gel time of from about 30 seconds to about 40 seconds.

In some embodiments, the foam prepared according to a process provided herein has a rise time of from about 50 seconds to about 140 seconds.

In some embodiments, the foam prepared according to a process provided herein has a rise time of from about 50 seconds to about 80 seconds.

In some embodiments, the foam prepared according to a process provided herein has a rise time of from about 70 seconds to about 80 seconds.

In some embodiments, the foam prepared according to a process provided herein has a tack time of from about 50 seconds to about 100 seconds.

In some embodiments, the foam prepared according to a process provided herein has a tack time of from about 70 seconds to about 80 seconds.

In some embodiments, the foamable composition further comprises one or more polyols. In some embodiments, one or more additives can be included in the foamable compositions described herein. For example, the foamable compositions can further comprise one or more additives that include, but are not limited to, catalysts, surfactants, flame retardants, stabilizers, preservatives, chain extenders, cross-linkers, water, colorants, antioxidants, reinforcing agents, fillers, antistatic agents, nucleating agents, smoke suppressants, and pigments.

In some embodiments, the foamable composition further comprises one or more additional components selected from at least one polyol, at least one catalyst, at least one surfactant, water, at least one flame retardant agent, and at least one nucleating agent.

In some embodiments, the foamable composition comprises at least one polyol. In some embodiments, the polyol comprises any ratio of polyester polyol to polyether polyol. One or more of each polyester polyol and polyether polyol may be used. In some embodiments, the polyol comprises a weight ratio of about 1:1 to about 2:1 polyester polyol to polyether polyol. In some embodiments, the polyol comprises a weight ratio of about 1:1 polyester polyols to polyether polyols. In some embodiments, the polyol comprises a weight ratio of about 1:1 polyester polyol to polyether polyol.

In some embodiments, the polyol is a polyester polyol. Suitable polyester polyols include those prepared by reacting a carboxylic acid and/or a derivative thereof or a polycarboxylic anhydride with a polyhydric alcohol. The polycarboxylic acids can be any of the known aliphatic, cycloaliphatic, aromatic, and/or heterocyclic polycarboxylic acids and can be substituted (e.g., with halogen atoms) and/or unsaturated. Examples of suitable polycarboxylic acids and anhydrides include oxalic acid, malonic acid, glutaric acid, pimelic acid, succinic acid, adipic acid, suberic acid, azelaic acid, sebacic acid, phthalic acid, isophthalic acid, terephthalic acid, trimellitic acid, trimellitic acid anhydride, pyromellitic dianhydride, phthalic acid anhydride, tetrahydrophthalic acid anhydride, hexahydrophthalic acid anhydride, endomethylene tetrahydrophthalic acid anhydride, glutaric acid anhydride acid, maleic acid, maleic acid anhydride, fumaric acid, and dimeric and trimeric fatty acids, such as those of oleic acid which may be in admixture with monomeric fatty acids. Simple esters of polycarboxylic acids can also be used, such as terephthalic acid dimethylester, terephthalic acid bisglycol and extracts thereof. The polyhydric alcohols suitable for the preparation of polyester polyols can be aliphatic, cycloaliphatic, aromatic, and/or heterocyclic. The polyhydric alcohols optionally can include substituents which are inert in the reaction, for example, chlorine and bromine substituents, and/or may be unsaturated. Suitable amino alcohols, such as monoethanolamine, diethanolamine or the like can also be used. Examples of suitable polyhydric alcohols include ethylene glycol, propylene glycol, polyoxyalkylene glycols (such as diethylene glycol, polyethylene glycol, dipropylene glycol and polypropylene glycol), glycerol, and trimethylolpropane.

Other suitable polyester polyols include, but are not limited to, aromatic polyester polyols, e.g., those made by transesterifying polyethylene terephthalate (PET) scrap with a glycol such as diethylene glycol, or made by reacting phthalic anhydride with a glycol. The resulting polyester polyols can be reacted further with ethylene and/or propylene oxide to form an extended polyester polyol containing additional internal alkyleneoxy groups.

In some embodiments, the polyester polyol has an average molecular weight of from about 400 g/mol to about 500 g/mol, such as from about 450 g/mol to about 475 g/mol. In some embodiments, the polyester polyol is an aromatic polyester polyol with an average hydroxyl number of from about 200 to about 325, such as from about 235 to about 265, or about 230 to about 250, or about 295 to about 315.

Exemplary polyester polyols that are commercially available include the polyester polyols Stepanpol® PS-2352 (Stepan Company, Chicago, Ill.), Stepanpol® PS-2502A (Stepan Company, Chicago, Ill.), Stepanpol® PS-2412 (Stepan Company, Chicago, Ill.), Stepanpol® PS-2520 (Stepan Company, Chicago, Ill.), Stepanpol® PS-3021 (Stepan Company, Chicago, Ill.), Stepanpol® PS-3024 (Stepan Company, Chicago, Ill.), Terol® 256 (Huntsman, The Woodlands, Tex.), and Terol® 925 (Huntsman, The Woodlands, Tex.), Terol® 250 (Huntsman, The Woodlands, Tex.), Terol® 305 (Huntsman, The Woodlands, Tex.), Terol® 563 (Huntsman, The Woodlands, Tex.), Terol® 649 (Huntsman, The Woodlands, Tex.), Terol® 1465 (Huntsman, The Woodlands, Tex.), Isoexter® TB-305 (COIM, West Deptford, N.J.), Isoexter® TB-306 (COIM, West Deptford, N.J.), Terate® HT5510 (Invista), Terate® 5232 (Invista), Terate® 5100 (Invista), Terate® 5150 (Invista), Terate® 5170 (Invista), Carpol® PES-240 (Carpenter Co., Richmond, Va.), Carpol® PES-265 (Carpenter Co., Richmond, Va.), Carpol® PES-305 (Carpenter Co., Richmond, Va.), Carpol® PES-295 (Carpenter Co., Richmond, Va.), In some embodiments, the foamable composition comprises one or more polyether polyols. Examples of suitable polyether polyols include, but are not limited to, polyethylene oxides, polypropylene oxides, mixed polyethylene-propylene oxides with terminal hydroxyl groups, among others. Other suitable polyols can be prepared by reacting ethylene and/or propylene oxide with an initiator having 2 to 16 or 3 to 8 hydroxyl groups as present, for example, in glycerol, pentaerythritol and carbohydrates such as sorbitol, glucose, sucrose and the like polyhydroxy compounds. Suitable polyether polyols can also include aliphatic or aromatic amine-based polyols. Exemplary polyether polyols that are commercially available include the polyether polyols JEFFOL® PPG-400 (Huntsman, The Woodlands, Tex.), JEFFOL® PPG-1000 (Huntsman, The Woodlands, Tex.), JEFFOL® FX31-240 (Huntsman, The Woodlands, Tex.), JEFFOL® G31-28 (Huntsman, The Woodlands, Tex.), JEFFOL® R-425X (Huntsman, The Woodlands, Tex.), JEFFOL® R-470X (Huntsman, The Woodlands, Tex.), JEFFOL® S-490 (Huntsman, The Woodlands, Tex.), JEFFOL® SG-360 (Huntsman, The Woodlands, Tex.), JEFFOL® SG-522 (Huntsman, The Woodlands, Tex.), Carpol® PGP-400 (Carpenter Co., Richmond, Va.), Carpol® PGP-1000 (Carpenter Co., Richmond, Va.), Carpol® GP-700 (Carpenter Co., Richmond, Va.), Carpol® GP-6015 (Carpenter Co., Richmond, Va.), Carpol® MX-425 (Carpenter Co., Richmond, Va.), Carpol® MX-470 (Carpenter Co., Richmond, Va.), Carpol® GSP-355 (Carpenter Co., Richmond, Va.), Carpol® GSP-520 (Carpenter Co., Richmond, Va.), Carpol® SP-477 (Carpenter Co., Richmond, Va.), VORANOL® 220-260 (Dow Chemical, Midland, Mich.), VORANOL® 220-110 (Dow Chemical, Midland, Mich.), VORANOL® 230-238 (Dow Chemical, Midland, Mich.), VORANOL® 232-027 (Dow Chemical, Midland, Mich.), VORANOL® 470 (Dow Chemical, Midland, Mich.), VORANOL® 360 (Dow Chemical, Midland, Mich.), VORANOL® 520 (Dow Chemical, Midland, Mich.), VORANOL® 391 (Dow Chemical, Midland, Mich.), Pluracol® P410R (BASF, Lemförde, Germany), Pluracol® P1010 (BASF, Lemförde, Germany), Pluracol® GP730 (BASF, Lemförde, Germany), Pluracol® 220 (BASF, Lemförde, Germany), Lupranol® 3422 (BASF, Lemförde, Germany), Pluracol® SG-360 (BASF, Lemförde, Germany), Pluracol® 824 (BASF, Lemförde, Germany), Pluracol® 735 (BASF, Lemförde, Germany), ARCOL® PPG-425 (Covestro, Leverkusen, Germany), ARCOL® 1000 (Covestro, Leverkusen, Germany), ARCOL® LHT-240 (Covestro, Leverkusen, Germany), MULTRANOL® 9139 (Covestro, Leverkusen, Germany), MULTRANOL® 3901 (Covestro, Leverkusen, Germany), MULTRANOL® 4034 (Covestro, Leverkusen, Germany), Poly-G® 20-265 (Monument Chemical, Indianapolis, Ind.), Poly-G® 20-112 (Monument Chemical, Indianapolis, Ind.), Poly-G® 30-240 (Monument Chemical, Indianapolis, Ind.), Poly-G® 85-29 (Monument Chemical, Indianapolis, Ind.), Poly-G® 73-490 (Monument Chemical, Indianapolis, Ind.), Poly-G® 74-376 (Monument Chemical, Indianapolis, Ind.), and Poly-G® 74-532.

In some embodiments, the polyether polyol is a medium functional polyether polyol. For example, the polyether polyol has a functionality of about four. In some embodiments, the polyether polyol is sucrose/glycerin initiated. In some embodiments, the polyether polyol is a Mannich-based polyether polyol. As used herein, the term "Mannich-based polyol" refers to an aromatic polyol obtained by alkoxylation with propylene oxide and/or ethylene oxide of the Mannich bases obtained by classical Mannich reaction between phenols (e.g., phenol, p-nonylphenol), formaldehyde and alkanolamines (diethanolamine, diisopropanolamine, monoethanolamine, monoisopropanolamine, etc.). Exemplary commercially available polyether polyols include Voranol® 490 (Dow Chemical, Midland, Mich.), Carpol® MX-425 (Carpenter Co., Richmond, Va.), and Carpol® MX-470 (Carpenter Co., Richmond, Va.).

In some embodiments, the polyol is a polyester polyol having a hydroxyl number of from about 200 mg KOH/g to about 300 mg KOH/g.

In some embodiments, the polyol is a polyester polyol having a hydroxyl number of from about 230 mg KOH/g to about 250 mg KOH/g.

In some embodiments, the i) E-$CF_3CH=CHCF_3$ (HFO-1336mzz-E); Z—$CF_3CH=CHCF_3$ (HFO-1336mzz-Z); E-CHCl=$CHCF_3$ (HCFO-1233zd-E); or any mixture thereof; and ii) a $C_5$ hydrocarbon described herein is soluble in the polyol blend. In some embodiments, solubility is measured by visual assessment.

In some embodiments, the mixture of i) E-$CF_3CH=CHCF_3$ (HFO-1336mzz-E) and ii) a $C_5$ hydrocarbon described herein is soluble in the polyol blend. In some embodiments, solubility is measured by visual assessment.

In some embodiments, the mixture of i) Z—$CF_3CH=CHCF_3$ (HFO-1336mzz-Z); and ii) a $C_5$ hydrocarbon described herein is soluble in the polyol blend. In some embodiments, solubility is measured by visual assessment.

In some embodiments, the mixture of i) E-CHCl=$CHCF_3$ (HCFO-1233zd-E); and ii) a $C_5$ hydrocarbon described herein is soluble in the polyol blend. In some embodiments, solubility is measured by visual assessment.

In some embodiments, the mixture of i) E-$CF_3CH=CHCF_3$ (HFO-1336mzz-E) and Z—$CF_3CH=CHCF_3$ (HFO-1336mzz-Z) and ii) a $C_5$ hydrocarbon described herein is soluble in the polyol blend. In some embodiments, solubility is measured by visual assessment.

In some embodiments, the mixture of i) Z—CF$_3$CH=CHCF$_3$ (HFO-1336mzz-Z) and E-CHCl=CHCF$_3$ (HCFO-1233zd-E) and ii) a C$_5$ hydrocarbon described herein is soluble in the polyol blend. In some embodiments, solubility is measured by visual assessment.

In some embodiments, the mixture of i) E-CF$_3$CH=CHCF$_3$ (HFO-1336mzz-E) and E-CHCl=CHCF$_3$ (HCFO-1233zd-E) and ii) a C$_5$ hydrocarbon described herein is soluble in the polyol blend. In some embodiments, solubility is measured by visual assessment.

In some embodiments, the foamable composition comprises at least one catalyst for the reaction of the polyol with the polyisocyanate (i.e., the A-side). Any suitable urethane catalyst can be used, including amine-based compounds, such as tertiary amine compounds, for example, dimethylethanolamine and bis(2-dimethylamino ethyl) ether, and organometallic compounds. Such catalysts are used in an amount which increases the rate of reaction of the polyisocyanate. By way of example, typical amounts of catalyst used are about 0.1 to about 5 parts of catalyst per 100 parts by weight of polyol. In some embodiments, the foamable compositions comprise a gel catalyst, such as a non-nucleophilic gel catalyst. In some embodiments, the foamable compositions comprise a blow catalyst. In some embodiments, the foamable compositions comprise a metal catalyst. In some embodiments, the foamable composition comprises a metal catalyst and an amine catalyst.

Exemplary catalysts are disclosed, for example, in U.S. Pat. No. 5,164,419, which disclosure is incorporated herein by reference. For example, a catalyst for the trimerization of polyisocyanates, such as an alkali metal alkoxide, alkali metal carboxylate, or quaternary amine salts, may also optionally be employed herein. Such catalysts are used in an amount which measurably increases the rate of reaction of the polyisocyanate. Typical amounts of catalysts are about 0.1% to about 5% by weight based on the total weight of all foaming ingredients. Non-limiting examples of catalysts include POLYCAT® 8, N,N-dimethylcyclohexylamine from Evonik Industries, POLYCAT® 5, pentamethyldiethylenetriamine from Evonik Industries, and CURITHANE® 52, 2-methyl(n-methyl amino b-sodium acetate nonyl phenol) from Evonik Industries, POLYCAT® 30 (Evonik Industries), POLYCAT® 36 (Evonik Industries), POLYCAT® 46 (Evonik Industries), POLYCAT® 77 (Evonik Industries), Dabco® 2039 (Evonik Industries), Dabco® 204 (Evonik Industries), Dabco® 2040 (Evonik Industries), Dabco® BL-19 (Evonik Industries), Dabco® BL-17 (Evonik Industries), Dabco® T (Evonik Industries), Dabco® T-125 (Evonik Industries), Dabco® K-15 (Evonik Industries), Dabco® TMR (Evonik Industries), Dabco® TMR-2 (Evonik Industries), Dabco® TMR-3 (Evonik Industries), Dabco® TMR-30 (Evonik Industries), Bicat® 8210 (The Shepard Chemical Company, Cincinnati, Ohio), Bicat® 8840 (The Shepard Chemical Company, Cincinnati, Ohio), Bicat® 8842 (The Shepard Chemical Company, Cincinnati, Ohio), K-Kat® XK 651 (King Industries, Norwalk, Conn.), K-Kat® 614 (King Industries, Norwalk, Conn.), K-Kat® 672 (King Industries, Norwalk, Conn.), K-Kat® 604 (King Industries, Norwalk, Conn.), Niax® UL1 (Momentive Performance Materials Inc., Waterford, N.Y.), Niax® UL22, Niax® UL1 (Momentive Performance Materials Inc., Waterford, N.Y., Jeffamine® D-230 (Huntsman, The Woodlands, Tex.), Jeffamine® T403 (Huntsman, The Woodlands, Tex.), Jeffamine® D2000 (Huntsman, The Woodlands, Tex.), Jeffamine® T5000 (Huntsman, The Woodlands, Tex.), Jeffcat® PMDETA (Huntsman, The Woodlands, Tex.), Jeffcat® DMCHA (Huntsman, The Woodlands, Tex.), ZF20 (Huntsman, The Woodlands, Tex.), ZF54 (Huntsman, The Woodlands, Tex.), tin, dibutyltin mercaptide, potassium octoate, potassium acetate, bismuth, bismuth carboxylate mixtures, and the like.

In some embodiments, the foamable composition comprises a surfactant. Suitable surfactants can comprise a liquid or solid organosilicone compound. Other surfactants include polyethylene glycol ethers of long chain alcohols, tertiary amine or alkanolamine salts of long chain alkyl acid sulfate esters, alkyl sulfonic esters, and alkyl arylsulfonic acids. In some embodiments, the surfactant is a silicone surfactant. In some embodiments, the surfactant is a silicone polyether surfactant. In some embodiments, the surfactant is Dabco® DC5585.

In some embodiments, the foamable composition comprises a flame retardant agent. Useful flame retardant agents include, but are not limited to, tris(2-chloroethyl) phosphate, tris(2-chloropropyl) phosphate, tris(1-chloro-2-propyl) phosphate (TCPP), tris(2,3-dibromopropyl) phosphate, tris (1,3-dichloropropyl) phosphate, diammonium phosphate, halogenated aromatic compounds, antimony oxide, aluminum trihydrate, polyvinyl chloride, bromine-containing diester/ether diols of tetrabromophthalic anhydride, such as a mixed ester of tetrabromophthalic anhydride with diethylene glycol and propylene glycol. Exemplary commercially available flame retardant agents include Saytex® RB-79, a reactive bromine-containing diester/ether diol of tetrabromophthalic anhydride (Albemarle Corporation, Baton Rouge, La.). In some embodiments, the flame retardant agent is tris(1-chloro-2-propyl) phosphate (TCPP).

In some embodiments, the foamable composition comprises a nucleating agent. Nucleating agents serve primarily to increase cell count and decrease cell size in the foam, and can be used in an amount of about 0.1 to about 10 parts by weight per 100 parts by weight of the resin. Typical nucleating agents comprise at least one member selected from the group consisting of talc, sodium bicarbonate-citric acid mixtures, calcium silicate, and carbon dioxide, among others. In some embodiments, the foamable composition does not comprise a nucleating agent. In some embodiments, the processes provided herein are performed in the absence of a nucleating agent. Exemplary nucleating agents include, but art not limited to, talc, sodium bicarbonate-citric acid mixtures, calcium silicate, carbon dioxide, and the like.

In some embodiments, the foamable composition comprises water. In some embodiments, the foamable composition comprises E-CF$_3$CH=CHCF$_3$, cyclopentane, and water.

In some embodiments, the foamable composition comprises E-CF$_3$CH=CHCF$_3$, cyclopentane, and water, wherein the E-CF$_3$CH=CHCF$_3$ is present at about 1 mol % to about 50 mol % of the total amount of E-CF$_3$CH=CHCF$_3$, cyclopentane, and water present in the foamable composition, for example, about 1 mol % to about 30 mol %, about 1 mol % to about 10 mol %, about 10 mol % to about 50 mol %, about 10 mol % to about 30 mol %, or about 30 mol % to about 50 mol %.

In some embodiments, the foamable composition comprises E-CF$_3$CH=CHCF$_3$, cyclopentane, and water, wherein the E-CF$_3$CH=CHCF$_3$ is present at about 10 mol % to about 50 mol % of the total amount of E-CF$_3$CH=CHCF$_3$, cyclopentane, and water present in the foamable composition.

In some embodiments, the foamable composition comprises E-CF$_3$CH=CHCF$_3$, cyclopentane, and water, wherein the E-CF$_3$CH=CHCF$_3$ is present at about 1 mol % to about 30 mol % of the total amount of E-CF$_3$CH=CHCF$_3$, cyclopentane, and water present in the foamable composition.

In some embodiments, the foamable composition comprises E-CF$_3$CH=CHCF$_3$, cyclopentane, and water, wherein the E-CF$_3$CH=CHCF$_3$ is present at about 10 mol % to about 30 mol % of the total amount of E-CF$_3$CH=CHCF$_3$, cyclopentane, and water present in the foamable composition.

In some embodiments, the foamable composition comprises about 0.3 to about 16.5 weight percent E-CF$_3$CH=CHCF$_3$, about 6.9 to about 13.5 weight percent cyclopentane, at least one polyol, at least one catalyst, at least one surfactant, water, at least one flame retardant agent, and at least one nucleating agent described herein.

In some embodiments, the foamable composition comprises about 0.3 to about 16.5 weight percent E-CF$_3$CH=CHCF$_3$, about 6.9 to about 13.5 weight percent cyclopentane, at least one polyol, at least one catalyst, at least one surfactant, water, and at least one flame retardant agent described herein.

In some embodiments, the foamable composition comprises about 3.5 to about 16.5 weight percent E-CF$_3$CH=CHCF$_3$, about 6.9 to about 13.5 weight percent cyclopentane, at least one polyol, at least one catalyst, at least one surfactant, water, at least one flame retardant agent, and at least one nucleating agent described herein.

In some embodiments, the foamable composition comprises about 3.5 to about 16.5 weight percent E-CF$_3$CH=CHCF$_3$, about 6.9 to about 13.5 weight percent cyclopentane, at least one polyol, at least one catalyst, at least one surfactant, water, and at least one flame retardant agent described herein.

In some embodiments, the foamable composition provided herein comprises about 3.5 to about 16.5 weight percent E-CF$_3$CH=CHCF$_3$, about 6.9 to about 13.5 weight percent cyclopentane, a polyol which is Stepanpol® PS-2352, a surfactant which is Dabco® DC5585, an amine catalyst which is Polycat® 36, a metal catalyst which is Dabco® TMR-20, and a flame retardant which is TCPP.

In some embodiments, the foamable composition provided herein comprises about 3.5 to about 16.25 weight percent of a mixture of E-CF$_3$CH=CHCF$_3$ and Z—CF$_3$CH=CHCF$_3$, about 6.9 to about 13.5 weight percent cyclopentane, a polyol which is Stepanpol® PS-2352, a surfactant which is Dabco® DC5585, an amine catalyst which is Polycat® 36, a metal catalyst which is Dabco® TMR-20, and a flame retardant which is TCPP.

In some embodiments, the foamable composition provided herein comprises about 3.5 to about 16.25 weight percent of a mixture of E-CF$_3$CH=CHCF$_3$ and Z—CF$_3$CH=CHCF$_3$, about 6.5 to about 14.0 weight percent isopentane, a polyol which is Stepanpol® PS-2352, a surfactant which is Dabco® DC5585, an amine catalyst which is Polycat® 36, a metal catalyst which is Dabco® TMR-20, and a flame retardant which is TCPP.

In some embodiments, the foamable composition provided herein comprises about 3.5 to about 16.25 weight percent of a mixture of E-CF$_3$CH=CHCF$_3$ and Z—CF$_3$CH=CHCF$_3$, about 6.5 to about 14.0 weight percent n-pentane, a polyol which is Stepanpol® PS-2352, a surfactant which is Dabco® DC5585, an amine catalyst which is Polycat® 36, a metal catalyst which is Dabco® TMR-20, and a flame retardant which is TCPP.

In some embodiments, the foamable composition comprises E-CF$_3$CH=CHCF$_3$, E-CHCl=CHCF$_3$, cyclopentane, and water, wherein the composition comprises about 1 mol % to about 50 mol % of a mixture of E-CF$_3$CH=CHCF$_3$ and E-CHCl=CHCF$_3$ relative to the total amount of E-CF$_3$CH=CHCF$_3$, E-CHCl=CHCF$_3$, cyclopentane, and water present in the foamable composition, for example, about 1 mol % to about 30 mol %, about 1 mol % to about 10 mol %, about 10 mol % to about 50 mol %, about 10 mol % to about 30 mol %, or about 30 mol % to about 50 mol %.

In some embodiments, the foamable composition comprises E-CF$_3$CH=CHCF$_3$, E-CHCl=CHCF$_3$, cyclopentane, and water, wherein the composition comprises about 10 mol % to about 50 mol % of a mixture of E-CF$_3$CH=CHCF$_3$ and E-CHCl=CHCF$_3$ relative to the total amount of E-CF$_3$CH=CHCF$_3$, E-CHCl=CHCF$_3$, cyclopentane, and water present in the foamable composition.

In some embodiments, the foamable composition comprises E-CF$_3$CH=CHCF$_3$, E-CHCl=CHCF$_3$, cyclopentane, and water, wherein the composition comprises about 1 mol % to about 30 mol % of a mixture of E-CF$_3$CH=CHCF$_3$ and E-CHCl=CHCF$_3$ relative to the total amount of E-CF$_3$CH=CHCF$_3$, E-CHCl=CHCF$_3$, cyclopentane, and water present in the foamable composition.

In some embodiments, the foamable composition comprises E-CF$_3$CH=CHCF$_3$, E-CHCl=CHCF$_3$, cyclopentane, and water, wherein the composition comprises about 10 mol % to about 30 mol % of a mixture of E-CF$_3$CH=CHCF$_3$ and E-CHCl=CHCF$_3$ relative to the total amount of E-CF$_3$CH=CHCF$_3$, E-CHCl=CHCF$_3$, cyclopentane, and water present in the foamable composition.

In some embodiments, the foamable composition comprises E-CF$_3$CH=CHCF$_3$, E-CHCl=CHCF$_3$, isopentane, and water, wherein the composition comprises about 10 mol % to about 50 mol % of a mixture of E-CF$_3$CH=CHCF$_3$ and E-CHCl=CHCF$_3$ relative to the total amount of E-CF$_3$CH=CHCF$_3$, E-CHCl=CHCF$_3$, isopentane, and water present in the foamable composition.

In some embodiments, the foamable composition comprises E-CF$_3$CH=CHCF$_3$, E-CHCl=CHCF$_3$, isopentane, and water, wherein the composition comprises about 1 mol % to about 30 mol % of a mixture of E-CF$_3$CH=CHCF$_3$ and E-CHCl=CHCF$_3$ relative to the total amount of E-CF$_3$CH=CHCF$_3$, E-CHCl=CHCF$_3$, isopentane, and water present in the foamable composition.

In some embodiments, the foamable composition comprises E-CF$_3$CH=CHCF$_3$, E-CHCl=CHCF$_3$, isopentane, and water, wherein the composition comprises about 10 mol % to about 30 mol % of a mixture of E-CF$_3$CH=CHCF$_3$ and E-CHCl=CHCF$_3$ relative to the total amount of E-CF$_3$CH=CHCF$_3$, E-CHCl=CHCF$_3$, isopentane, and water present in the foamable composition.

In some embodiments, the foamable composition comprises E-CF$_3$CH=CHCF$_3$, E-CHCl=CHCF$_3$, n-pentane, and water, wherein the composition comprises about 10 mol % to about 50 mol % of a mixture of E-CF$_3$CH=CHCF$_3$ and E-CHCl=CHCF$_3$ relative to the total amount of E-CF$_3$CH=CHCF$_3$, E-CHCl=CHCF$_3$, n-pentane, and water present in the foamable composition.

In some embodiments, the foamable composition comprises E-CF$_3$CH=CHCF$_3$, E-CHCl=CHCF$_3$, n-pentane, and water, wherein the composition comprises about 1 mol % to about 30 mol % of a mixture of E-CF$_3$CH=CHCF$_3$ and E-CHCl=CHCF$_3$ relative to the total amount of E-CF$_3$CH=CHCF$_3$, E-CHCl=CHCF$_3$, n-pentane, and water present in the foamable composition.

In some embodiments, the foamable composition comprises E-CF$_3$CH=CHCF$_3$, E-CHCl=CHCF$_3$, n-pentane, and water, wherein the composition comprises about 10 mol % to about 30 mol % of a mixture of E-CF$_3$CH=CHCF$_3$ and E-CHCl=CHCF$_3$ relative to the total amount of E-CF$_3$CH=CHCF$_3$, E-CHCl=CHCF$_3$, n-pentane, and water present in the foamable composition.

In some embodiments, the foamable composition comprises Z—CF$_3$CH=CHCF$_3$, E-CHCl=CHCF$_3$, cyclopentane, and water, wherein the composition comprises about 1 mol % to about 50 mol % of a mixture of Z—CF$_3$CH=CHCF$_3$ and E-CHCl=CHCF$_3$ relative to the total amount of Z—CF$_3$CH=CHCF$_3$, E-CHCl=CHCF$_3$, cyclopentane, and water present in the foamable composition, for example, about 1 mol % to about 30 mol %, about 1 mol % to about 10 mol %, about 10 mol % to about 50 mol %, about 10 mol % to about 30 mol %, or about 30 mol % to about 50 mol %.

In some embodiments, the foamable composition comprises Z—CF$_3$CH=CHCF$_3$, E-CHCl=CHCF$_3$, cyclopentane, and water, wherein the composition comprises about 10 mol % to about 50 mol % of a mixture of Z—CF$_3$CH=CHCF$_3$ and E-CHCl=CHCF$_3$ relative to the total amount of Z—CF$_3$CH=CHCF$_3$, E-CHCl=CHCF$_3$, cyclopentane, and water present in the foamable composition.

In some embodiments, the foamable composition comprises Z—CF$_3$CH=CHCF$_3$, E-CHCl=CHCF$_3$, cyclopentane, and water, wherein the composition comprises about 1 mol % to about 30 mol % of a mixture of Z—CF$_3$CH=CHCF$_3$ and E-CHCl=CHCF$_3$ relative to the total amount of Z—CF$_3$CH=CHCF$_3$, E-CHCl=CHCF$_3$, cyclopentane, and water present in the foamable composition.

In some embodiments, the foamable composition comprises Z—CF$_3$CH=CHCF$_3$, E-CHCl=CHCF$_3$, cyclopentane, and water, wherein the composition comprises about 10 mol % to about 30 mol % of a mixture of Z—CF$_3$CH=CHCF$_3$ and E-CHCl=CHCF$_3$ relative to the total amount of Z—CF$_3$CH=CHCF$_3$, E-CHCl=CHCF$_3$, cyclopentane, and water present in the foamable composition.

In some embodiments, the foamable composition comprises Z—CF$_3$CH=CHCF$_3$, E-CHCl=CHCF$_3$, isopentane, and water, wherein the composition comprises about 10 mol % to about 50 mol % of a mixture of Z—CF$_3$CH=CHCF$_3$ and E-CHCl=CHCF$_3$ relative to the total amount of Z—CF$_3$CH=CHCF$_3$, E-CHCl=CHCF$_3$, isopentane, and water present in the foamable composition.

In some embodiments, the foamable composition comprises Z—CF$_3$CH=CHCF$_3$, E-CHCl=CHCF$_3$, isopentane, and water, wherein the composition comprises about 1 mol % to about 30 mol % of a mixture of Z—CF$_3$CH=CHCF$_3$ and E-CHCl=CHCF$_3$ relative to the total amount of Z—CF$_3$CH=CHCF$_3$, E-CHCl=CHCF$_3$, isopentane, and water present in the foamable composition.

In some embodiments, the foamable composition comprises Z—CF$_3$CH=CHCF$_3$, E-CHCl=CHCF$_3$, isopentane, and water, wherein the composition comprises about 10 mol % to about 30 mol % of a mixture of Z—CF$_3$CH=CHCF$_3$ and E-CHCl=CHCF$_3$ relative to the total amount of Z—CF$_3$CH=CHCF$_3$, E-CHCl=CHCF$_3$, isopentane, and water present in the foamable composition.

In some embodiments, the foamable composition comprises E-CF$_3$CH=CHCF$_3$, E-CHCl=CHCF$_3$, n-pentane, and water, wherein the composition comprises about 10 mol % to about 50 mol % of a mixture of Z—CF$_3$CH=CHCF$_3$ and E-CHCl=CHCF$_3$ relative to the total amount of Z—CF$_3$CH=CHCF$_3$, E-CHCl=CHCF$_3$, n-pentane, and water present in the foamable composition.

In some embodiments, the foamable composition comprises Z—CF$_3$CH=CHCF$_3$, E-CHCl=CHCF$_3$, n-pentane, and water, wherein the composition comprises about 1 mol % to about 30 mol % of a mixture of Z—CF$_3$CH=CHCF$_3$ and E-CHCl=CHCF$_3$ relative to the total amount of Z—CF$_3$CH=CHCF$_3$, E-CHCl=CHCF$_3$, n-pentane, and water present in the foamable composition.

In some embodiments, the foamable composition comprises Z—CF$_3$CH=CHCF$_3$, E-CHCl=CHCF$_3$, n-pentane, and water, wherein the composition comprises about 10 mol % to about 30 mol % of a mixture of Z—CF$_3$CH=CHCF$_3$ and E-CHCl=CHCF$_3$ relative to the total amount of Z—CF$_3$CH=CHCF$_3$, E-CHCl=CHCF$_3$, n-pentane, and water present in the foamable composition.

In some embodiments, the foamable composition comprises about 3.0 to about 15.0 weight percent of a mixture of E-CF$_3$CH=CHCF$_3$ and E-CHCl=CHCF$_3$, about 6.5 to about 14.0 weight percent cyclopentane, at least one polyol, at least one catalyst, at least one surfactant, water, at least one flame retardant agent, and at least one nucleating agent described herein.

In some embodiments, the foamable composition comprises about 3.0 to about 15.0 weight percent of a mixture of E-CF$_3$CH=CHCF$_3$ and E-CHCl=CHCF$_3$, about 6.5 to about 14.0 weight percent cyclopentane, at least one polyol, at least one catalyst, at least one surfactant, water, and at least one flame retardant agent described herein.

In some embodiments, the foamable composition provided herein comprises 3.0 to about 15.0 weight percent of a mixture of E-CF$_3$CH=CHCF$_3$ and E-CHCl=CHCF$_3$, about 6.5 to about 14.0 weight percent cyclopentane, a polyol which is Stepanpol® PS-2352, a surfactant which is Dabco® DC5585, an amine catalyst which is Polycat® 36, a metal catalyst which is Dabco® TMR-20, and a flame retardant which is TCPP.

In some embodiments, the foamable composition comprises about 3.0 to about 15.0 weight percent of a mixture of E-CF$_3$CH=CHCF$_3$ and E-CHCl=CHCF$_3$, about 6.5 to about 14.0 weight percent isopentane, at least one polyol, at least one catalyst, at least one surfactant, water, at least one flame retardant agent, and at least one nucleating agent described herein.

In some embodiments, the foamable composition comprises about 3.0 to about 15.0 weight percent of a mixture of E-CF$_3$CH=CHCF$_3$ and E-CHCl=CHCF$_3$, about 6.5 to about 14.0 weight percent isopentane, at least one polyol, at least one catalyst, at least one surfactant, water, and at least one flame retardant agent described herein.

In some embodiments, the foamable composition provided herein comprises 3.0 to about 15.0 weight percent of a mixture of E-CF$_3$CH=CHCF$_3$ and E-CHCl=CHCF$_3$, about 6.5 to about 14.0 weight percent isopentane, a polyol which is Stepanpol® PS-2352, a surfactant which is Dabco® DC5585, an amine catalyst which is Polycat® 36, a metal catalyst which is Dabco® TMR-20, and a flame retardant which is TCPP.

In some embodiments, the foamable composition comprises about 3.0 to about 15.0 weight percent of a mixture of E-CF$_3$CH=CHCF$_3$ and E-CHCl=CHCF$_3$, about 6.5 to about 14.0 weight percent n-pentane, at least one polyol, at least one catalyst, at least one surfactant, water, at least one flame retardant agent, and at least one nucleating agent described herein.

In some embodiments, the foamable composition comprises about 3.0 to about 15.0 weight percent of a mixture of E-CF$_3$CH=CHCF$_3$ and E-CHCl=CHCF$_3$, about 6.5 to about 14.0 weight percent n-pentane, at least one polyol, at least one catalyst, at least one surfactant, water, and at least one flame retardant agent described herein.

In some embodiments, the foamable composition provided herein comprises 3.0 to about 15.0 weight percent of a mixture of E-CF$_3$CH=CHCF$_3$ and E-CHCl=CHCF$_3$, about 6.5 to about 14.0 weight percent n-pentane, a polyol which is Stepanpol® PS-2352, a surfactant which is Dabco® DC5585, an amine catalyst which is Polycat® 36, a metal catalyst which is Dabco® TMR-20, and a flame retardant which is TCPP.

In some embodiments, the foamable composition comprises about 3.0 to about 15.0 weight percent of a mixture of Z—CF$_3$CH=CHCF$_3$ and E-CHCl=CHCF$_3$, about 6.5 to about 14.0 weight percent cyclopentane, at least one polyol, at least one catalyst, at least one surfactant, water, at least one flame retardant agent, and at least one nucleating agent described herein.

In some embodiments, the foamable composition comprises about 3.0 to about 15.0 weight percent of a mixture of Z—CF$_3$CH=CHCF$_3$ and E-CHCl=CHCF$_3$, about 6.5 to about 14.0 weight percent cyclopentane, at least one polyol, at least one catalyst, at least one surfactant, water, and at least one flame retardant agent described herein.

In some embodiments, the foamable composition provided herein comprises 3.0 to about 15.0 weight percent of a mixture of E-CF$_3$CH=CHCF$_3$ and E-CHCl=CHCF$_3$, about 6.5 to about 14.0 weight percent cyclopentane, a polyol which is Stepanpol® PS-2352, a surfactant which is Dabco® DC5585, an amine catalyst which is Polycat® 36, a metal catalyst which is Dabco® TMR-20, and a flame retardant which is TCPP.

In some embodiments, the foamable composition comprises about 3.0 to about 15.0 weight percent of a mixture of Z—CF$_3$CH=CHCF$_3$ and E-CHCl=CHCF$_3$, about 6.5 to about 14.0 weight percent isopentane, at least one polyol, at least one catalyst, at least one surfactant, water, at least one flame retardant agent, and at least one nucleating agent described herein.

In some embodiments, the foamable composition comprises about 3.0 to about 15.0 weight percent of a mixture of Z—CF$_3$CH=CHCF$_3$ and E-CHCl=CHCF$_3$, about 6.5 to about 14.0 weight percent isopentane, at least one polyol, at least one catalyst, at least one surfactant, water, and at least one flame retardant agent described herein.

In some embodiments, the foamable composition provided herein comprises 3.0 to about 15.0 weight percent of a mixture of Z—CF$_3$CH=CHCF$_3$ and E-CHCl=CHCF$_3$, about 6.5 to about 14.0 weight percent isopentane, a polyol which is Stepanpol® PS-2352, a surfactant which is Dabco® DC5585, an amine catalyst which is Polycat® 36, a metal catalyst which is Dabco® TMR-20, and a flame retardant which is TCPP.

In some embodiments, the foamable composition comprises about 3.0 to about 15.0 weight percent of a mixture of Z—CF$_3$CH=CHCF$_3$ and E-CHCl=CHCF$_3$, about 6.5 to about 14.0 weight percent n-pentane, at least one polyol, at least one catalyst, at least one surfactant, water, at least one flame retardant agent, and at least one nucleating agent described herein.

In some embodiments, the foamable composition comprises about 3.0 to about 15.0 weight percent of a mixture of Z—CF$_3$CH=CHCF$_3$ and E-CHCl=CHCF$_3$, about 6.5 to about 14.0 weight percent n-pentane, at least one polyol, at least one catalyst, at least one surfactant, water, and at least one flame retardant agent described herein.

In some embodiments, the foamable composition provided herein comprises 3.0 to about 15.0 weight percent of a mixture of Z—CF$_3$CH=CHCF$_3$ and E-CHCl=CHCF$_3$, about 6.5 to about 14.0 weight percent n-pentane, a polyol which is Stepanpol® PS-2352, a surfactant which is Dabco® DC5585, an amine catalyst which is Polycat® 36, a metal catalyst which is Dabco® TMR-20, and a flame retardant which is TCPP.

In some embodiments, the method of process of forming a foam comprises: (a) adding a foamable disclosed herein (e.g., a B-side composition) to a composition comprising an isocyanate (e.g., an A-side composition); and (b) reacting the compositions under conditions effective to form a foam. The isocyanate or isocyanate-containing mixture can include the isocyanate and auxiliary chemicals, like catalysts, surfactants, stabilizers, chain extenders, cross-linkers, water, fire retardants, smoke suppressants, pigments, coloring materials, fillers, etc. In some embodiments, the isocyanate is PAPI-27. Any of the methods well known in the art, such as those described in "Polyurethanes Chemistry and Technology," Volumes I and II, Saunders and Frisch, 1962, John Wiley and Sons, New York, N.Y., which is incorporated herein by reference, can be used or adapted for use in accordance with the compositions disclosed herein.

In the process of making a polyisocyanate-based foam, the polyol(s), polyisocyanate, and other components are contacted, thoroughly mixed, and permitted to expand and cure into a cellular polymer. The particular mixing apparatus is not critical, and various types of mixing head and spray apparatus are conveniently used. It is often convenient, but not necessary, to pre-blend certain of the raw materials prior to reacting the polyisocyanate and polyols. For example, it is often useful to prepare the foamable composition (e.g., the B-side composition) disclosed herein, and then contact this composition with the polyisocyanate.

In some embodiments, the foamable composition provided herein (e.g., a B-side composition) can be used to blow thermoplastic foams, such as polystyrene, polyethylene foams, including low-density polyethylene foams, or polypropylene foams. Any of a wide range of conventional methods for blowing such thermoplastic foams can be adapted for use herein. Thus, disclosed herein are thermoplastic foams, such as polystyrene, polyethylene (PE), for example, low density PE, or polypropylene (PP), formed using the foamable compositions disclosed herein.

The thermoplastic foam bodies can be produced using conventional equipment comprising an extruder and associated means for (1) melting the resin; (2) homogeneously blending the foamable composition described herein (e.g., the B-side composition) with the melt to form a plasticized mass at non-foaming temperatures and pressures; (3) passing the plasticized mass at a controlled rate, temperature and pressure through a die having a desired shape, e.g., slit die for producing rectangular slabs of foam board having desired thickness and surface area, into an expansion zone; (4) allowing the extrudate to foam in the expansion zone maintainable at suitable temperatures and low pressures; (5) maintaining the expanding extrudate under such temperatures and pressures for a time sufficient for the viscosity of the extrudate to increase such that the cell size and density of the foam remain substantially unchanged and substantially free of ruptured cells at ambient temperature, e.g., 25° C. and atmospheric pressure; and (6) recovering the extruded foam body.

It is understood that the present application further provides a foamable composition as described herein. In some embodiments, the foamable composition described herein is useful in one or more of the processes described herein.

Foams

The present application further provides a foam prepared according to one or more processes provided herein. The types of foam produced can include, for example, closed cell foams, open cell foams, rigid foams, flexible foams, and integral skin. In some embodiments, disclosed herein are foams prepared from the foamable compositions (e.g., B-side compositions). In some embodiments, the foam is a spray foam. In some embodiments, the foam is a thermoset foam.

In some embodiments, the foam is a polyurethane foam or a polyisocyanurate foam. In some embodiments, the foam is a closed cell foam. In some embodiments, the foam is a closed cell polyisocyanurate foam. In some embodiments, the foam is a rigid closed cell polyisocyanurate foam. In some embodiments, the foam is a rigid closed cell polyurethane foam. In some embodiments, the rigid closed-cell celled polyisocyanate-based foams are useful in spray insulation, as foam-in-place appliance foams, rigid insulating board stock, or in laminates.

In some embodiments, the foams disclosed herein can be used in a wide variety of applications, including, but not limited to, appliance foams including refrigerator foams, freezer foams, refrigerator/freezer foams, panel foams, and other cold or cryogenic manufacturing applications. In some embodiments, the foams formed from the compositions disclosed herein have exceptional thermal performance, such as can be measured by the K-factor. "K-factor," as used herein, represents the foam's thermal conductivity or ability to conduct heat. The K-factor is a measure of heat that passes through one square foot of material that is one-inch-thick in one hour. Typically, the lower the K-factor, the better the insulation.

In some embodiments, the foam prepared according to a process provided herein has a K-factor of about 0.120 Btu in/ft$^2$·h·° F. or less at 20° F. (−6.7° C.).

In some embodiments, the foam prepared according to a process provided herein has a K-factor of from about 0.120 Btu in/ft$^2$·h·° F. to about 0.110 Btu in/ft$^2$·h·° F. at 20° F. (−6.7°).

In some embodiments, the foam prepared according to a process provided herein has a K-factor of about 0.137 Btu in/ft$^2$·h·° F. or less at 75° F. (24° C.).

In some embodiments, the foam prepared according to a process provided herein has a K-factor of from about 0.137 Btu in/ft$^2$·h·° F. to about 0.131 Btu in/ft$^2$·h·° F. at 75° F. (24° C.).

In some embodiments, the foam prepared according to a process provided herein has a K-factor of about 0.130 Btu in/ft$^2$·h·° F. or less at 75° F. (24° C.).

In some embodiments, the foam prepared according to a process provided herein has a K-factor of about 0.130 Btu in/ft$^2$·h·° F. to about 0.126 at 75° F. (24° C.).

In some embodiments, the foam prepared according to a process provided herein has a K-factor of about 0.124 Btu in/ft$^2$·h·° F. or less at 50° F. (10° C.).

In some embodiments, the foam prepared according to a process provided herein has a K-factor of about 0.124 Btu in/ft$^2$·h·° F. to about 0.117 at 50° F. (10° C.).

In some embodiments, the foam prepared according to a process provided herein has a K-factor of about 0.119 Btu in/ft$^2$·h·° F. or less at 20° F. (−6.7° C.).

In some embodiments, the foam prepared according to a process provided herein has a K-factor of about 0.119 Btu in/ft$^2$·h·° F. to about 0.110 at 2° F. (−6.7° C.).

In some embodiments, the foam prepared according to a process provided herein exhibits about 4% to about 30% improved K-factor compared to an analogous foam prepared using only a $C_5$ hydrocarbon (e.g., cyclopentane, isopentane, or n-pentane) as the blowing agent (i.e., an foam prepared using the same A-side+B-side mixture, wherein the B-side mixture does not contain E-CF$_3$CH═CHCF$_3$ (HFO-1336mzz-E), Z—CF$_3$CH═CHCF$_3$ (HFO-1336mzz-Z), E-CHCl═CHCF$_3$ (HCFO-1233zd-E), or any mixture thereof), for example, about 4% to about 20%, about 4% to about 15%, about 4% to about 10%, about 10% to about 30%, about 10% to about 20%, about 10% to about 15%, about 15% to about 30%, about 15% to about 20%, or about 20% to about 30% improved K-factor.

In some embodiments, the foams produced from the foamable compositions disclosed herein have a density of from about 2.5 to about 3.5 g/cm$^3$. For example, the foam can have a density of about 2.5, 2.6, 2.7, 2.8, 2.9, 3.0, 3.1, 3.2, 3.3, 3.4, or 3.5 g/cm$^3$.

Representative foamed products that can be made in accordance with the present disclosure include, for example: (1) polystyrene foam sheet for the production of disposable thermoformed packaging materials, e.g., as disclosed in U.S. Pat. No. 5,204,169; (2) extruded polystyrene foam boards for use as residential and industrial sheathing and roofing materials, which may be from about 0.5 to 6 inches (1.25 to 15 cm) thick, up to 4 feet (122 cm) wide, with cross-sectional areas of from 0.17 to 3 square feet (0.016 to 0.28 square meter), and up to 27 feet (813 meters) long, with densities of from about 1.5 to 10 pounds per cubic foot (pcf) (25 to 160 kilograms per cubic meter (kg/m$^3$); (3) expandable foams in the form of large billets which may be up to about 2 feet (61 cm) thick, often at least 1.5 feet 46 cm) thick, up to 4 feet (1.22 meters) wide, up to 16 feet (4.8 meters) long, having a cross-sectional area of about 2 to 8 square feet (0.19 to 0.74 square meter) and a density of from 6 to 15 pcf (96 to 240 kg/m$^3$). Such foamed products are more fully described by Stockdopole and Welsh in the Encyclopedia of Polymer Science and Engineering, vol. 16, pages 193-205, John Wiley & Sons, 1989; hereby incorporated by reference.

Examples

The present disclosure is further defined in the following Examples. It should be understood that these Examples, while indicating preferred embodiments, are given by way of illustration only. From the above discussion and these Examples, one skilled in the art can ascertain the preferred features, and without departing from the spirit and scope thereof, can make various changes and modifications to adapt it to various uses and conditions.

The following components were used in the Examples:

Polyol is Stepanpol® PS-2352, is an aromatic polyester polyol available from Stepan Company.

Surfactant is Dabco® DC5585, is a silicone polyether surfactant, available from Evonik Industries.

Amine Catalyst is Polycat® 36, is a tertiary amine catalyst, available from Evonik Industries, AG.

Metal Catalyst is Dabco® TMR-20, is a potassium-based catalyst, available from Evonik Industries.

Flame retardant is TCPP.

Isocyanate is PAPI-27 is a polymethylene polyphenylisocyanate containing MDI, available from DowDuPont Chemical Company.

The following "control" compositions are referenced throughout the Examples and were used as the basis for comparative analyses described in Example 4.

TABLE A

Control Compositions

| Ingredient (Pbw) | Cyclopentane Control | Isopentane Control | n-Pentane Control |
|---|---|---|---|
| Polyol | 100.00 | 100.00 | 100.00 |
| Surfactant | 2.25 | 2.25 | 2.25 |
| Amine Catalyst | 0.40 | 0.40 | 0.40 |
| Metal Catalyst | 2.75 | 2.75 | 2.75 |
| Flame retardant | 10.00 | 10.00 | 10.00 |
| Water | 0.40 | 0.40 | 0.40 |
| B-side with no Blowing Agent | 115.80 | 115.80 | 115.80 |
| Cyclopentane | 20.95 | — | — |
| Isopentane | — | 21.55 | — |
| n-Pentane | — | — | 21.55 |
| Total B-side with Blowing Agent | 136.75 | — | — |
| Isocyanate (A-side) | 198.79 | 198.79 | 198.79 |
| Total A + B | 335.54 | 336.14 | 336.14 |

Example 1. General Preparation of A-Side and B-Side Compositions

The formulations described in the Examples were prepared using the parts per hundred polyol (pphp) method (i.e., parts by weight (pbw)). The prepared formulations had an ISO index of 300 and pbw to measured weight ratio of 0.85 and the adjusted blowing agent blends were kept constant on a total mole basis.

The B-side components were weighed on a mass balance and mixed together in a 1 L plastic beaker, then the physical blowing agents (e.g., the HFO and $C_5$ hydrocarbon) were chilled down below their respective boiling points. After cooling, the blowing agents were added to the B-side mixture until fully incorporated.

The Isocyanate (A-side), primarily PAPI 27, was weighed in a 500 mL plastic beaker with an extra 15 weight percent (wt %) for sufficient head-room pouring. After weighing the A-side and B-side, the A-side was poured into the B-side mixture.

Tables 1-5 show a summary of formulations (A-side and B-side formulations) prepared as described above.

TABLE 1

| Ingredient (Pbw)[a] | 1A | 1B | 1C | 1D | 1E |
|---|---|---|---|---|---|
| Polyol | 100.00 | 100.00 | 100.00 | 100.00 | 100.00 |
| Surfactant | 2.25 | 2.25 | 2.25 | 2.25 | 2.25 |
| Amine Catalyst | 0.40 | 0.40 | 0.40 | 0.40 | 0.40 |
| Metal Catalyst | 2.75 | 2.75 | 2.75 | 2.75 | 2.75 |
| Flame retardant | 10.00 | 10.00 | 10.00 | 10.00 | 10.00 |
| Water | 0.40 | 0.40 | 0.40 | 0.40 | 0.40 |
| B-side with no Blowing Agent | 115.80 | 115.80 | 115.80 | 115.80 | 115.80 |
| HFO-1336mzz-Z | 0.00 | 0.50 | 4.90 | 14.70 | 24.50 |
| Cyclopentane | 20.95 | 20.74 | 18.86 | 14.67 | 10.48 |
| Total B-side with Blowing Agent | 136.75 | 137.04 | 139.56 | 145.17 | 150.78 |
| Isocyanate (A-side) | 198.79 | 198.79 | 198.79 | 198.79 | 198.79 |
| Total A + B | 335.54 | 335.83 | 338.35 | 343.96 | 349.57 |

[a]Compositions 1A-1E contain 0 wt %, 0.37 wt %, 3.51 wt %, 10.12 wt %, and 16.25 wt %, respectively, HFO-1336mzz-Z, with respect to the total B-side with blowing agent. The above weight percentages correspond to 0 mol %, 1 mol %, 10 mol %, 30 mol %, and 50 mol % HFO, respectively, relative to the total number mols of HFO + cyclopentane + water used to prepare each composition.

TABLE 2

| Ingredient (Pbw)[a] | 2A | 2B | 2C | 2D | 2E |
|---|---|---|---|---|---|
| Polyol | 100.00 | 100.00 | 100.00 | 100.00 | 100.00 |
| Surfactant | 2.25 | 2.25 | 2.25 | 2.25 | 2.25 |
| Amine Catalyst | 0.40 | 0.40 | 0.40 | 0.40 | 0.40 |
| Metal Catalyst | 2.75 | 2.75 | 2.75 | 2.75 | 2.75 |
| Flame retardant | 10.00 | 10.00 | 10.00 | 10.00 | 10.00 |
| Water | 0.40 | 0.40 | 0.40 | 0.40 | 0.40 |
| B-side with no Blowing Agent | 115.80 | 115.80 | 115.80 | 115.80 | 115.80 |
| HFO-1336mzz-E | 0.00 | 0.50 | 4.90 | 14.70 | 24.50 |
| Cyclopentane | 20.95 | 20.74 | 18.86 | 14.67 | 10.48 |
| Total B-side with Blowing Agent | 136.75 | 137.04 | 139.56 | 145.17 | 150.78 |
| Isocyanate (A-side) | 198.79 | 198.79 | 198.79 | 198.79 | 198.79 |
| Total A + B | 335.54 | 335.83 | 338.35 | 343.96 | 349.57 |

[a]Compositions 2A-2E contain 0 wt %, 0.37 wt %, 3.51 wt %, 10.12 wt %, and 16.25 wt %, respectively, HFO-1336mzz-E, with respect to the total B-side with blowing agent. The above weight percentages correspond to 0 mol %, 1 mol %, 10 mol %, 30 mol %, and 50 mol % HFO, respectively, relative to the total number mols of HFO + cyclopentane + water used to prepare each composition.

TABLE 3

| Ingredient (Pbw)[a] | 3A | 3B | 3C | 3D | 3E | 3F |
|---|---|---|---|---|---|---|
| Polyol | 100.00 | 100.00 | 100.00 | 100.00 | 100.00 | 100.00 |
| Surfactant | 2.25 | 2.25 | 2.25 | 2.25 | 2.25 | 2.25 |
| Amine Catalyst | 0.40 | 0.40 | 0.40 | 0.40 | 0.40 | 0.40 |
| Metal Catalyst | 2.75 | 2.75 | 2.75 | 2.75 | 2.75 | 2.75 |
| Flame retardant | 10.00 | 10.00 | 10.00 | 10.00 | 10.00 | 10.00 |
| Water | 0.40 | 0.40 | 0.40 | 0.40 | 0.40 | 0.40 |
| B-side no Blowing Agent | 115.80 | 115.80 | 115.80 | 115.80 | 115.80 | 115.80 |
| HCFO-1233zd-E | 0.00 | 0.50 | 3.90 | 11.69 | 19.49 | 24.56 |
| Cyclopentane | 20.95 | 20.74 | 18.86 | 14.67 | 10.48 | 7.75 |
| Total B-side with Blowing Agent | 136.75 | 137.04 | 138.56 | 142.16 | 145.77 | 148.11 |
| Isocyanate (A-side) | 198.79 | 198.79 | 198.79 | 198.79 | 198.79 | 198.79 |
| Total A + B | 335.54 | 335.83 | 337.35 | 340.95 | 344.56 | 346.90 |

[a]Compositions 3A-3E contain 0 wt %, 0.37 wt %, 2.81 wt %, 8.22 wt %, 13.37 wt %, and 16.58 wt % respectively, HCFO-1233zd-E, with respect to the total B-side with blowing agent. The above weight percentages correspond to 0 mol %, 1 mol %, 10 mol %, 30 mol %, 50 mol %, and 63 mol % HCFO, respectively, relative to the total number mols of HFO + cyclopentane + water used to prepare each composition.

TABLE 4

| Ingredient | HFO-1336mzz-Z | | | HFO-1336mzz-E | | | HCFO-1233zd-E | | |
|---|---|---|---|---|---|---|---|---|---|
| (Pbw)[a] | 4A | 4B | 4C | 5A | 5B | 5C | 6A | 6B | 6C |
| Polyol | 100.00 | 100.00 | 100.00 | 100.00 | 100.00 | 100.00 | 100.00 | 100.00 | 100.00 |
| Surfactant | 2.25 | 2.25 | 2.25 | 2.25 | 2.25 | 2.25 | 2.25 | 2.25 | 2.25 |
| Amine Catalyst | 0.40 | 0.40 | 0.40 | 0.40 | 0.40 | 0.40 | 0.40 | 0.40 | 0.40 |
| Metal Catalyst | 2.75 | 2.75 | 2.75 | 2.75 | 2.75 | 2.75 | 2.75 | 2.75 | 2.75 |
| Flame retardant | 10.00 | 10.00 | 10.00 | 10.00 | 10.00 | 10.00 | 10.00 | 10.00 | 10.00 |
| Water | 0.40 | 0.40 | 0.40 | 0.40 | 0.40 | 0.40 | 0.40 | 0.40 | 0.40 |
| B-side no Blowing Agent | 115.80 | 115.80 | 115.80 | 115.80 | 115.80 | 115.80 | 115.80 | 115.80 | 115.80 |
| 1336mzz-Z | 0.50 | 0.50 | 0.50 | — | — | — | — | — | — |
| 1336mzz-E | — | — | — | 0.50 | 0.50 | 0.50 | — | — | — |
| 1233zd-E | — | — | — | — | — | — | 0.50 | 0.50 | 0.50 |
| cyclopentane | 20.74 | — | — | 20.74 | — | — | 20.74 | — | — |
| iso-pentane | — | 21.33 | — | — | 21.33 | — | — | 21.33 | — |
| n-pentane | — | — | 21.33 | — | — | 21.33 | — | — | 21.33 |
| Total B-side with Blowing Agent | 137.04 | 137.63 | 137.63 | 137.04 | 137.63 | 137.63 | 137.04 | 137.63 | 137.63 |
| Isocyanate (A-side) | 198.79 | 198.79 | 198.79 | 198.79 | 198.79 | 198.79 | 198.79 | 198.79 | 198.79 |
| Total A + B | 335.83 | 336.42 | 336.42 | 335.83 | 336.42 | 336.42 | 335.83 | 336.42 | 336.42 |

[a]Compositions 4A-6C contain 0.37 wt % of the HFO or HCFO with respect to the total B-side with blowing agent.

TABLE 5

| Ingredient | 10 mole % HFO-1336mzz-Z + HFO-1336mzz-E | | | 30 mole % HFO-1336mzz-Z + HFO-1336mzz-E | | | 50 Mole % HFO-1336mzz-Z + HFO-1336mzz-E | | |
|---|---|---|---|---|---|---|---|---|---|
| (Pbw) | 7A | 7B | 7C | 8A | 8B | 8C | 9A | 9B | 9C |
| Polyol | 100.00 | 100.00 | 100.00 | 100.00 | 100.00 | 100.00 | 100.00 | 100.00 | 100.00 |
| Surfactant | 2.25 | 2.25 | 2.25 | 2.25 | 2.25 | 2.25 | 2.25 | 2.25 | 2.25 |
| Amine Catalyst | 0.40 | 0.40 | 0.40 | 0.40 | 0.40 | 0.40 | 0.40 | 0.40 | 0.40 |
| Metal Catalyst | 2.75 | 2.75 | 2.75 | 2.75 | 2.75 | 2.75 | 2.75 | 2.75 | 2.75 |
| Flame retardant | 10.00 | 10.00 | 10.00 | 10.00 | 10.00 | 10.00 | 10.00 | 10.00 | 10.00 |
| Water | 0.40 | 0.40 | 0.40 | 0.40 | 0.40 | 0.40 | 0.40 | 0.40 | 0.40 |
| B-side no Blowing Agent | 115.80 | 115.80 | 115.80 | 115.80 | 115.80 | 115.80 | 115.80 | 115.80 | 115.80 |
| 1336mzz-Z | 2.45 | 2.45 | 2.45 | 7.35 | 7.35 | 7.35 | 12.25 | 12.25 | 12.25 |
| 1336mzz-E | 2.45 | 2.45 | 2.45 | 7.35 | 7.35 | 7.35 | 12.25 | 12.25 | 12.25 |
| cyclopentane | 18.86 | — | — | 14.67 | — | — | 10.48 | — | — |
| iso-pentane | — | 19.4 | — | — | 15.09 | — | — | 10.78 | — |
| n-pentane | — | — | 19.4 | — | — | 15.09 | — | — | 10.78 |
| Total B-side with Blowing Agent | 139.56 | 140.1 | 140.1 | 145.17 | 145.59 | 145.59 | 150.78 | 151.08 | 151.08 |
| Isocyanate (A-side) | 198.79 | 198.79 | 198.79 | 198.79 | 198.79 | 198.79 | 198.79 | 198.79 | 198.79 |
| Total A + B | 338.35 | 338.89 | 338.89 | 343.9 | 344.38 | 344.38 | 349.57 | 349.87 | 349.87 |

[a]Compositions 7A-9C contain 10 mol %, 30 mol %, and 50 mol %, of a blend of HFO-1336mzz-Z + HFO-1336mzz-E, respectively, relative to the total number mols of HFO + C$_5$ alkane + water used to prepare each composition. Compositions 7A-7C contain 3.51 wt % HFO relative to the total B-side with blowing agent; compositions 8A-8C contain 10.13 wt % HFO relative to the total B-side with blowing agent; and compositions 9A-9C contain 16.25 wt % HFO relative to the total B-side with blowing agent.

Example 2. Analysis of Foam Properties

The resulting A+B mixtures described in Example 1 (i.e., A+B mixtures 1A-9C as described in Tables 1-5) were placed into a mixing head and mixed for 3 seconds at 4000 rpm. After mixing, the mixed A+B solution was quickly poured into a wax coated cardboard box. A timer was started to record the cream, gel, rise, and tack-free times of the resulting foam and the resulting data for the compositions 4A-6C are shown below in Table 6.

TABLE 6

| HFO/HCFO A + B Mixture Used to Prepare Foam | HFO-1336mzz-Z | | | HFO-1336mzz-E | | | HCFO-1233zd-E | | |
|---|---|---|---|---|---|---|---|---|---|
| | 4A | 4B | 4C | 5A | 5B | 5C | 6A | 6B | 6C |
| Cream (s) | 18 | 21 | 23 | 21 | 15 | 21 | 20 | 18 | 21 |
| Gel (s) | 30 | 53 | 44 | 36 | 43 | 44 | 28 | 44 | 41 |
| Rise (s) | 65 | 86 | 78 | 74 | 84 | 76 | 64 | 78 | 70 |
| Tack (s) | 67 | 115 | 105 | 75 | 95 | 80 | 65 | 117 | 75 |

The foams were placed under an air-hood for 24 h to completely finish the polyurethane reaction. Samples were cut into 6"×6"×1.5" blocks with a bandsaw cutting machine. These foam blocks were tested for thermal conductivity utilizing a heat flow meter per ASTM C-518. After testing, data values were compiled for analysis and are shown below in Tables 7-10.

TABLE 7

| A + B Mixture Used to Prepare Foam | HFO-1336mzz-Z | | | | |
|---|---|---|---|---|---|
| | 1A | 1B | 1C | 1D | 1E |
| K-factor at 75° F. (Btu in/ft^2 hr ° F.) | 0.1402 | 0.1378 | 0.1348 | 0.1321 | 0.1301 |
| K-factor at 50° F. (Btu in/ft^2 hr ° F.) | N/A | 0.1337 | N/A | N/A | N/A |
| K-factor at 20° F. (Btu in/ft^2 hr ° F.) | 0.1344 | 0.1306 | 0.1206 | 0.1177 | 0.1182 |

N/A = data not available

TABLE 8

| A + B Mixture Used to Prepare Foam | HFO-1336mzz-E | | | | |
|---|---|---|---|---|---|
| | 2A | 2B | 2C | 2D | 2E |
| K-factor at 75° F. (Btu in/ft^2 hr °F) | 0.1402 | 0.1368 | 0.1335 | 0.1310 | 0.1344 |
| K-factor at 50° F. (Btu in/ft^2 hr ° F.) | N/A | 0.1340 | N/A | N/A | N/A |
| K-factor at 20° F. (Btu in/ft^2 hr ° F.) | 0.1344 | 0.1309 | 0.1196 | 0.1119 | 0.1100 |

N/A = data not available

TABLE 9

| A + B Mixture Used to Prepare Foam | HCFO-1233zd-E | | | | | |
|---|---|---|---|---|---|---|
| | 3A | 3B | 3C | 3D | 3E | 3F |
| K-factor at 75° F. (Btu in/ft^2 hr ° F.) | 0.1402 | 0.1374 | 0.1396 | 0.1348 | 0.1326 | 0.1326 |
| K-factor at 50° F. (Btu in/ft^2 hr ° F.) | N/A | 0.1351 | N/A | N/A | N/A | N/A |

TABLE 9-continued

| A + B Mixture Used to Prepare Foam | HCFO-1233zd-E | | | | | |
|---|---|---|---|---|---|---|
| | 3A | 3B | 3C | 3D | 3E | 3F |
| K-factor at 20° F. (Btu in/ft^2 hr ° F.) | 0.1344 | 0.1329 | 0.1319 | 0.1224 | 0.1173 | 0.1173 |

N/A = data not available

TABLE 10

| A + B Mixture Used to Prepare Foam | HFO-1336mzz-Z + HFO-1336mzz-E | | | |
|---|---|---|---|---|
| | 1A | 7A | 8A | 9A |
| K-factor at 75° F. (Btu in/ft^2 hr ° F.) | 0.1415 | 0.1301 | 0.1267 | 0.1297 |
| K-factor at 50° F. (Btu in/ft^2 hr ° F.) | 0.1407 | 0.1241 | 0.1175 | 0.1186 |
| K-factor at 20° F. (Btu in/ft^2 hr ° F.) | 0.1382 | 0.1193 | 0.1107 | 0.1164 |

Figure 2:
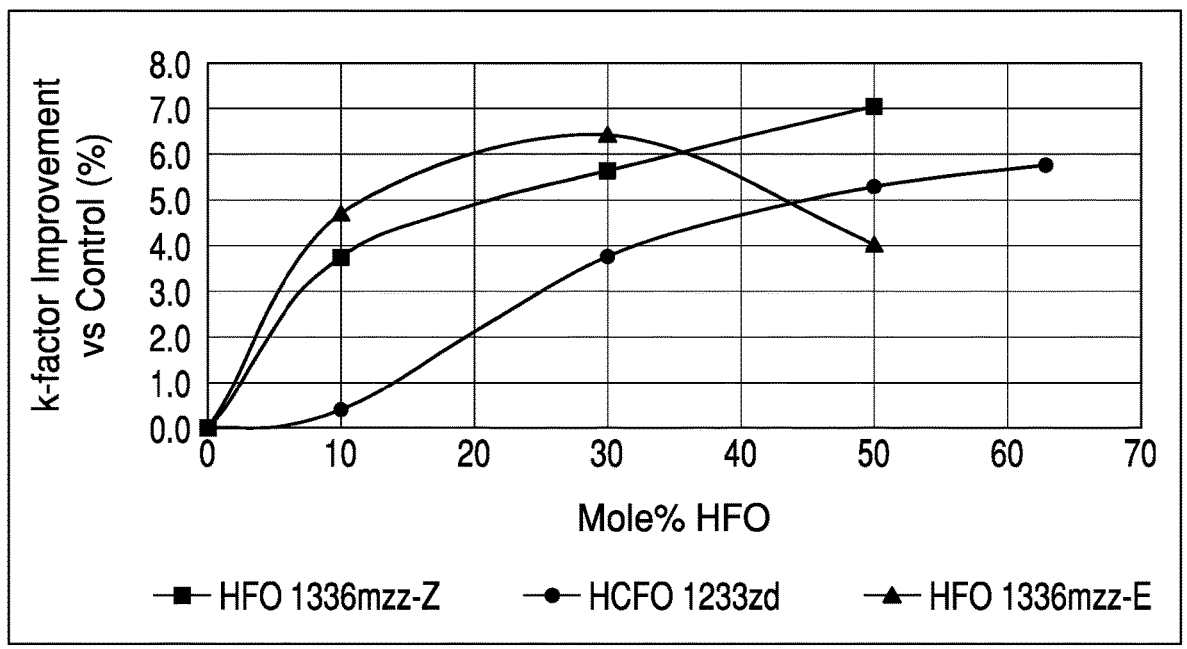
FIG. 2 shows improvement in thermal performance (K-factor at 75° F., 24° C.) of a foam as a function of the amount of HFO or HCFO used to prepare the B-side composition. The mole % shown is based on the total amount of HFO or HCFO, cyclopentane, and water used to prepare the B-side composition.
Figure 3:
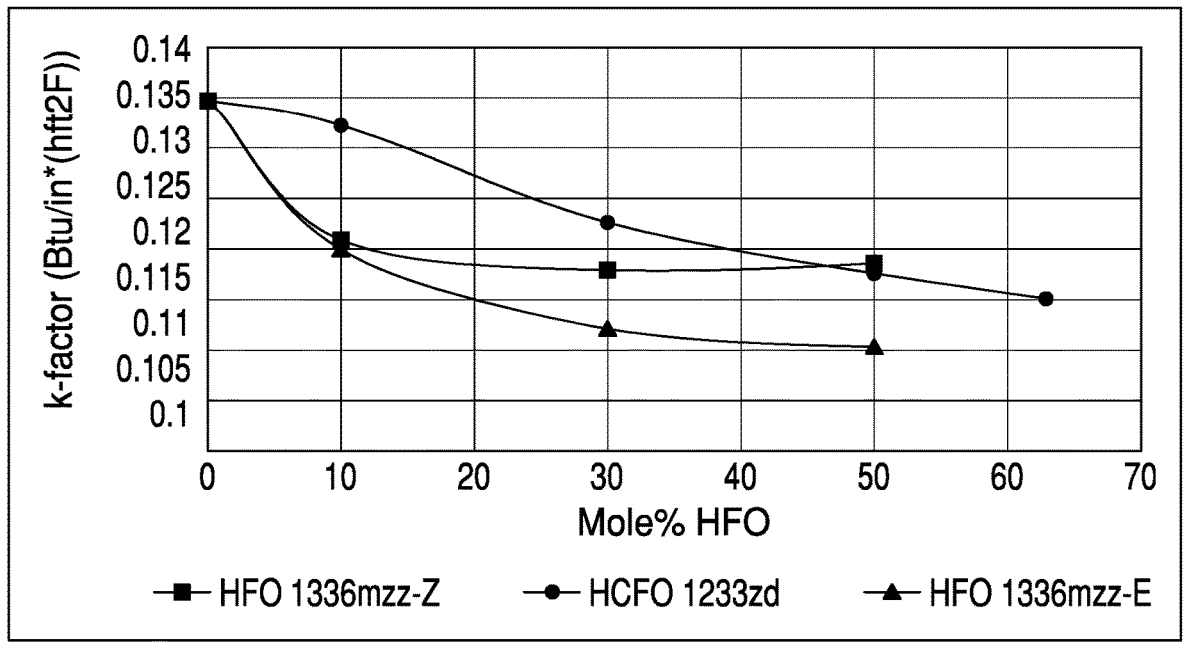
FIG. 3 shows the measured thermal performance (K-factor at 20° F., −6.7° C.) of a foam as a function of the amount of HFO or HCFO used to prepare the B-side composition. The mole % shown is based on the total amount of HFO or HCFO, cyclopentane, and water used to prepare the B-side composition.
Figure 4:
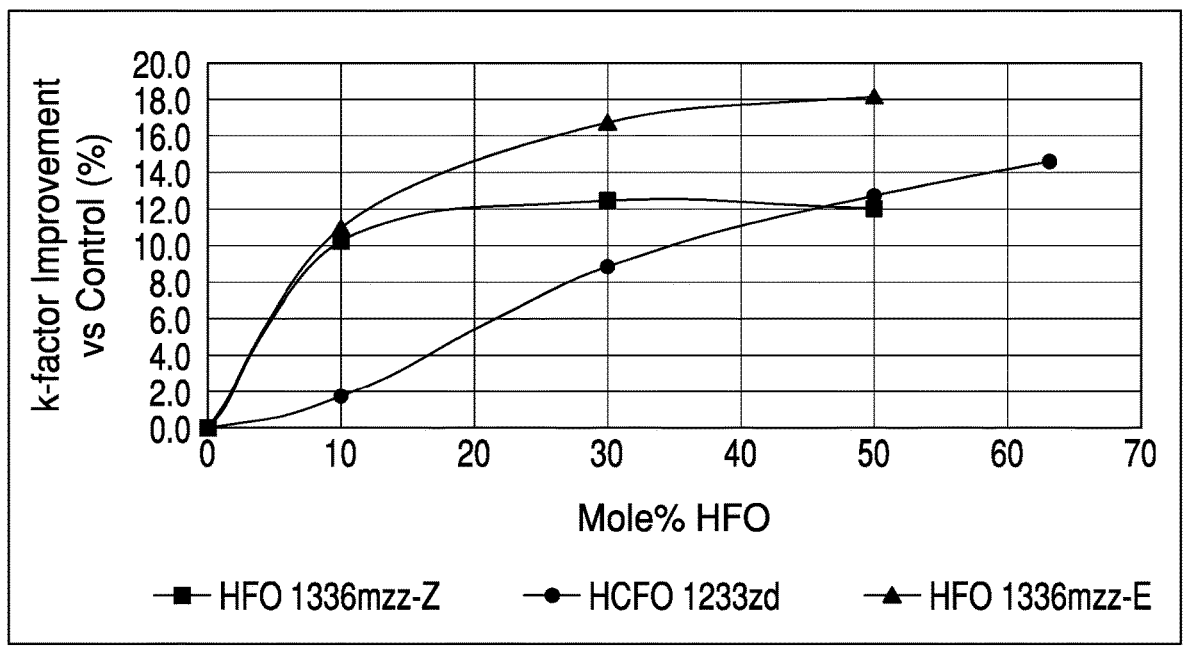
FIG. 4 shows improvement in thermal performance (K-factor at 20° F., −6.7° C.) of a foam as a function of the amount of HFO or HCFO used to prepare the B-side composition. The mole % shown is based on the total amount of HFO or HCFO, cyclopentane, and water used to prepare the B-side composition.
Figure 5:
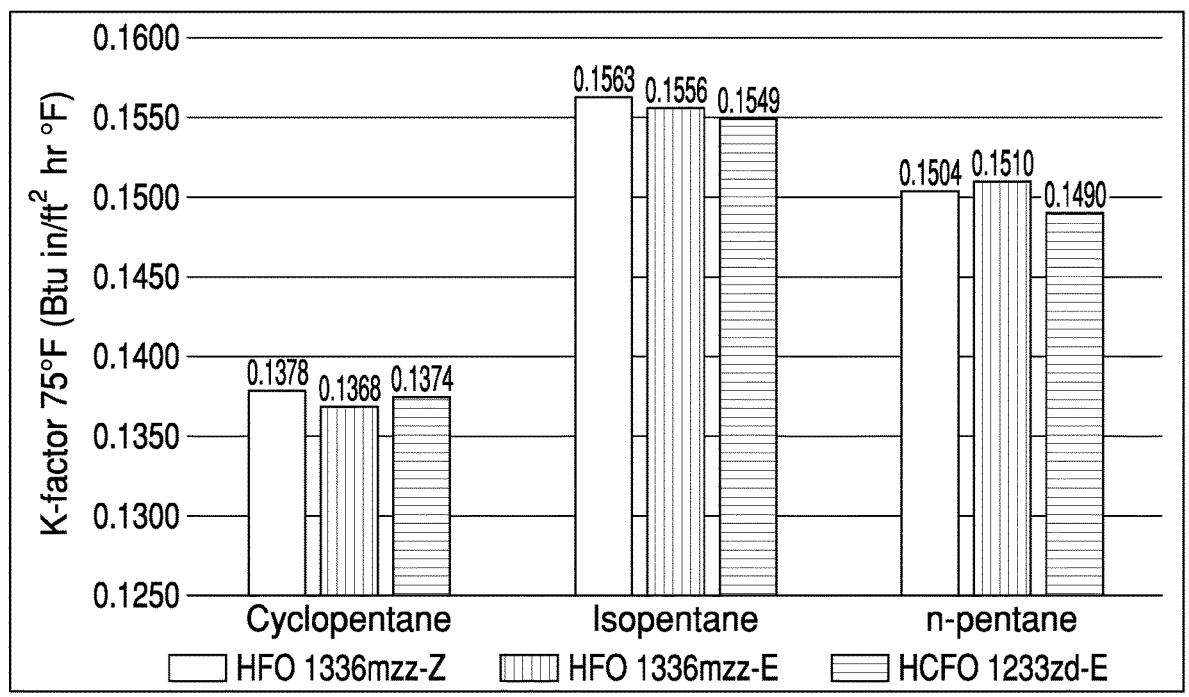
FIG. 5 shows the comparative thermal performance (K-factor at 75° F., 24° C.) of foams prepared from B-side compositions containing 0.37 wt % HFO or HCFO and cyclopentane, isopentane, or n-pentane.
Figure 6:
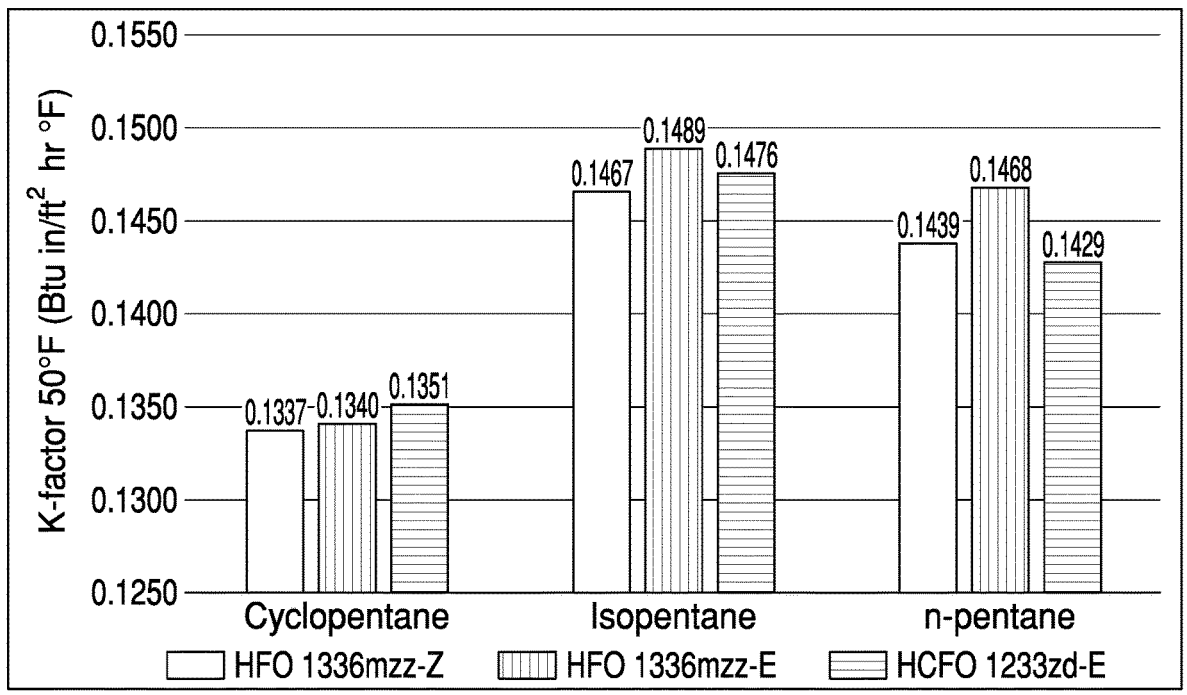
FIG. 6 shows the comparative thermal performance (K-factor at 50° F., 10° C.) of foams prepared from B-side compositions containing 0.37 wt % HFO or HCFO and cyclopentane, isopentane, or n-pentane.
Figure 7:
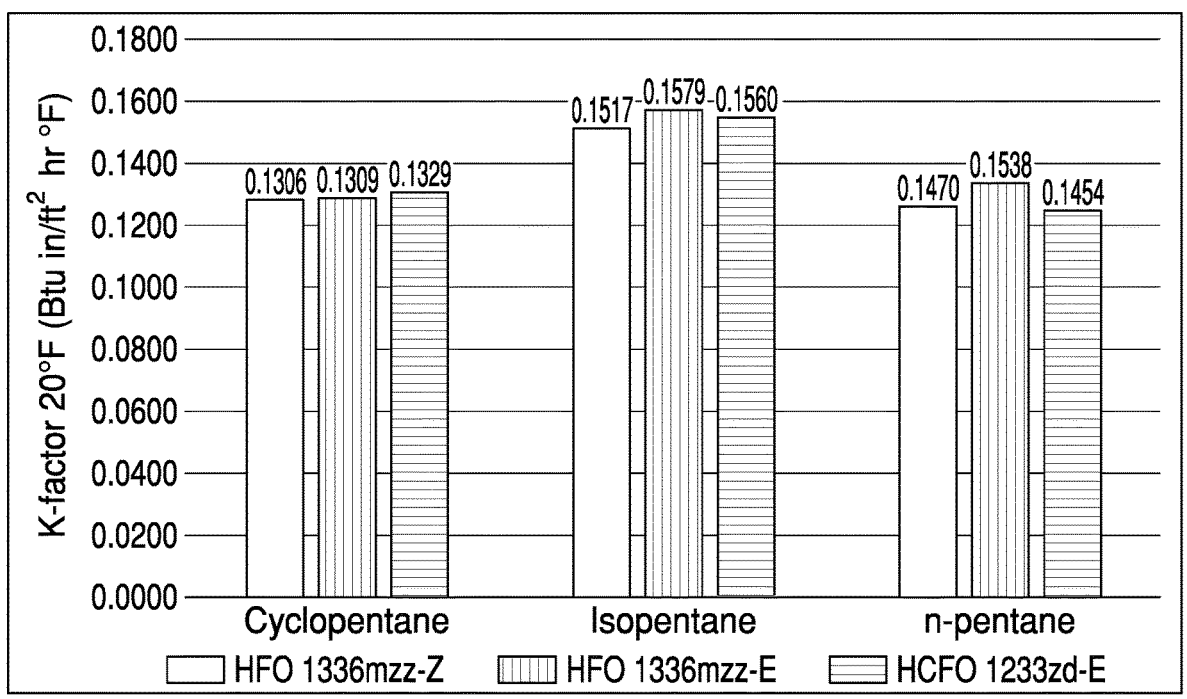
FIG. 7 shows the comparative thermal performance (K-factor at 20° F., −6.7° C.) of foams prepared from B-side compositions containing 0.37 wt % HFO or HCFO and cyclopentane, isopentane, or n-pentane.
Figure 8:
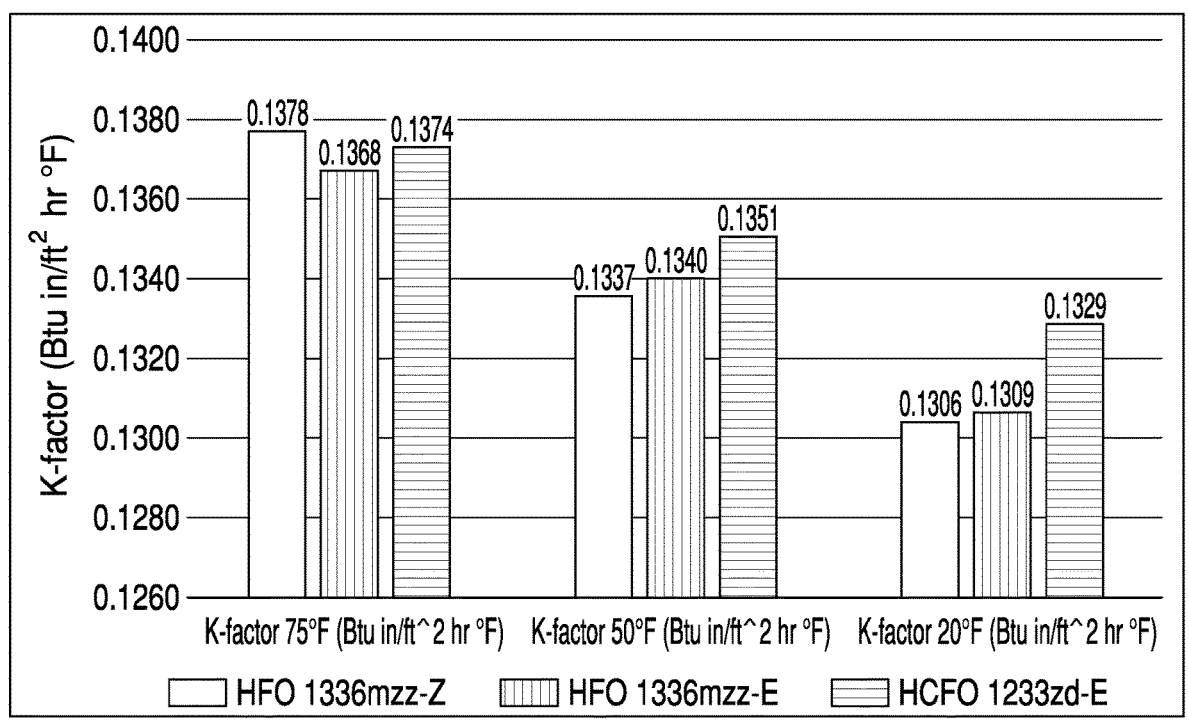
FIG. 8 shows the comparative thermal performance of foams prepared from B-side compositions containing 0.37 wt % HFO or HCFO and cyclopentane at 75° F. (24° C.), 50° F. (10° C.), and 20° F. (−6.7° C.).
Figure 9:
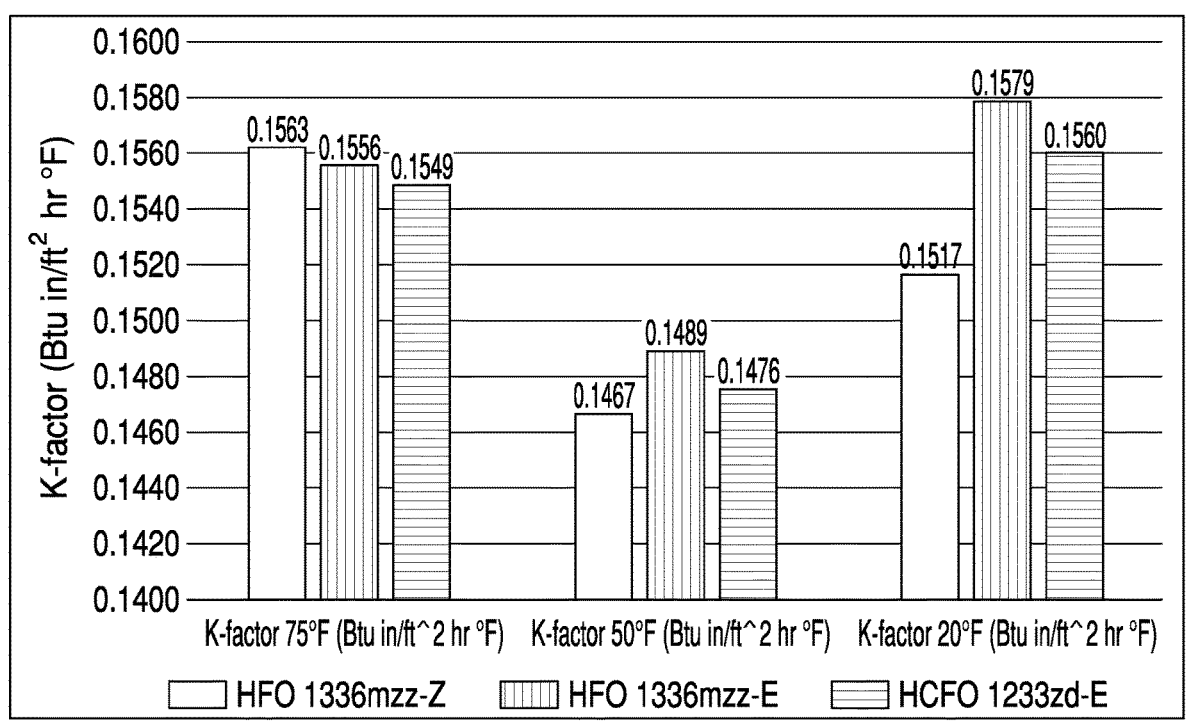
FIG. 9 shows the comparative thermal performance of foams prepared from B-side compositions containing 0.37 wt % HFO or HCFO and isopentane at 75° F. (24° C.), 50° F. (10° C.), and 20° F. (−6.7° C.).
Figure 10:
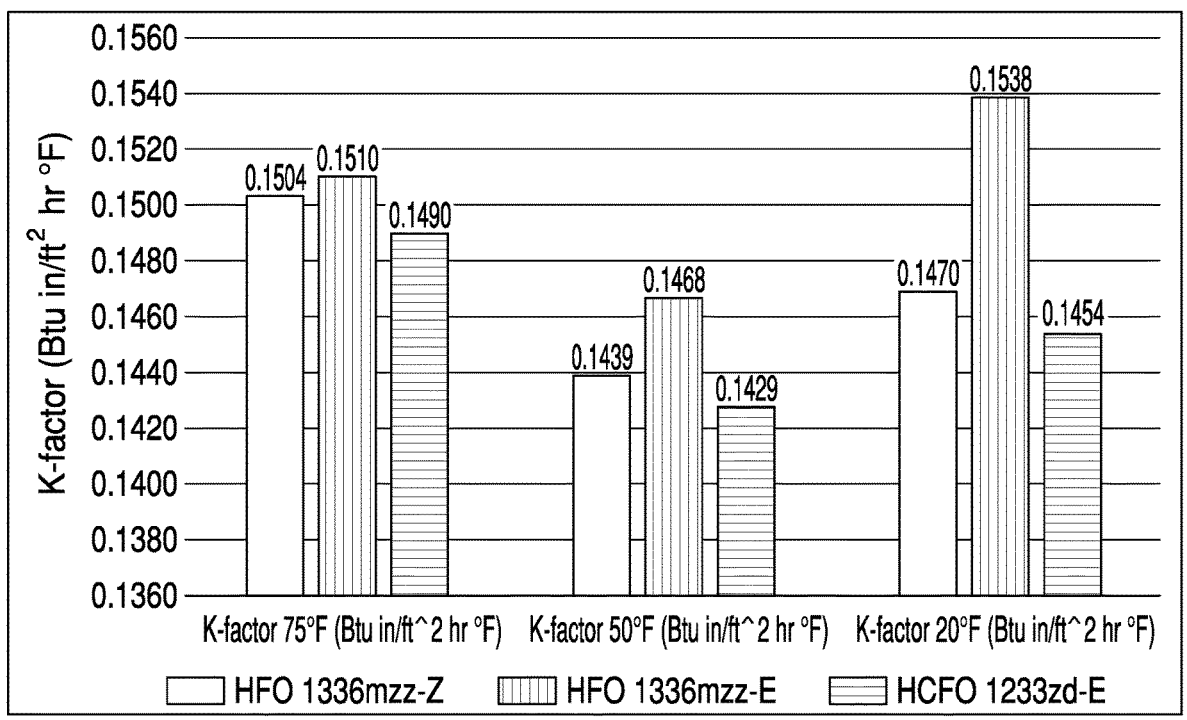
FIG. 10 shows the comparative thermal performance of foams prepared from B-side compositions containing 0.37 wt % HFO or HCFO and n-pentane at 75° F. (24° C.), 50° F. (10° C.), and 20° F. (−6.7° C.).

As shown in Tables 7-10 and in FIGS. 1-10, B-side mixtures prepared using a combination of HFO-1336mzz-E and cyclopentane as the physical blowing agents resulted in foams having unexpectedly low K-factors. Specifically, foams prepared using a B-side composition comprising 3.51 wt % and 10.12 wt % HFO-1336mzz-E exhibited 4.8% and 6.6% improvement in thermal performance at 75° F., respectively, as measured by the K-factor, compared to the corresponding foam prepared in the absence of HFO/HCFO physical blowing agent (i.e., 0 wt % HFO/HCFO) (see FIGS. 1-2). Further, foams prepared using a B-side composition comprising 3.51 wt %, 10.12 wt %, and 16.25 wt % exhibited 11.0%, 16.7%, and 16.7% improvement in thermal performance at 20° F., respectively, as measured by the K-factor, compared to the corresponding foam prepared in the absence of HFO/HCFO physical blowing agent (i.e., 0 wt % HFO/HCFO; see FIGS. 3-4).

It was also observed that foams prepared using a low loading of HFO-1336mzz-E (0.37 wt % with respect to the total B-side with blowing agent) exhibited improved thermal performance at 75° F., as measured by the K-factor, compared to the corresponding foams prepared from B-side compositions prepared with HFO-1336mzz-Z/cyclopentane or HCFO-1233zd/cyclopentane at the same HFO/HFCO loading of 0.37 wt % with respect to the total B-side with blowing agent (see FIGS. 5-10).

Finally, it was observed that foams prepared using a blend of HFO-1336mzz-Z and HFO-1336mzz-E in combination with cyclopentane (i.e., foams prepared from A+B compositions 7A, 8A, and 9A) exhibited improved thermal performance at 20° F., 50° F., and 75° F., as measured by K-factor, compared to the corresponding foam prepared in the absence of HFO-1336mzz-Z and HFO-1336mzz-E physical blowing agents (i.e., 0 wt % HFO).

Example 3. Additional A-Side/B-Side Compositions

Tables 11-16 show summary of compositions (i.e., A-side and B-side formulations) prepared as described according to the general procedures of Example 1.

TABLES 11

| Ingredient | HFO-1336mzz-Z | | | HFO-1336mzz-E | | | HCFO-1233zd-E |
|---|---|---|---|---|---|---|---|
| (Pbw)[a] | 10A | 10B | 10C | 11A | 11B | 11C | 12A |
| Polyol | 100.00 | 100.00 | 100.00 | 100.00 | 100.00 | 100.00 | 100.00 |
| Surfactant | 2.25 | 2.25 | 2.25 | 2.25 | 2.25 | 2.25 | 2.25 |
| Amine Catalyst | 0.40 | 0.40 | 0.40 | 0.40 | 0.40 | 0.40 | 0.40 |
| Metal Catalyst | 2.75 | 2.75 | 2.75 | 2.75 | 2.75 | 2.75 | 2.75 |
| Flame retardant | 10.00 | 10.00 | 10.00 | 10.00 | 10.00 | 10.00 | 10.00 |
| Water | 0.40 | 0.40 | 0.40 | 0.40 | 0.40 | 0.40 | 0.40 |
| B-side no Blowing Agent | 115.80 | 115.80 | 115.80 | 115.80 | 115.80 | 115.80 | 115.80 |
| 1336mzz-Z | 4.90 | 4.90 | 4.90 | — | — | — | — |
| 1336mzz-E | — | — | — | 4.90 | 4.90 | 4.90 | — |
| 1233zd-E | — | — | — | — | — | — | 3.90 |
| cyclopentane | 18.86 | — | — | 18.86 | — | — | 18.86 |
| iso-pentane | — | 19.40 | — | — | 19.40 | — | — |
| n-pentane | — | — | 19.40 | — | — | 19.40 | — |
| Total B-side with Blowing Agent | 139.56 | 140.10 | 140.10 | 139.56 | 140.10 | 140.10 | 138.56 |
| Isocyanate (A-side) | 198.79 | 198.79 | 198.79 | 198.79 | 198.79 | 198.79 | 198.79 |
| Total A + B | 338.35 | 338.89 | 338.89 | 338.35 | 338.89 | 338.89 | 337.35 |

[a]Compositions 10A-12A contain 10 mol % of a blend of the HFO or HCFO relative to the total number mols of HFO or HCFO + C$_5$ alkane + water used to prepare each composition. Compositions 10A-11C contain 3.5 wt % HFO relative to the total B-side with blowing agent. Composition 12A contains 2.8 wt % HCFO relative to the total B-side with blowing agent.

TABLE 12

| Ingredient | HFO-1336mzz-Z | | | HFO-1336mzz-E | | | HCFO-1233zd-E |
|---|---|---|---|---|---|---|---|
| (Pbw)[a] | 13A | 13B | 13C | 14A | 14B | 14C | 15A |
| Polyol | 100.00 | 100.00 | 100.00 | 100.00 | 100.00 | 100.00 | 100.00 |
| Surfactant | 2.25 | 2.25 | 2.25 | 2.25 | 2.25 | 2.25 | 2.25 |
| Amine Catalyst | 0.40 | 0.40 | 0.40 | 0.40 | 0.40 | 0.40 | 0.40 |
| Metal Catalyst | 2.75 | 2.75 | 2.75 | 2.75 | 2.75 | 2.75 | 2.75 |
| Flame retardant | 10.00 | 10.00 | 10.00 | 10.00 | 10.00 | 10.00 | 10.00 |
| Water | 0.40 | 0.40 | 0.40 | 0.40 | 0.40 | 0.40 | 0.40 |
| B-side no Blowing Agent | 115.80 | 115.80 | 115.80 | 115.80 | 115.80 | 115.80 | 115.80 |
| 1336mzz-Z | 14.70 | 14.70 | 14.70 | — | — | — | — |
| 1336mzz-E | — | — | — | 14.70 | 14.70 | 14.70 | — |
| 1233zd-E | — | — | — | — | — | — | 11.69 |
| cyclopentane | 14.67 | — | — | 14.67 | — | — | 14.67 |
| iso-pentane | — | 15.09 | — | — | 15.09 | — | — |
| n-pentane | — | — | 15.09 | — | — | 15.09 | — |
| Total B-side with Blowing Agent | 145.17 | 145.59 | 145.59 | 145.17 | 145.59 | 145.59 | 142.16 |
| Isocyanate (A-side) | 198.79 | 198.79 | 198.79 | 198.79 | 198.79 | 198.79 | 198.79 |
| Total A + B | 343.96 | 344.38 | 344.38 | 343.96 | 344.38 | 344.38 | 340.95 |

[a]Compositions 13A-15A contain 30 mol % of a blend of the HFO or HCFO relative to the total number mols of HFO or HCFO + C$_5$ alkane + water used to prepare each composition. Compositions 13A-14C contain 10 wt % HFO relative to the total B-side with blowing agent. Composition 15A contains 8.2 wt % HCFO relative to the total B-side with blowing agent.

TABLE 13

| Ingredient | HFO-1336mzz-Z | | | HFO-1336mzz-E | | | HCFO-1233zd-E |
|---|---|---|---|---|---|---|---|
| (Pbw)[a] | 16A | 16B | 16C | 17A | 17B | 17C | 18A |
| Polyol | 100.00 | 100.00 | 100.00 | 100.00 | 100.00 | 100.00 | 100.00 |
| Surfactant | 2.25 | 2.25 | 2.25 | 2.25 | 2.25 | 2.25 | 2.25 |
| Amine Catalyst | 0.40 | 0.40 | 0.40 | 0.40 | 0.40 | 0.40 | 0.40 |
| Metal Catalyst | 2.75 | 2.75 | 2.75 | 2.75 | 2.75 | 2.75 | 2.75 |
| Flame retardant | 10.00 | 10.00 | 10.00 | 10.00 | 10.00 | 10.00 | 10.00 |
| Water | 0.40 | 0.40 | 0.40 | 0.40 | 0.40 | 0.40 | 0.40 |
| B-side no Blowing Agent | 115.80 | 115.80 | 115.80 | 115.80 | 115.80 | 115.80 | 115.80 |
| 1336mzz-Z | 24.50 | 24.50 | 24.50 | — | — | — | — |
| 1336mzz-E | — | — | — | 24.50 | 24.50 | 24.50 | — |
| 1233zd-E | — | — | — | — | — | — | 19.49 |
| cyclopentane | 10.48 | — | — | 10.48 | — | — | 10.48 |
| iso-pentane | — | 10.78 | — | — | 10.78 | — | — |
| n-pentane | — | — | 10.78 | — | — | 10.78 | — |
| Total B-side with Blowing Agent | 150.78 | 151.08 | 151.08 | 150.78 | 151.08 | 151.08 | 145.77 |
| Isocyanate (A-side) | 198.79 | 198.79 | 198.79 | 198.79 | 198.79 | 198.79 | 198.79 |
| Total A + B | 349.57 | 349.87 | 349.87 | 349.57 | 349.87 | 349.87 | 344.56 |

[a]Compositions 16A-18A contain 50 mol % of a blend of the HFO or HCFO relative to the total number mols of HFO or HCFO + C₅ alkane + water used to prepare each composition. Compositions 16A-17C contain 16.2 wt % HFO relative to the total B-side with blowing agent. Composition 18A contains 13.4 wt % HCFO relative to the total B-side with blowing agent.

TABLE 14

| Ingredient | Composition # | | | | |
|---|---|---|---|---|---|
| (Pbw)[a] | 19 | 20 | 21 | 22 | 23 |
| Polyol | 100.00 | 100.00 | 100.00 | 100.00 | 100.00 |
| Surfactant | 2.25 | 2.25 | 2.25 | 2.25 | 2.25 |
| Amine Catalyst | 0.40 | 0.40 | 0.40 | 0.40 | 0.40 |
| Metal Catalyst | 2.75 | 2.75 | 2.75 | 2.75 | 2.75 |
| Flame retardant | 10.00 | 10.00 | 10.00 | 10.00 | 10.00 |
| Water | 0.40 | 0.40 | 0.40 | 0.40 | 0.40 |
| B-side no Blowing Agent | 115.80 | 115.80 | 115.80 | 115.80 | 115.80 |
| 1336mzz-Z | 2.45 | 2.45 | — | 2.45 | 2.45 |
| 1336mzz-E | 2.45 | — | 2.45 | 2.45 | 2.45 |
| 1233zd-E | — | 1.95 | 1.95 | — | — |
| cyclopentane | 18.86 | 18.86 | 18.86 | — | — |
| iso-pentane | — | — | — | 19.40 | — |
| n-pentane | — | — | — | — | 19.40 |
| Total B-side with Blowing Agent | 139.56 | 139.06 | 139.06 | 140.10 | 140.10 |
| Isocyanate (A-side) | 198.79 | 198.79 | 198.79 | 198.79 | 198.79 |
| Total A + B | 338.35 | 337.85 | 337.85 | 338.89 | 338.89 |

[a]Compositions 19-23 contain 10 mol % of the total amount of HFO and HCFO components relative to the total number mols of HFO + HCFO + C₅ alkane + water used to prepare each composition. For example, Composition 19 contains 10 mol % HFO-1336mzz(Z) + HFO-1336mzz(E), combined, relative to the total number mols of HFO-1336mzz(Z) + HFO-1336mzz(E) + cyclopentane + water. Compositions 19, 22, and 23 contain 3.5 wt % HFO relative to the total B-side with blowing agent. Compositions 20 and 21 contain 3.2 wt % HFO/HCFO relative to the total B-side with blowing agent.

TABLE 15

| Ingredient | Composition # | | | | |
|---|---|---|---|---|---|
| (Pbw)[a] | 24 | 25 | 26 | 27 | 28 |
| Polyol | 100.00 | 100.00 | 100.00 | 100.00 | 100.00 |
| Surfactant | 2.25 | 2.25 | 2.25 | 2.25 | 2.25 |
| Amine Catalyst | 0.40 | 0.40 | 0.40 | 0.40 | 0.40 |
| Metal Catalyst | 2.75 | 2.75 | 2.75 | 2.75 | 2.75 |
| Flame retardant | 10.00 | 10.00 | 10.00 | 10.00 | 10.00 |
| Water | 0.40 | 0.40 | 0.40 | 0.40 | 0.40 |
| B-side no Blowing Agent | 115.80 | 115.80 | 115.80 | 115.80 | 115.80 |
| 1336mzz-Z | 7.35 | 7.35 | — | 7.35 | 7.35 |
| 1336mzz-E | 7.35 | — | 7.35 | 7.35 | 7.35 |
| 1233zd-E | — | 5.85 | 5.85 | — | — |
| cyclopentane | 14.67 | 14.67 | 14.67 | — | — |
| iso-pentane | — | — | — | 15.09 | — |
| n-pentane | — | — | — | — | 15.09 |
| Total B-side with Blowing Agent | 145.17 | 143.67 | 143.67 | 145.59 | 145.59 |
| Isocyanate (A-side) | 198.79 | 198.79 | 198.79 | 198.79 | 198.79 |
| Total A + B | 343.96 | 342.46 | 342.46 | 344.38 | 344.38 |

[a]Compositions 24-28 contain 30 mol % of the total amount of HFO and HCFO components relative to the total number mols of HFO + HCFO + C₅ alkane + water used to prepare each composition. For example, Composition 24 contains 30 mol % HFO-1336mzz(Z) + HFO-1336mzz(E), combined, relative to the total number mols of HFO-1336mzz(Z) + HFO-1336mzz(E) + cyclopentane + water. Compositions 25, 27, and 28 contain 10 wt % HFO relative to the total B-side with blowing agent. Compositions 25 and 26 contain 9.2 wt % HFO/HCFO relative to the total B-side with blowing agent.

TABLE 16

| Ingredient | Composition # | | | | |
|---|---|---|---|---|---|
| (Pbw)[a] | 29 | 30 | 31 | 32 | 33 |
| Polyol | 100.00 | 100.00 | 100.00 | 100.00 | 100.00 |
| Surfactant | 2.25 | 2.25 | 2.25 | 2.25 | 2.25 |
| Amine Catalyst | 0.40 | 0.40 | 0.40 | 0.40 | 0.40 |
| Metal Catalyst | 2.75 | 2.75 | 2.75 | 2.75 | 2.75 |
| Flame retardant | 10.00 | 10.00 | 10.00 | 10.00 | 10.00 |
| Water | 0.40 | 0.40 | 0.40 | 0.40 | 0.40 |
| B-side no Blowing Agent | 115.80 | 115.80 | 115.80 | 115.80 | 115.80 |
| 1336mzz-Z | 12.25 | 12.25 | — | 12.25 | 12.25 |
| 1336mzz-E | 12.25 | — | 12.25 | 12.25 | 12.25 |
| 1233zd-E | — | 9.75 | 9.75 | — | — |
| cyclopentane | 10.48 | 10.48 | 10.48 | — | — |
| iso-pentane | — | — | — | 10.78 | — |
| n-pentane | — | — | — | — | 10.78 |
| Total B-side with Blowing Agent | 150.78 | 148.28 | 148.28 | 151.08 | 151.08 |
| Isocyanate (A-side) | 198.79 | 198.79 | 198.79 | 198.79 | 198.79 |
| Total A + B | 349.57 | 347.07 | 347.07 | 349.87 | 349.87 |

[a] Compositions 29-33 contain 50 mol % of the total amount of HFO and HCFO components relative to the total number mols of HFO + HCFO + C5 alkane + water used to prepare each composition. For example, Composition 29 contains 50 mol % HFO-1336mzz(Z) + HFO-1336mzz(E), combined, relative to the total number mols of HFO-1336mzz(Z) + HFO-1336mzz(E) + cyclopentane + water. Compositions 29, 32, and 33 contain 16.2 wt % HFO relative to the total B-side with blowing agent. Compositions 30 and 31 contain 14.8 wt % HFO/HCFO relative to the total B-side with blowing agent.

Example 4. Analysis of Foam Properties

The resulting A+B mixtures described in Example 3 (i.e., A+B mixtures 10A-33 as described in Tables 11-16) were placed into a mixing head and mixed for 3 seconds at 4000 rpm. After mixing, the mixed A+B solution was quickly poured into a wax coated cardboard box. A timer was started to record the cream, gel, rise, and tack-free times of the resulting foam.

The foams were placed under an air-hood for 24 h to completely finish the polyurethane reaction. Samples were cut into 6"×6"×1.5" blocks with a bandsaw cutting machine. These foam blocks were tested for thermal conductivity utilizing a heat flow meter per ASTM C-518. After testing, data values were compiled for analysis and are shown below in Tables 17-23, with Table 17 showing data obtained using the $C_5$ alkane control compositions described above.

TABLE 17

| Control Composition | Cyclopentane Control | Isopentane Control | n-Pentane Control |
|---|---|---|---|
| Cream (s) | 19 | 3 | 21 |
| Gel (s) | 27 | 42 | 35 |
| Rise (s) | 57 | 49 | 68 |
| Tack (s) | 57 | 49 | 68 |
| K-factor 75° F. (Btu in/ft^2 hr ° F.) | 0.1447 | 0.1525 | 0.1497 |
| K-factor 50° F. (Btu in/ft^2 hr ° F.) | 0.1452 | 0.1449 | 0.1457 |
| K-factor 20° F. (Btu in/ft^2 hr ° F.) | 0.1427 | 0.1525 | 0.1513 |
| K-factor 23.9° C. (mW/m*K) | 20.9 | 22.0 | 21.6 |
| K-factor 10° C. (m W/m*K) | 20.9 | 20.9 | 21.0 |
| K-factor −6.7° C. (mW/m*K) | 20.6 | 22.0 | 21.8 |

TABLE 18

| A + B Mixture Used to Prepare Foam | HFO-1336mzz-Z | | | HFO-1336mzz-E | | | HCFO-1233zd-E |
|---|---|---|---|---|---|---|---|
| | 10A | 10B | 10C | 11A | 11B | 11C | 12A |
| Cream (s) | 19 | 3 | 18 | 20 | 11 | 17 | 27 |
| Gel (s) | 27 | 41 | 37 | 41 | 55 | 49 | 39 |
| Rise (s) | 62 | 53 | 60 | 74 | 106 | 80 | 74 |
| Tack (s) | 62 | 53 | 60 | 78 | 106 | 80 | 81 |
| K-factor 75° F. (Btu in/ft^2 hr ° F.) | 0.1417 | 0.1501 | 0.1475 | 0.1335 | 0.1512 | 0.1504 | 0.1365 |
| K-factor 50° F. (Btu in/ft^2 hr ° F.) | 0.1397 | 0.1399 | 0.1415 | 0.1305 | 0.1413 | 0.1448 | 0.1316 |
| K-factor 20° F. (Btu in/ft^2 hr ° F.) | 0.1357 | 0.1406 | 0.1451 | 0.1196 | 0.1434 | 0.1503 | 0.1289 |
| K-factor 23.9° C. (m W/m*K) | 20.4 | 21.6 | 21.3 | 19.3 | 21.8 | 21.7 | 19.7 |
| K-factor 10° C. (m W/m*K) | 20.1 | 20.2 | 20.4 | 18.8 | 20.4 | 20.9 | 19.0 |
| K-factor −6.7° C. (mW/m*K) | 19.6 | 20.3 | 20.9 | 17.2 | 20.7 | 21.7 | 18.6 |

TABLE 19

| A + B Mixture Used to Prepare Foam | HFO-1336mzz-Z | | | HFO-1336mzz-E | | | HCFO-1233zd-E |
|---|---|---|---|---|---|---|---|
| | 13A | 13B | 13C | 14A | 14B | 14C | 15A |
| Cream (s) | 15 | 3 | 11 | 10 | 19 | 18 | 24 |
| Gel (s) | 27 | 37 | 27 | 50 | 73 | 49 | 38 |
| Rise (s) | 59 | 52 | 53 | 70 | 135 | 75 | 75 |
| Tack (s) | 59 | 52 | 53 | 96 | 160 | 75 | 78 |
| K-factor 75° F. (Btu in/ft^2 hr ° F.) | 0.1320 | 0.1449 | 0.1423 | 0.1310 | 0.1423 | 0.1431 | 0.1367 |

TABLE 19-continued

| A + B Mixture Used to | HFO-1336mzz-Z | | | HFO-1336mzz-E | | | HCFO-1233zd-E |
|---|---|---|---|---|---|---|---|
| Prepare Foam | 13A | 13B | 13C | 14A | 14B | 14C | 15A |
| K-factor 50° F. (Btu in/ft^2 hr ° F.) | 0.1225 | 0.1335 | 0.1312 | 0.1241 | 0.1297 | 0.1324 | 0.1283 |
| K-factor 20° F. (Btu in/ft^2 hr ° F.) | 0.1161 | 0.1326 | 0.1296 | 0.1119 | 0.1232 | 0.1293 | 0.1248 |
| K-factor 23.9° C. (mW/m*K) | 19.0 | 20.9 | 20.5 | 18.9 | 20.5 | 20.6 | 19.7 |
| K-factor 10° C. (mW/m*K) | 17.7 | 19.3 | 18.9 | 17.9 | 18.7 | 19.1 | 18.5 |
| K-factor −6.7° C. (mW/m*K) | 16.7 | 19.1 | 18.7 | 16.1 | 17.8 | 18.6 | 18.0 |

TABLE 20

| A + B Mixture Used to | HFO-1336mzz-Z | | | HFO-1336mzz-E | | | HCFO-1233zd-E |
|---|---|---|---|---|---|---|---|
| Prepare Foam | 16A | 16B | 16C | 17A | 17B | 17C | 18A |
| Cream (s) | 14 | 3 | 12 | 4 | 9 | 14 | 18 |
| Gel (s) | 27 | 35 | 28 | 52 | 76 | 59 | 32 |
| Rise (s) | 60 | 55 | 56 | 72 | 110 | 88 | 66 |
| Tack (s) | 60 | 55 | 56 | 108 | 173 | 180 | 73 |
| K-factor 75° F. (Btu in/ft^2 hr ° F.) | 0.1279 | 0.1486 | 0.1408 | 0.1344 | 0.1598 | 0.1692 | 0.1332 |
| K-factor 50° F. (Btu in/ft^2 hr ° F.) | 0.1198 | 0.1393 | 0.1313 | 0.1238 | 0.1475 | 0.1574 | 0.1232 |
| K-factor 20° F. (Btu in/ft^2 hr ° F.) | 0.1237 | 0.1535 | 0.1399 | 0.1100 | 0.1408 | 0.1518 | 0.1198 |
| K-factor 23.9° C. (mW/m*K) | 18.4 | 21.4 | 20.3 | 19.4 | 23.0 | 24.4 | 19.2 |
| K-factor 10° C. (mW/m*K) | 17.3 | 20.1 | 18.9 | 17.9 | 21.3 | 22.7 | 17.8 |
| K-factor −6.7° C. (mW/m*K) | 17.8 | 22.1 | 20.2 | 15.9 | 20.3 | 21.9 | 17.3 |

TABLE 21

| A + B Mixture Used to Prepare Foam | 19 | 20 | 21 | 22 | 23 |
|---|---|---|---|---|---|
| Cream (s) | 17 | 23 | 25 | 12 | 19 |
| Gel (s) | 31 | 37 | 40 | 42 | 39 |
| Rise (s) | 57 | 68 | 71 | 63 | 62 |
| Tack (s) | 57 | 75 | 74 | 63 | 62 |
| K-factor 75° F. (Btu in/ft^2 hr ° F.) | 0.1301 | 0.1390 | 0.1352 | 0.1499 | 0.1483 |
| K-factor 50° F. (Btu in/ft^2 hr ° F.) | 0.1241 | 0.1334 | 0.1305 | 0.1396 | 0.1412 |
| K-factor 20° F. (Btu in/ft^2 hr ° F.) | 0.1193 | 0.1302 | 0.1280 | 0.1427 | 0.1422 |
| K-factor 23.9° C. (m W/m*K) | 18.8 | 20.0 | 19.5 | 21.6 | 21.4 |
| K-factor 10° C. (mW/m*K) | 17.9 | 19.2 | 18.8 | 20.1 | 20.4 |
| K-factor −6.7° C. (mW/m*K) | 17.2 | 18.8 | 18.5 | 20.6 | 20.5 |

TABLE 22

| A + B Mixture Used to Prepare Foam | 24 | 25 | 26 | 27 | 28 |
|---|---|---|---|---|---|
| Cream (s) | 11 | 18 | 11 | 9 | 10 |
| Gel (s) | 33 | 31 | 44 | 41 | 39 |
| Rise (s) | 60 | 64 | 74 | 61 | 57 |
| Tack (s) | 60 | 67 | 96 | 61 | 57 |
| K-factor 75° F. (Btu in/ft^2 hr ° F.) | 0.1267 | 0.1306 | 0.1300 | 0.1425 | 0.1425 |
| K-factor 50° F. (Btu in/ft^2 hr ° F.) | 0.1175 | 0.1220 | 0.1198 | 0.1302 | 0.1322 |
| K-factor 20° F. (Btu in/ft^2 hr ° F.) | 0.1107 | 0.1178 | 0.1133 | 0.1275 | 0.1294 |
| K-factor 23.9° C. (m W/m*K) | 18.3 | 18.8 | 18.7 | 20.5 | 20.5 |
| K-factor 10° C. (mW/m*K) | 16.9 | 17.6 | 17.3 | 18.8 | 19.1 |
| K-factor −6.7° C. (m W/m*K) | 16.0 | 17.0 | 16.3 | 18.4 | 18.7 |

TABLE 23

| A + B Mixture Used to Prepare Foam | 29 | 30 | 31 | 32 | 33 |
|---|---|---|---|---|---|
| Cream (s) | 5 | 15 | 8 | 6 | 3 |
| Gel (s) | 38 | 31 | 44 | 40 | 43 |
| Rise (s) | 60 | 61 | 70 | 64 | 59 |
| Tack (s) | 60 | 64 | 73 | 64 | 59 |
| K-factor 75° F. (Btu in/ft^2 hr ° F.) | 0.1297 | 0.1272 | 0.1278 | 0.1388 | 0.1403 |

TABLE 23-continued

| A + B Mixture Used to Prepare Foam | 29 | 30 | 31 | 32 | 33 |
|---|---|---|---|---|---|
| K-factor 50° F. (Btu in/ft^2 hr ° F.) | 0.1186 | 0.1186 | 0.1169 | 0.1265 | 0.1284 |
| K-factor 20° F. (Btu in/ft^2 hr ° F.) | 0.1164 | 0.1166 | 0.1105 | 0.1243 | 0.1277 |
| K-factor 23.9° C. (mW/m*K) | 18.7 | 18.3 | 18.4 | 20.0 | 20.2 |
| K-factor 10° C. (mW/m*K) | 17.1 | 17.1 | 16.9 | 18.2 | 18.5 |
| K-factor −6.7° C. (mW/m*K) | 16.8 | 16.8 | 15.9 | 17.9 | 18.4 |

Figure 11A:
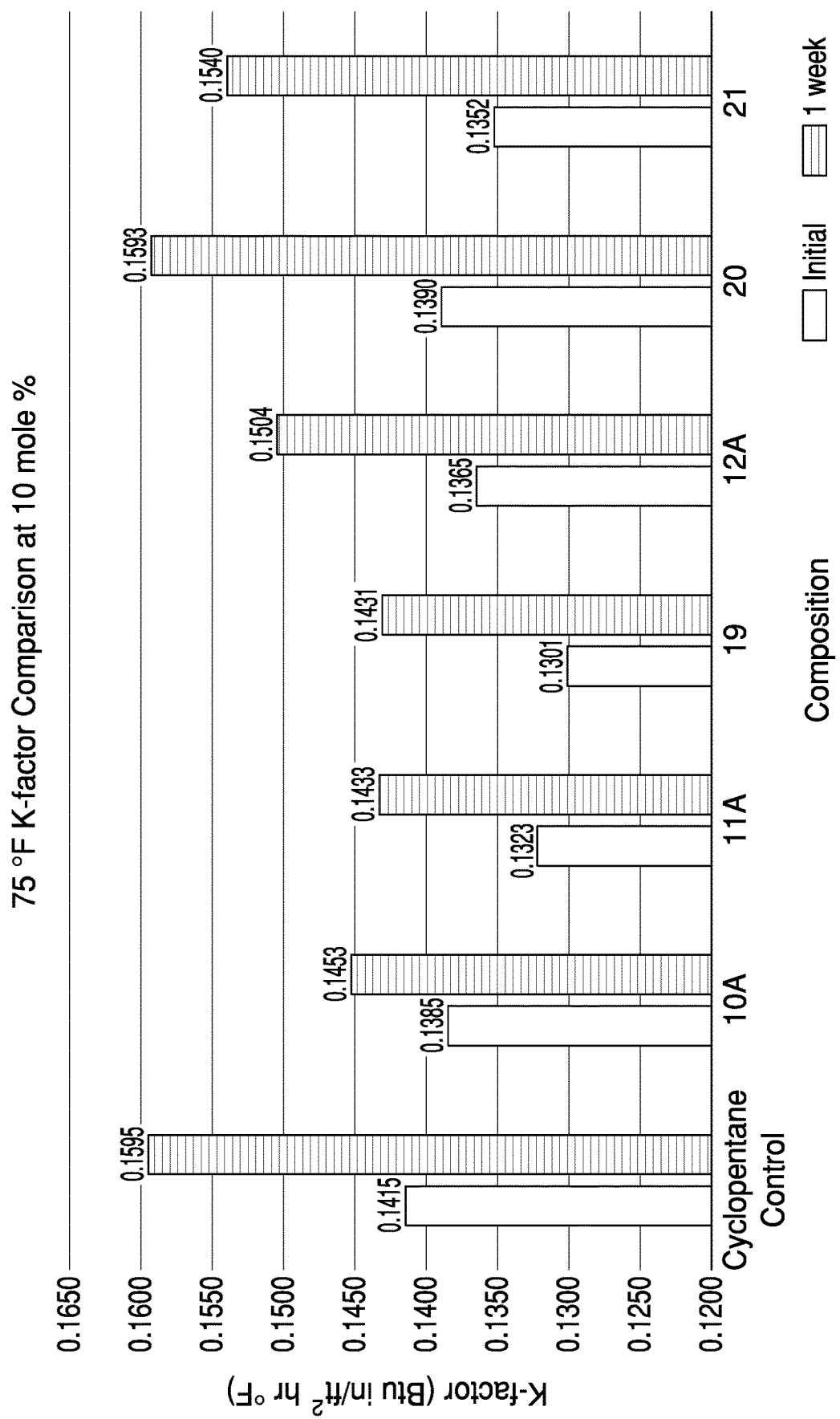
FIGS. 11A-11C shows the comparative thermal performance of foams prepared from B-side compositions containing 10 mol % HFO or HCFO and cyclopentane (FIG. 11A), isopentane (FIG. 1B), and n-pentane (FIG. 1C) at 75° F. (24° C.). Initial thermal performance and thermal performance after 7 days aging at 70° C. are shown.
Figure 11B:
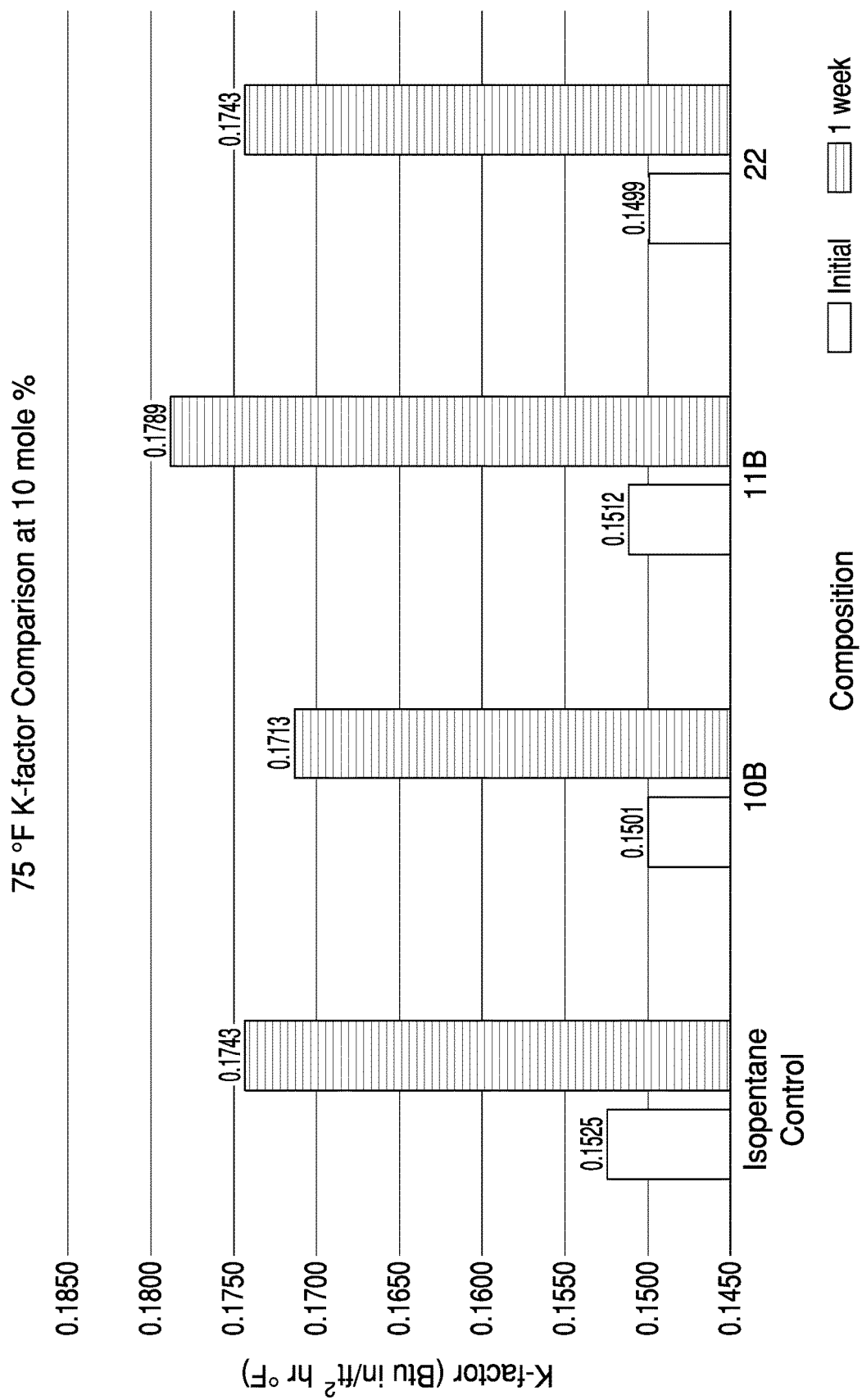
Figure 11C:
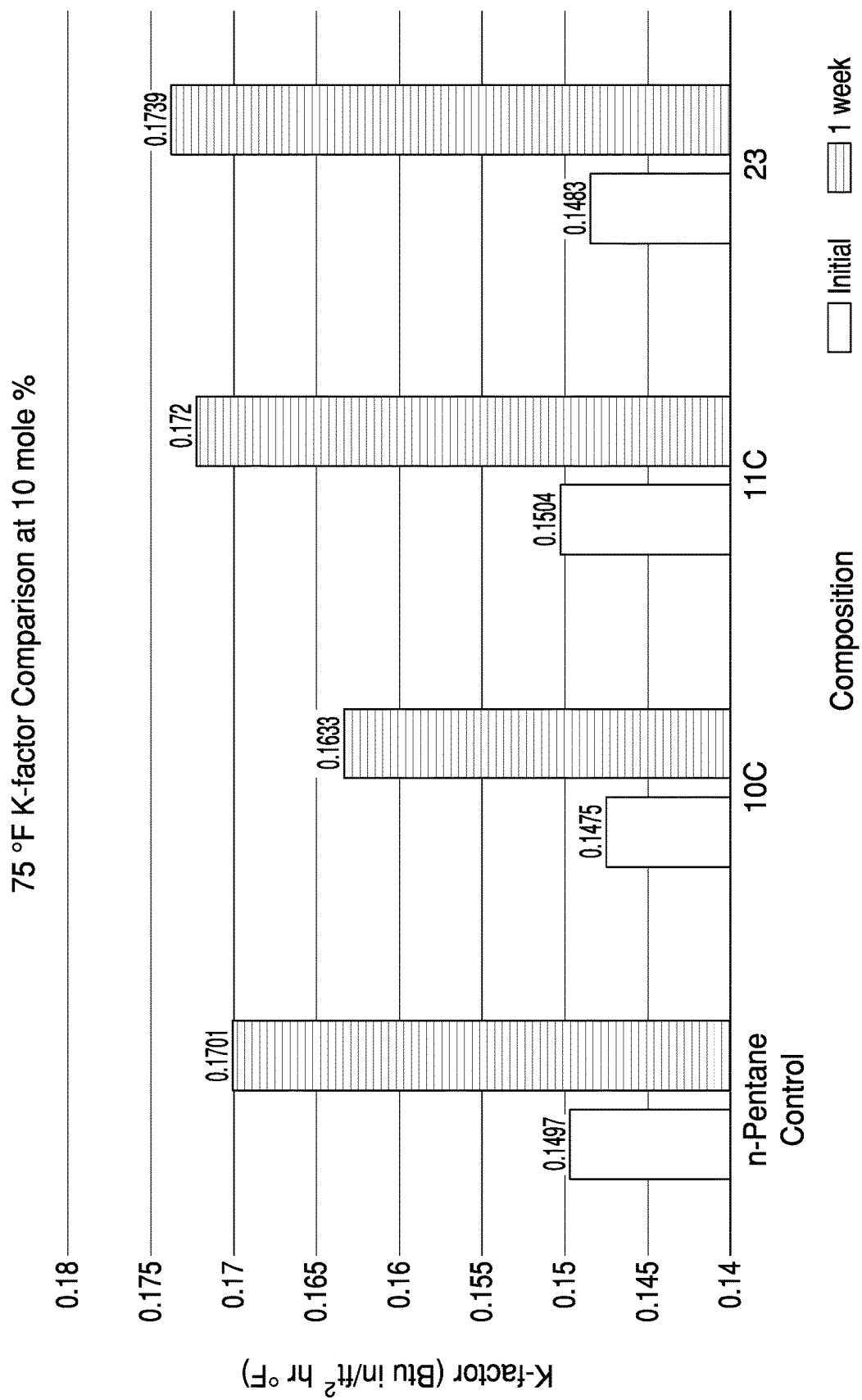
Figure 12B:
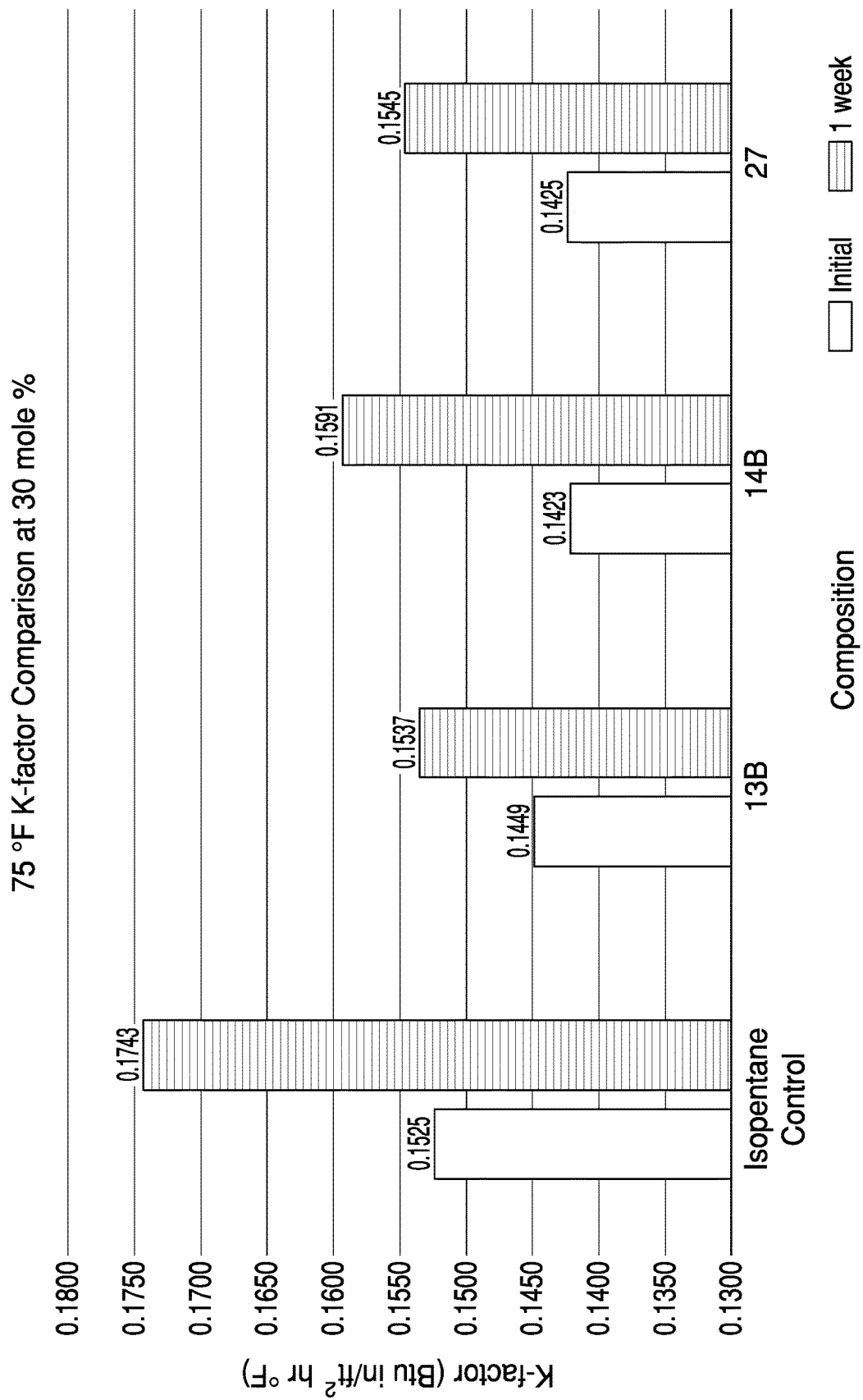
Figure 13A:
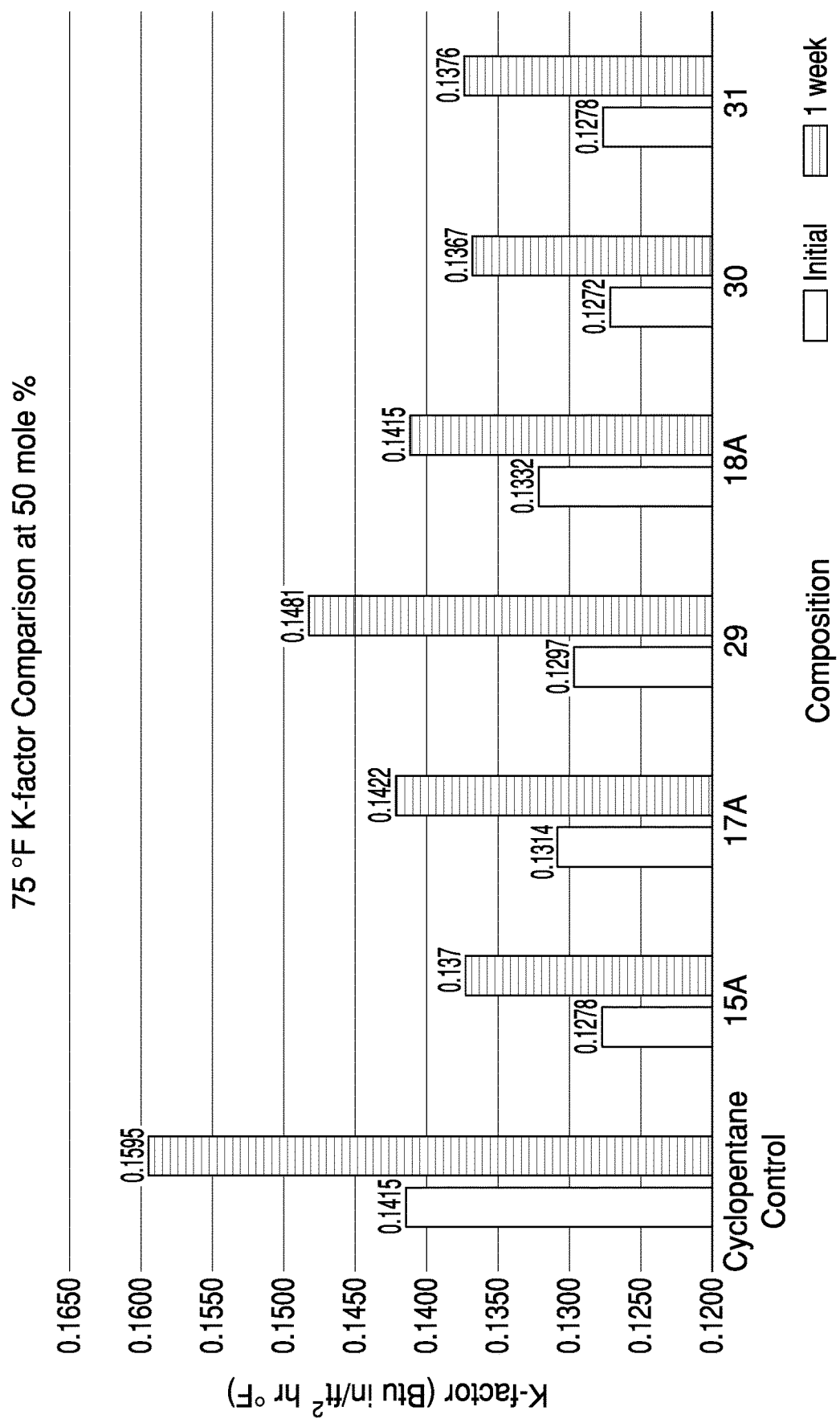
FIGS. 13A-13C shows the comparative thermal performance of foams prepared from B-side compositions containing 50 mol % HFO or HCFO and cyclopentane (FIG. 13A), isopentane (FIG. 13B), and n-pentane (FIG. 13C) at 75° F. (24° C.). Initial thermal performance and thermal performance after 7 days aging at 70° C. are shown.
Figure 13B:
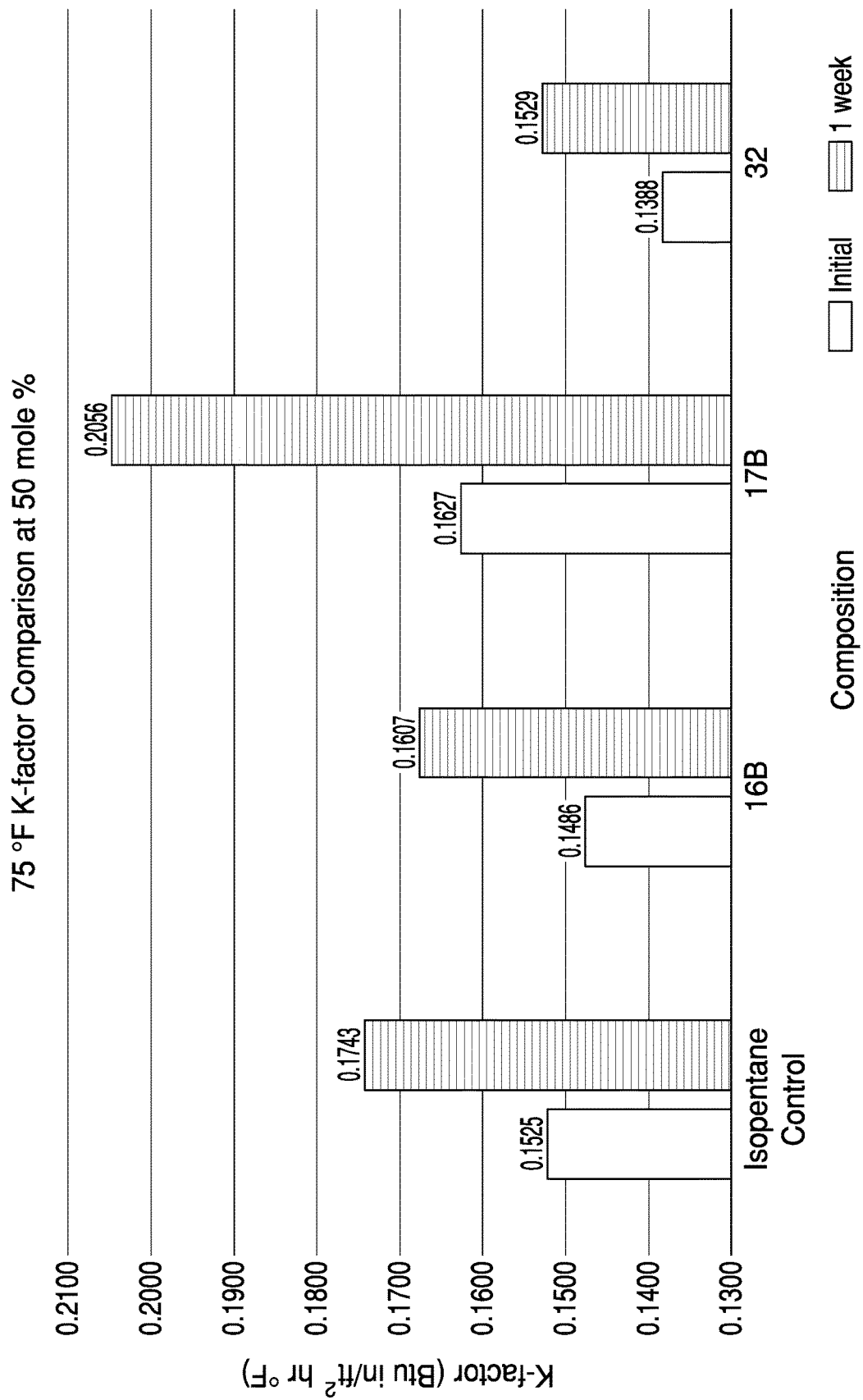
Figure 13C:
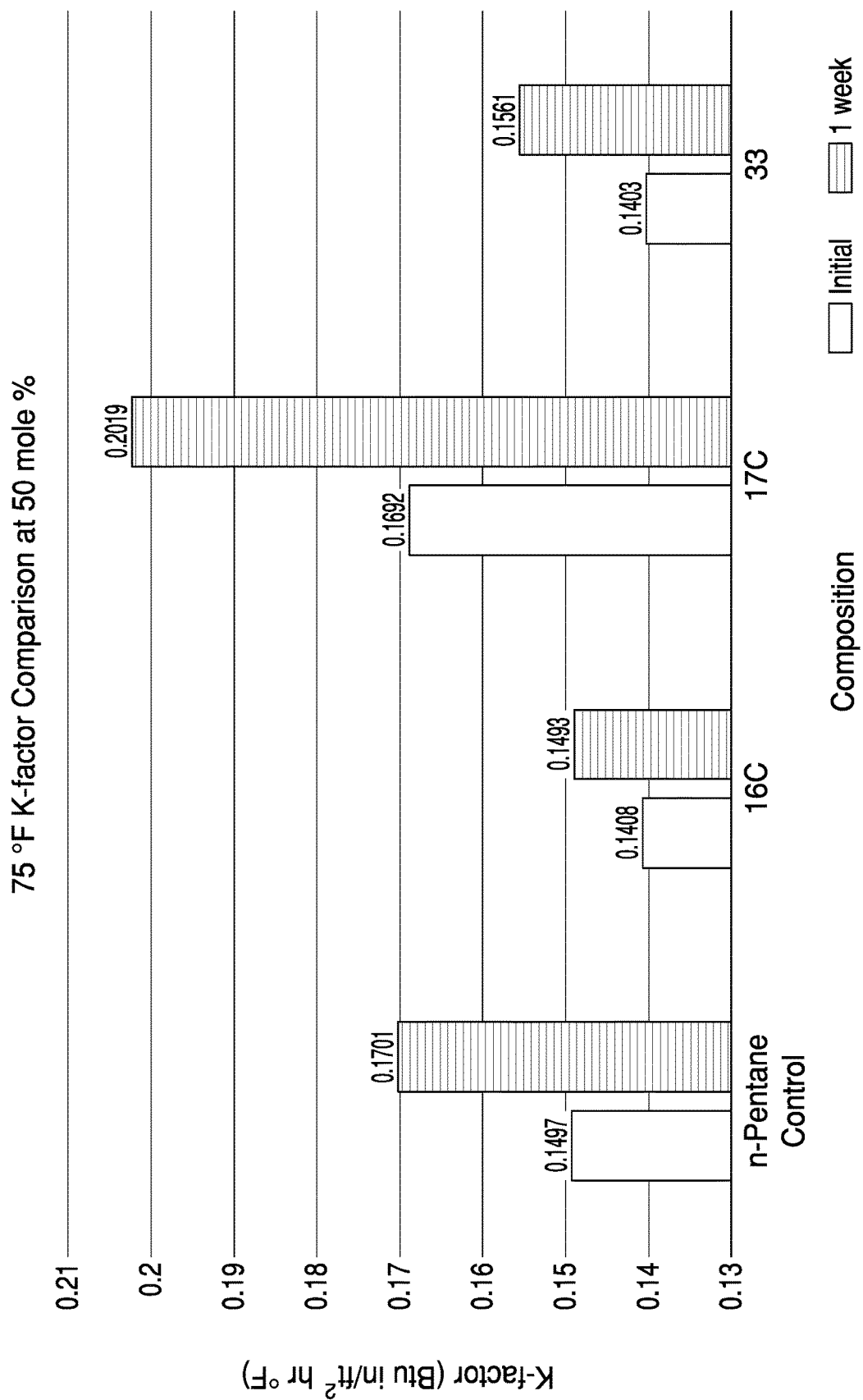
Figure 14A:
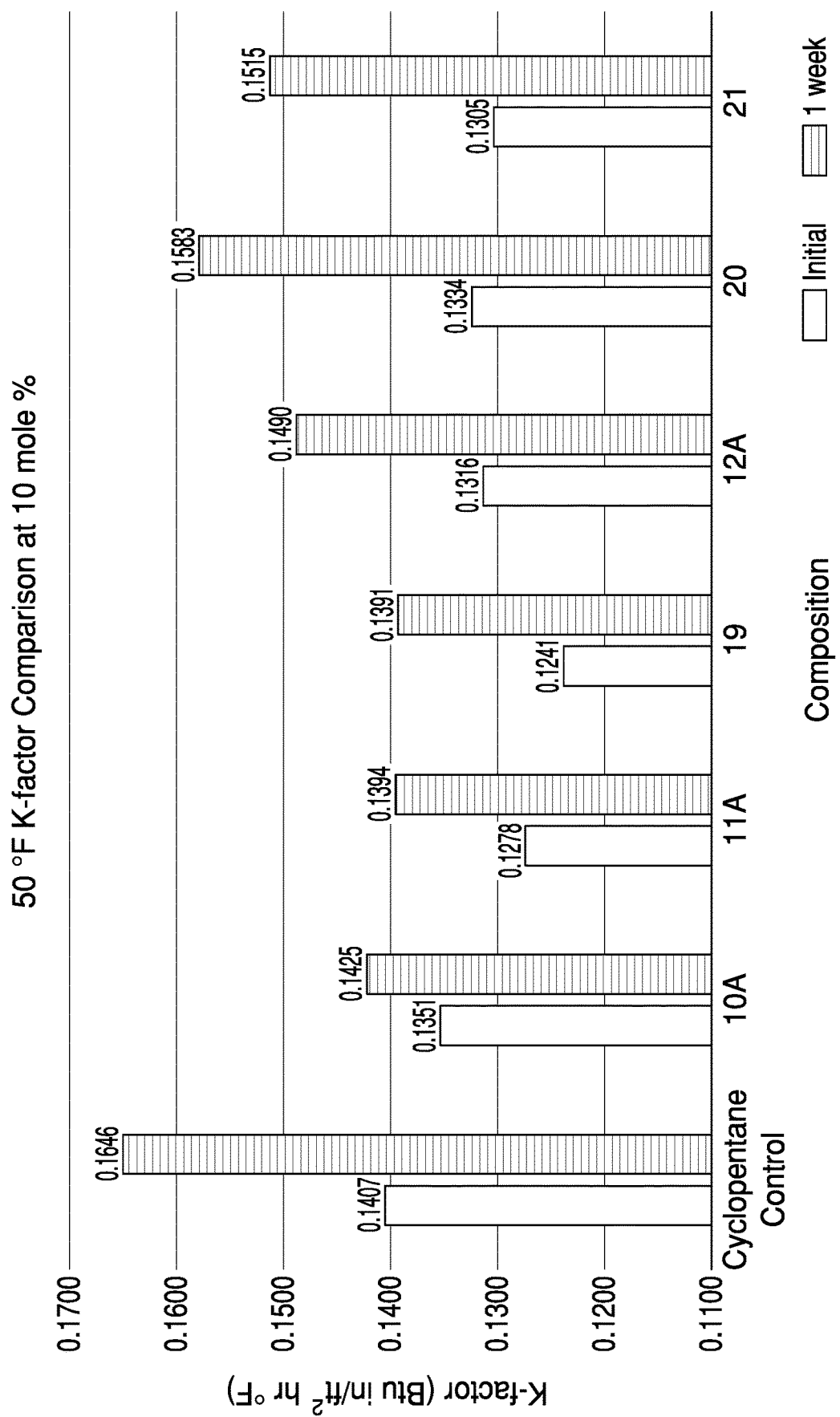
FIGS. 14A-14C shows the comparative thermal performance of foams prepared from B-side compositions containing 10 mol % HFO or HCFO and cyclopentane (FIG. 14A), isopentane (FIG. 14B), and n-pentane (FIG. 14C) at 50° F. (10° C.). Initial thermal performance and thermal performance after 7 days aging at 70° C. are shown.
Figure 14B:
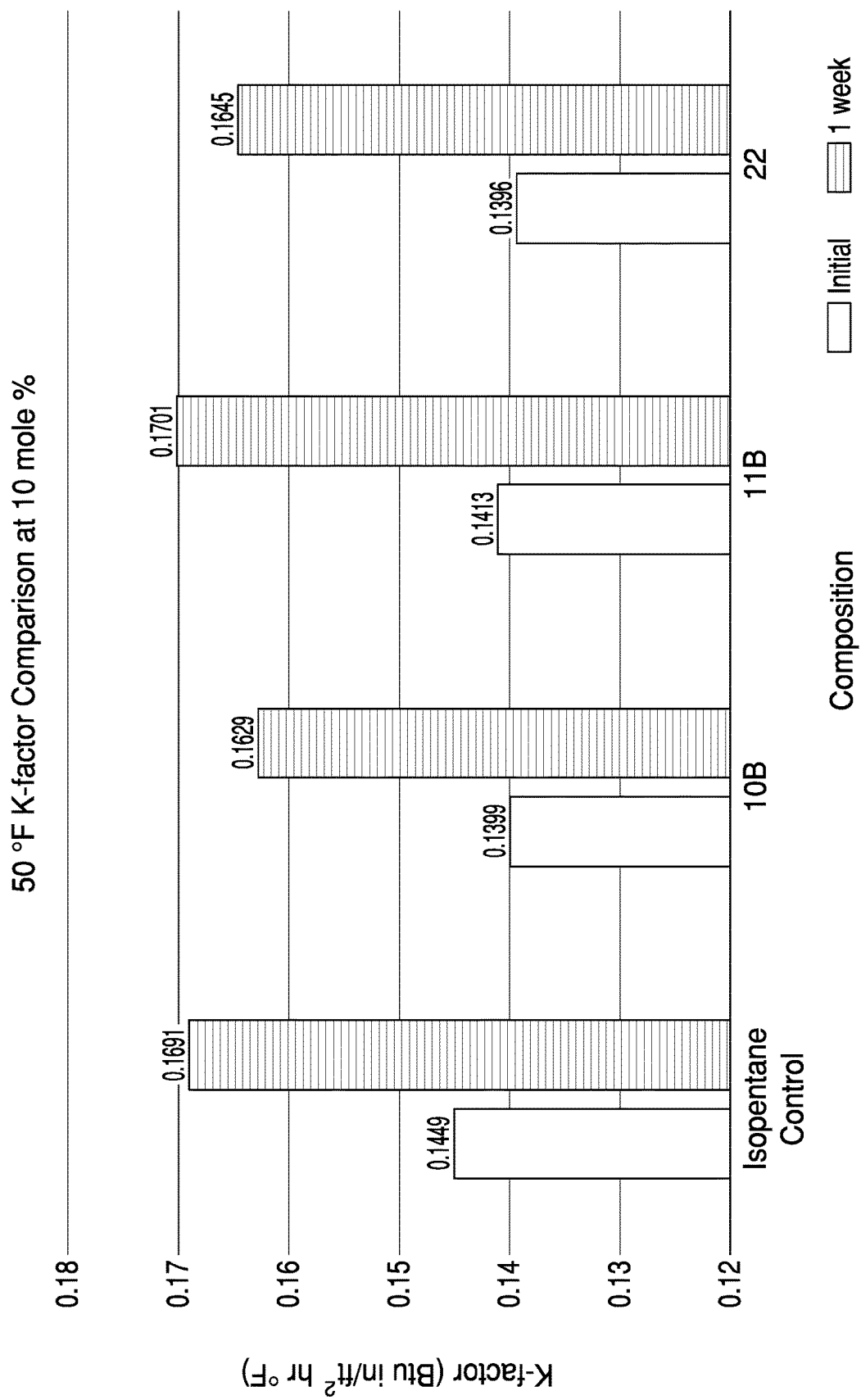
Figure 14C:
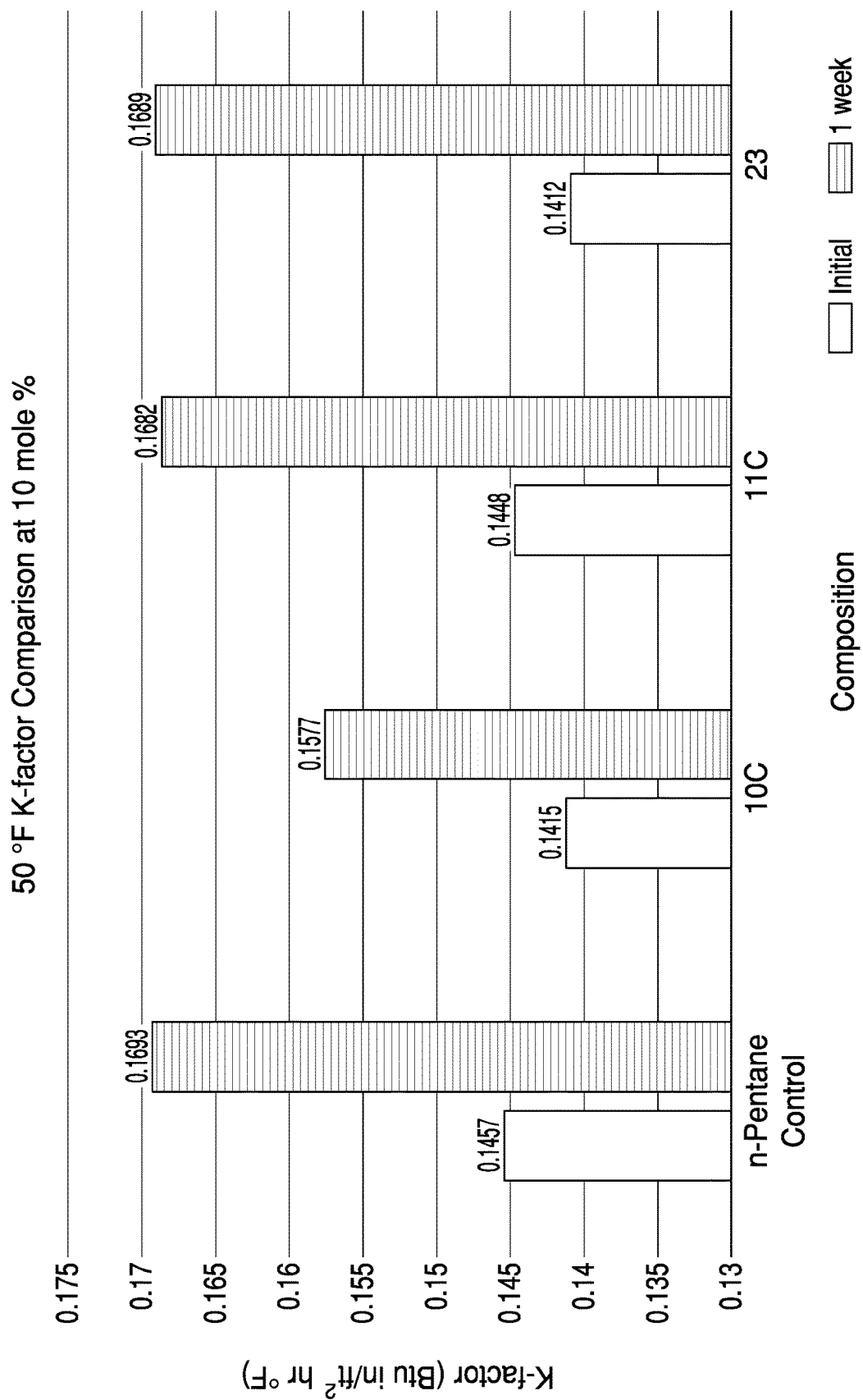
Figure 15A:
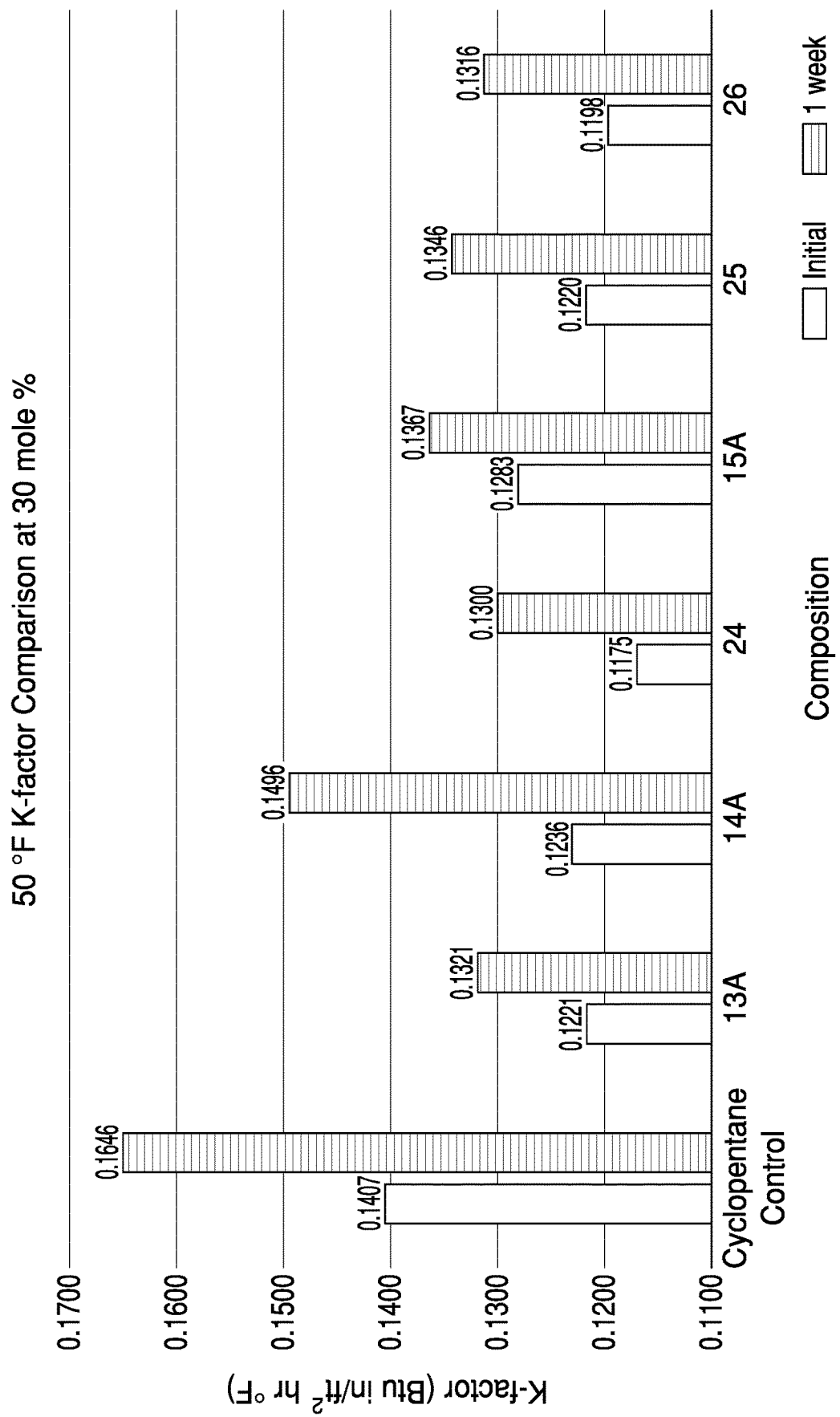
Figure 15C:
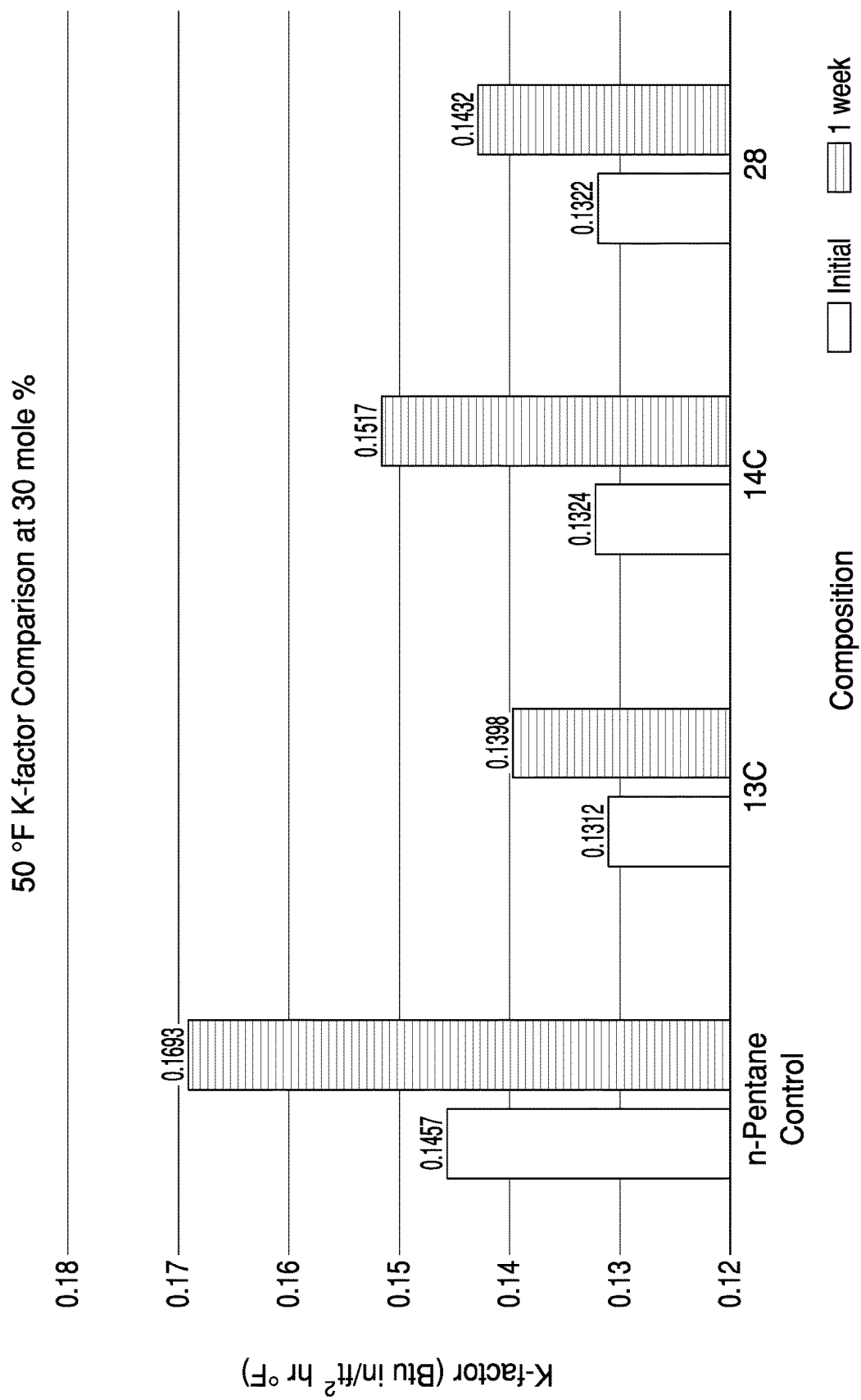
Figure 16A:
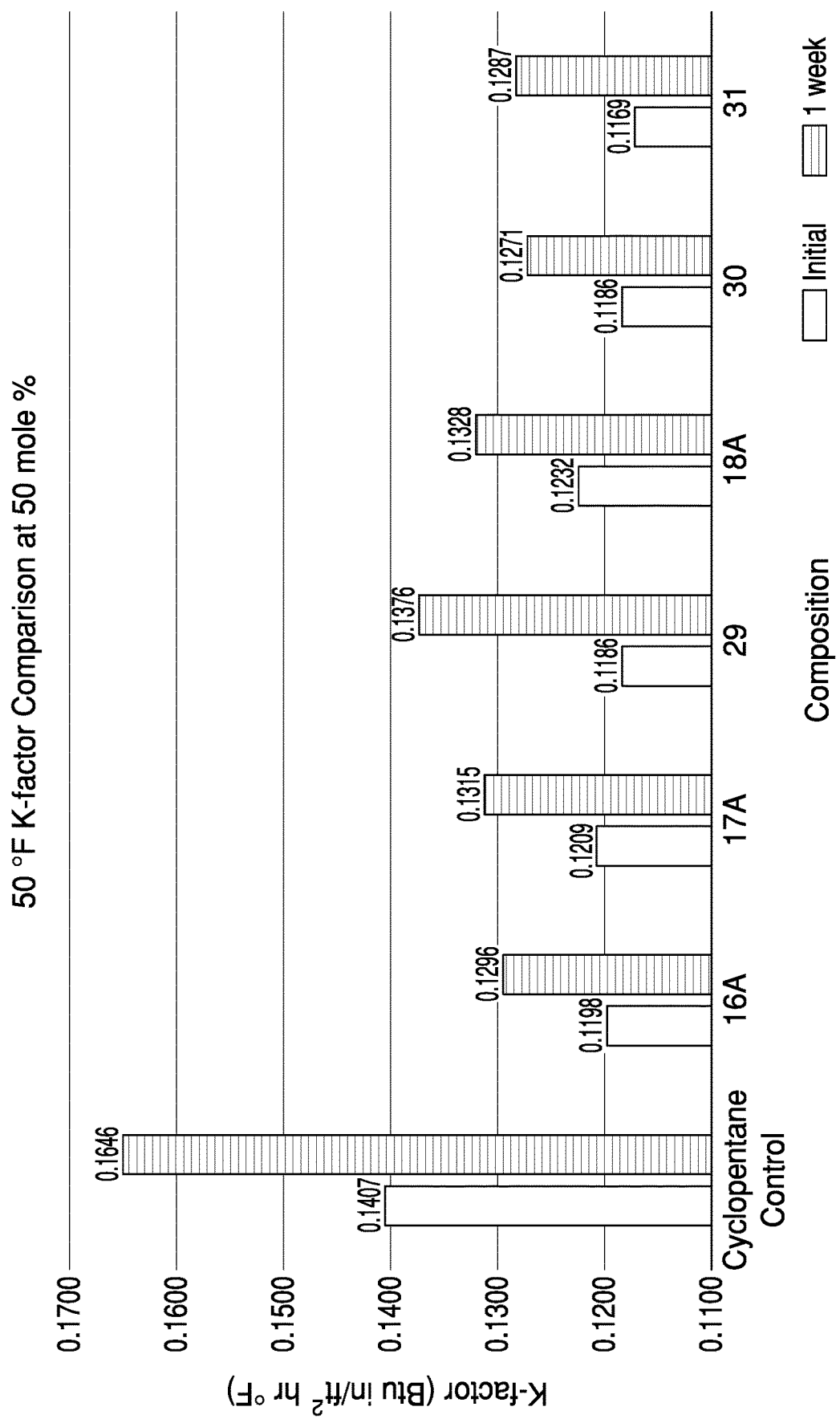
FIGS. 16A-16C shows the comparative thermal performance of foams prepared from B-side compositions containing 50 mol % HFO or HCFO and cyclopentane (FIG. 16A), isopentane (FIG. 16B), and n-pentane (FIG. 16C) at 50° F. (10° C.). Initial thermal performance and thermal performance after 7 days aging at 70° C. are shown.
Figure 16B:
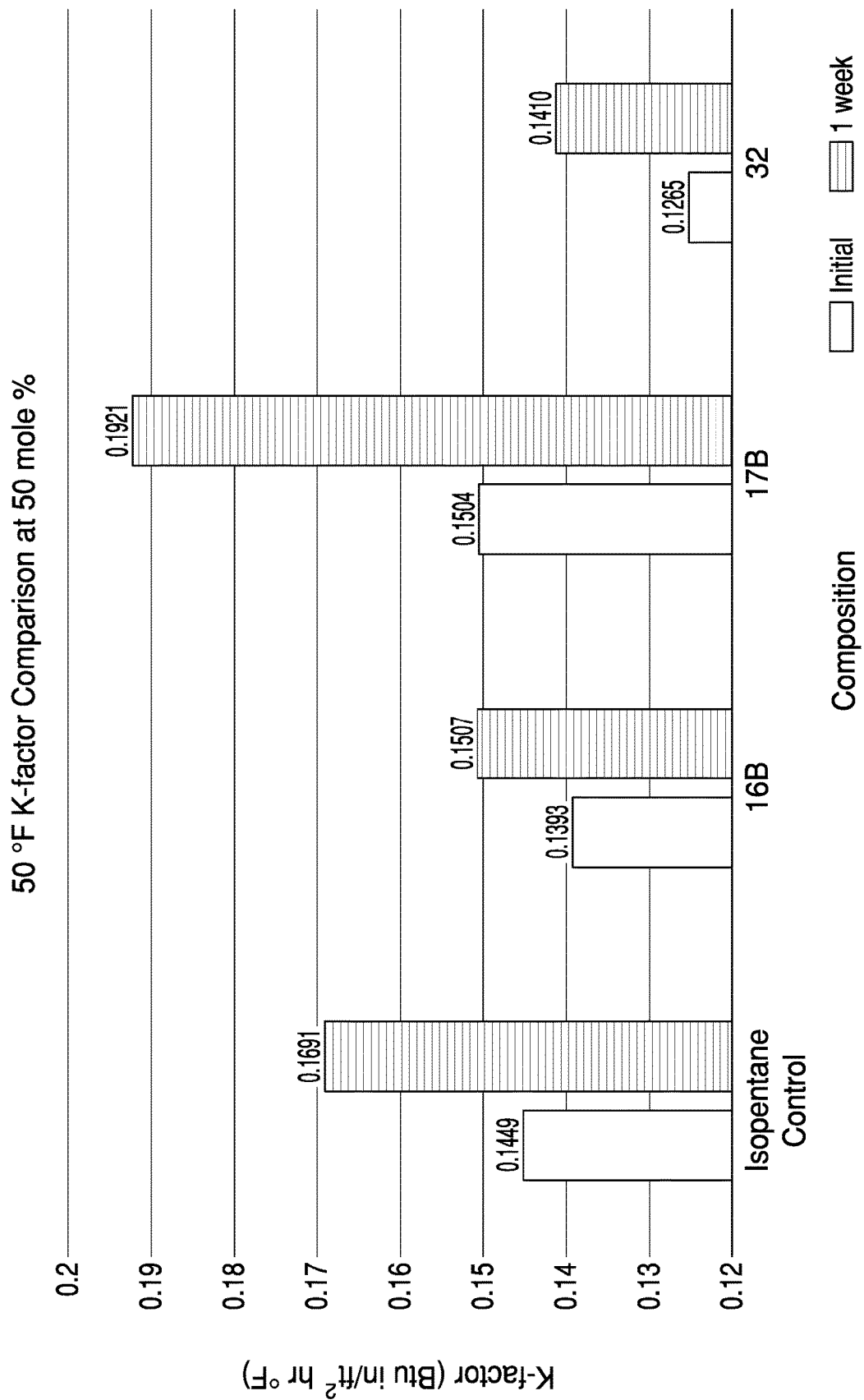
Figure 16C:
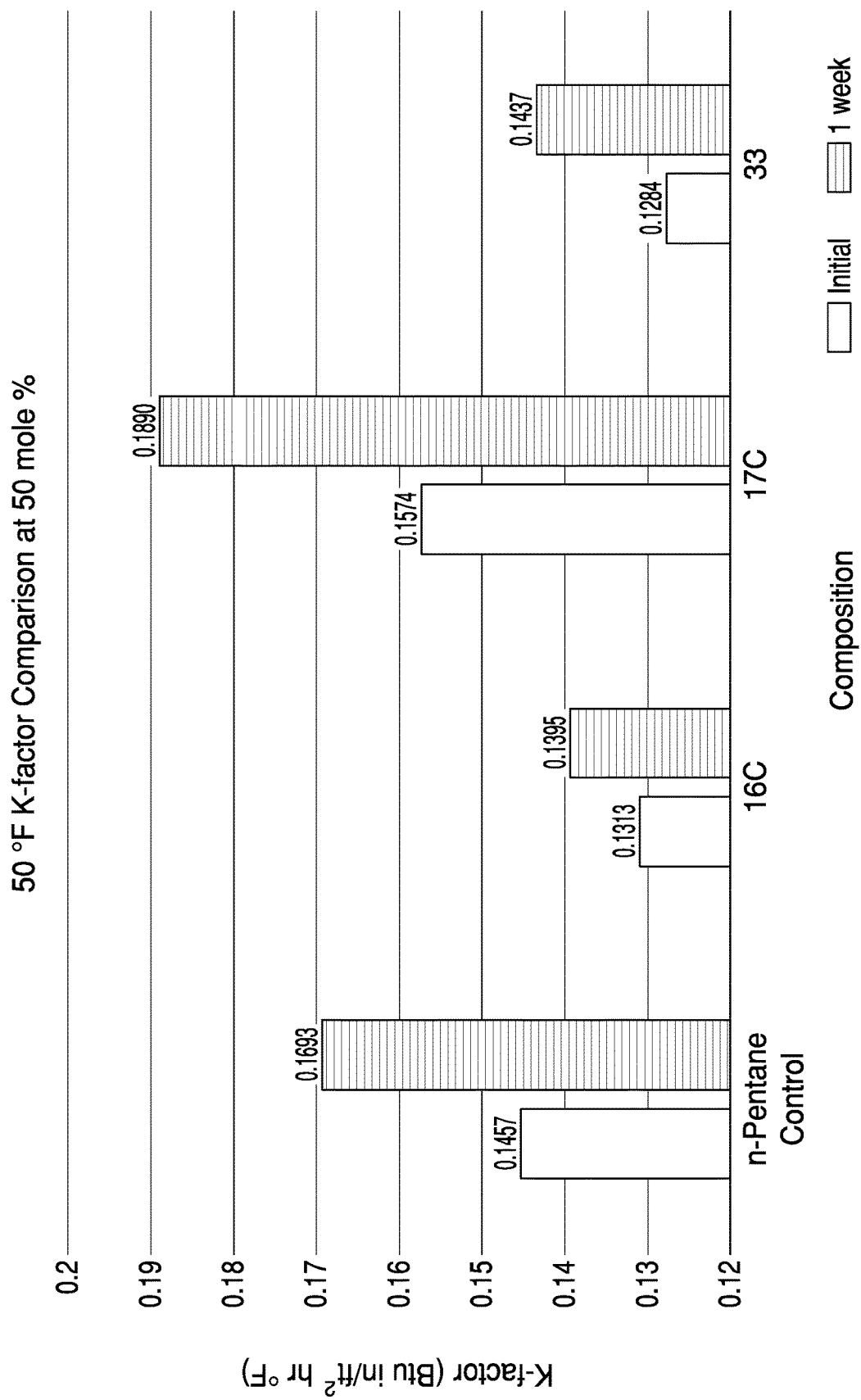
Figure 17A:
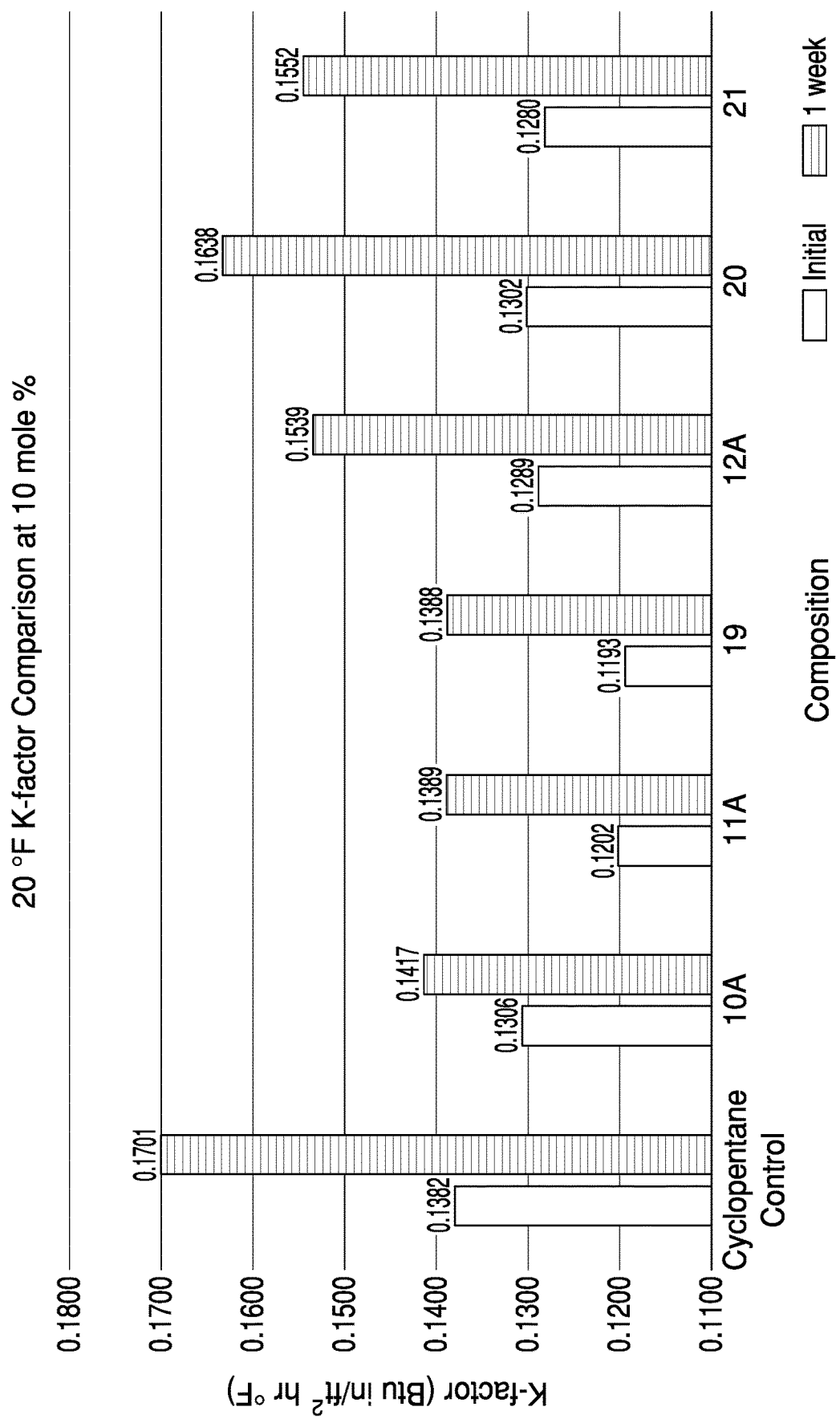
Figure 17B:
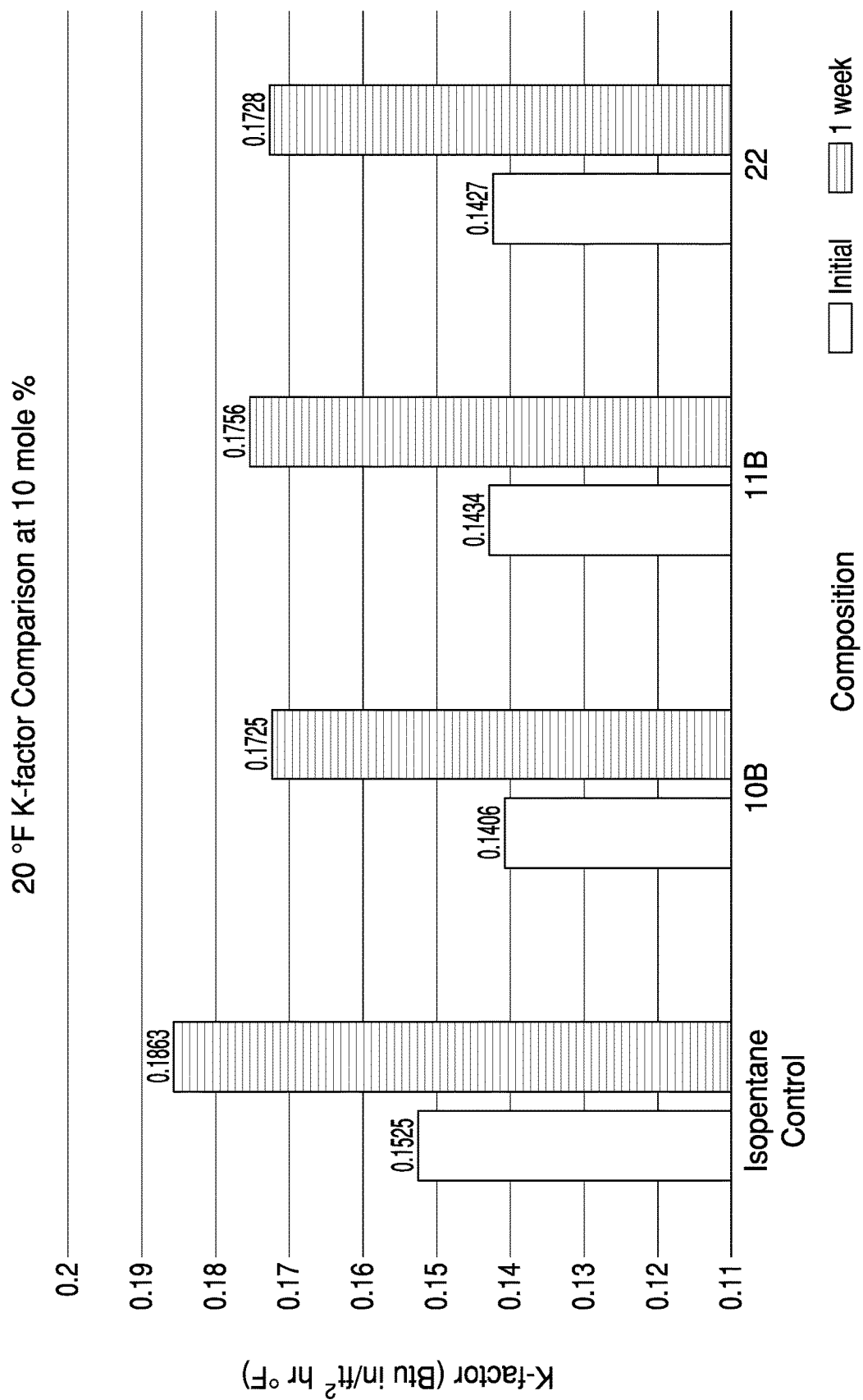
Figure 18A:
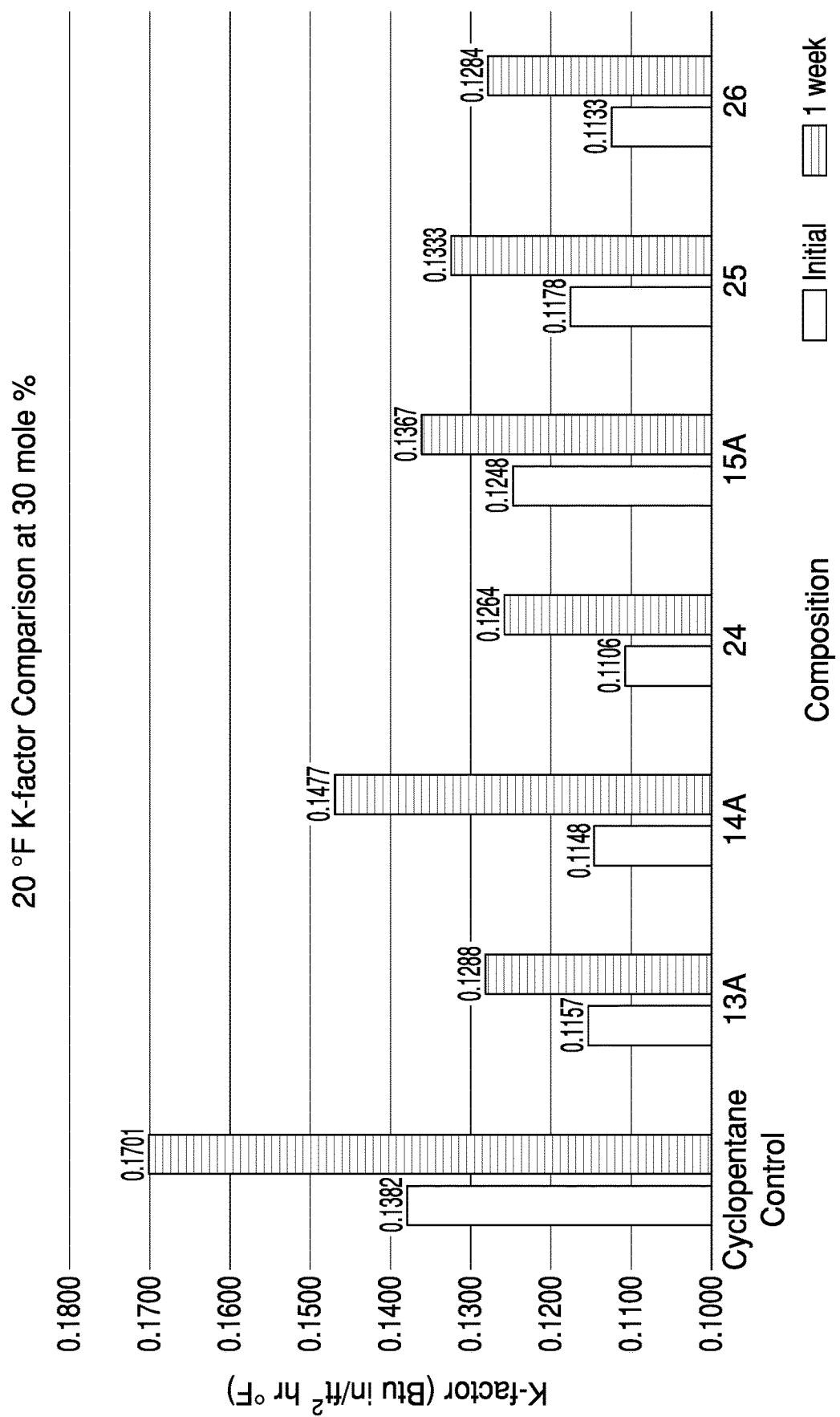
FIGS. 18A-18C shows the comparative thermal performance of foams prepared from B-side compositions containing 30 mol % HFO or HCFO and cyclopentane (FIG. 18A), isopentane (FIG. 18B), and n-pentane (FIG. 18C) at 20° F. (−6.7° C.). Initial thermal performance and thermal performance after 7 days aging at 70° C. are shown.
Figure 18B:
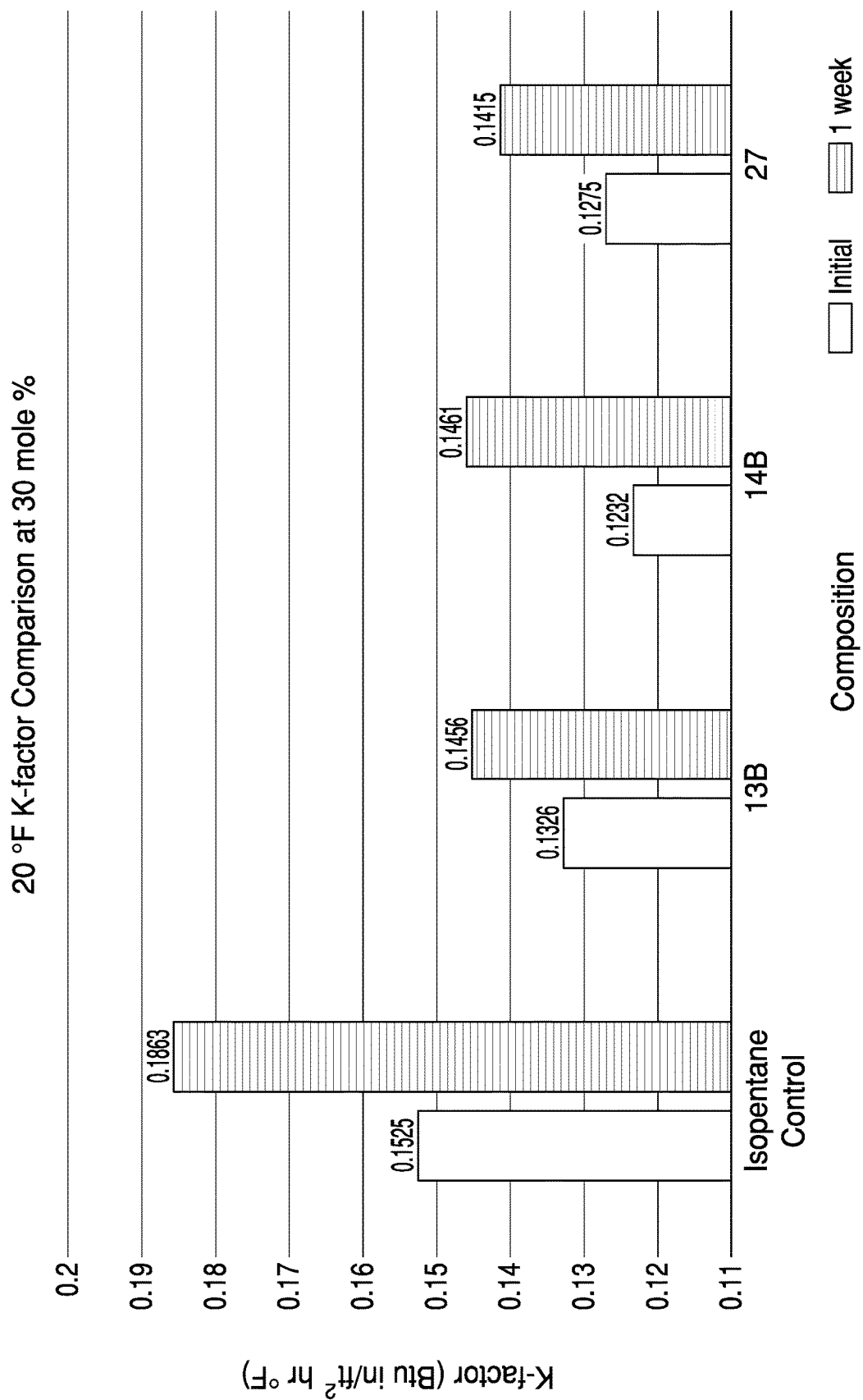
Figure 18C:
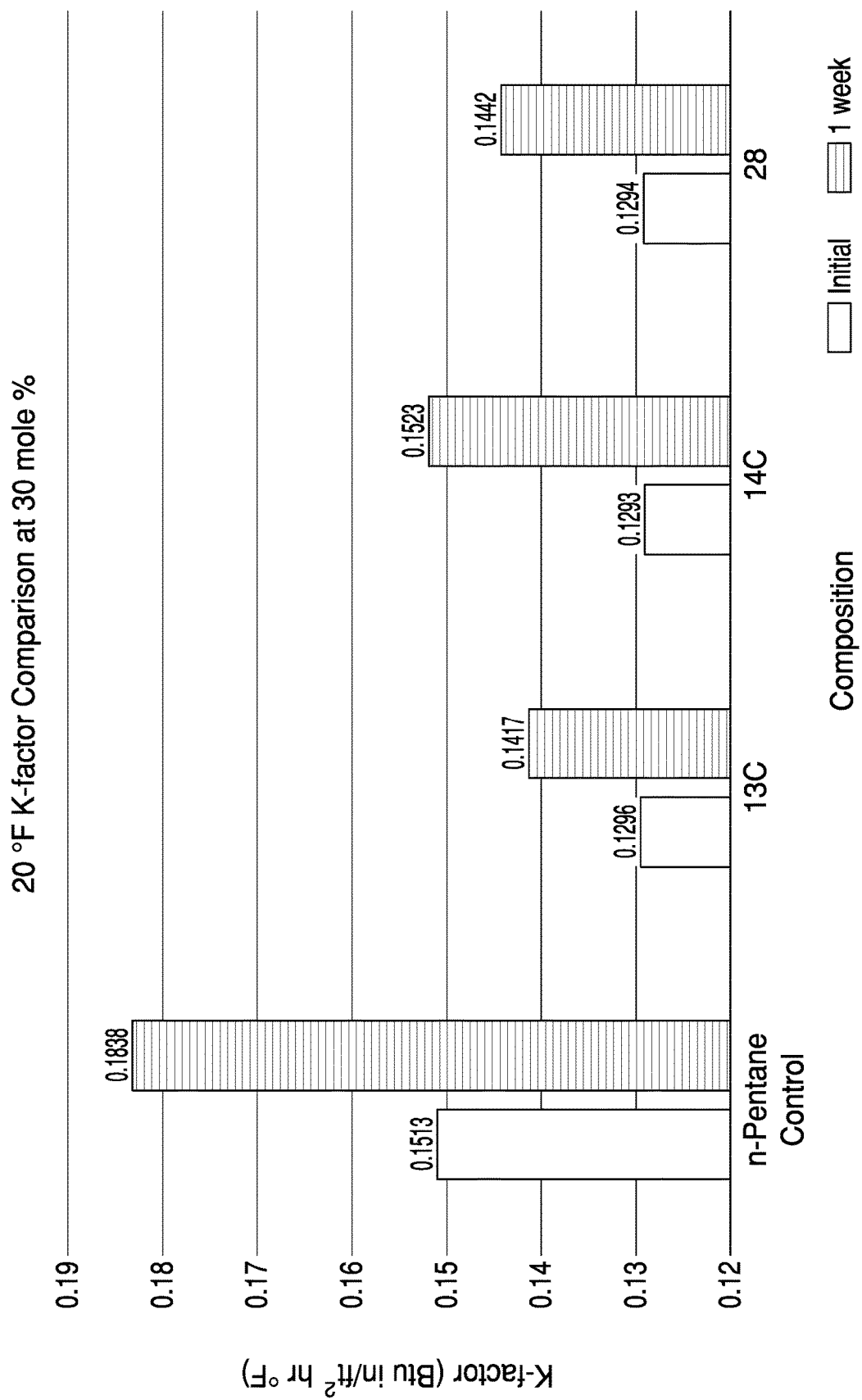
Figure 19A:
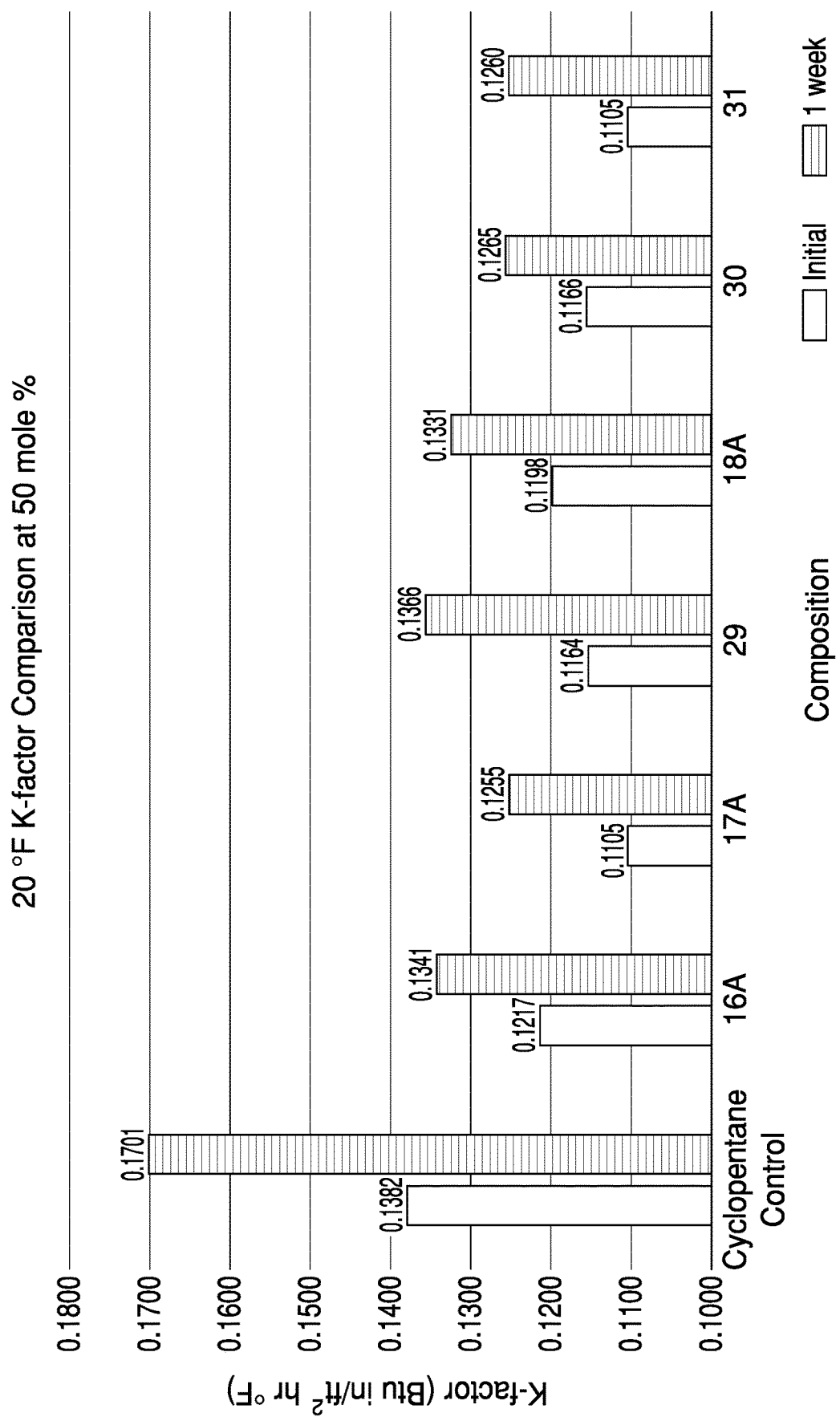
FIGS. 19A-19C shows the comparative thermal performance of foams prepared from B-side compositions containing 50 mol % HFO or HCFO and cyclopentane (FIG. 19A), isopentane (FIG. 19B), and n-pentane (FIG. 19C) at 20° F. (−6.7° C.). Initial thermal performance and thermal performance after 7 days aging at 70° C. are shown.
Figure 19B:
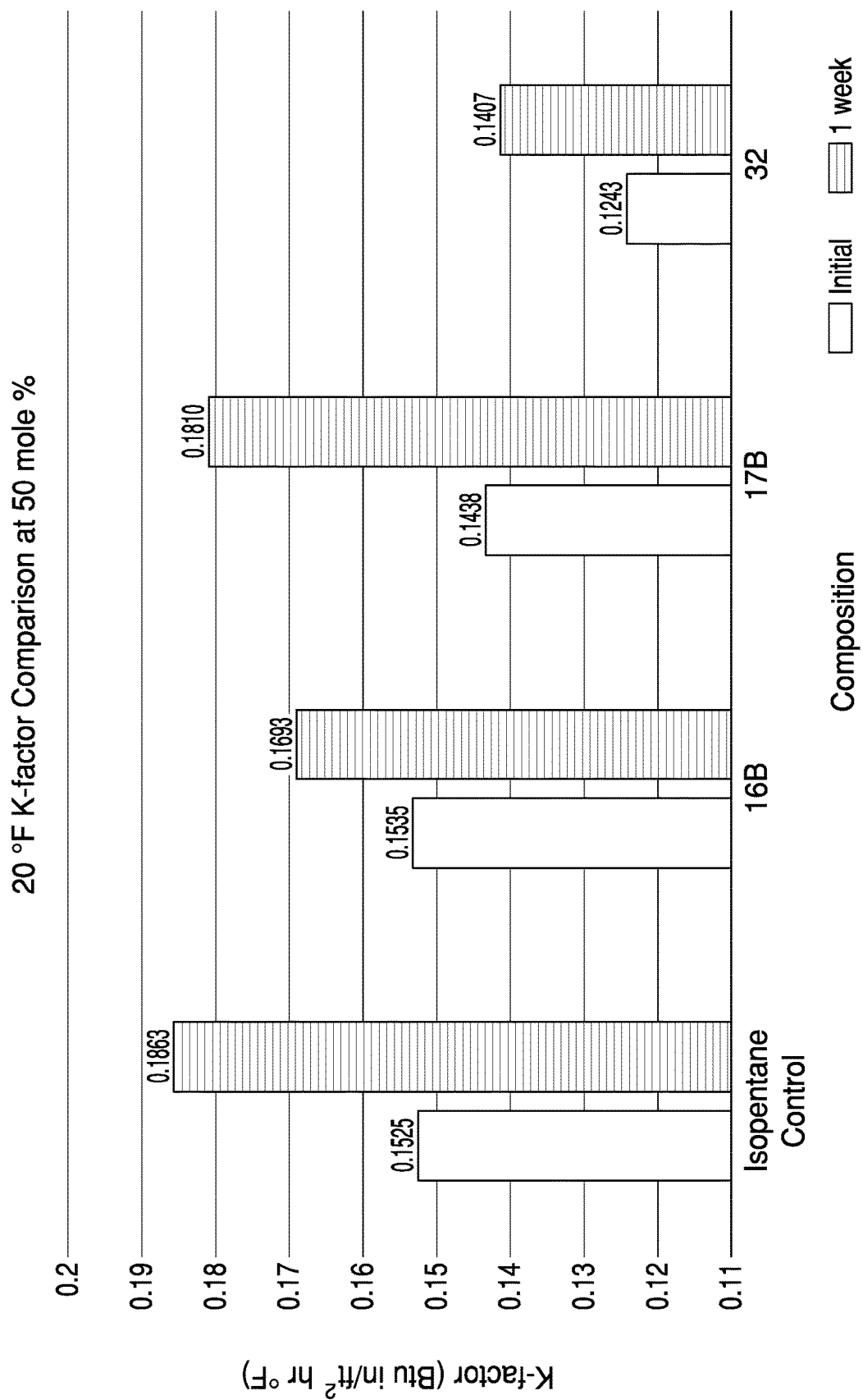
Figure 19C:
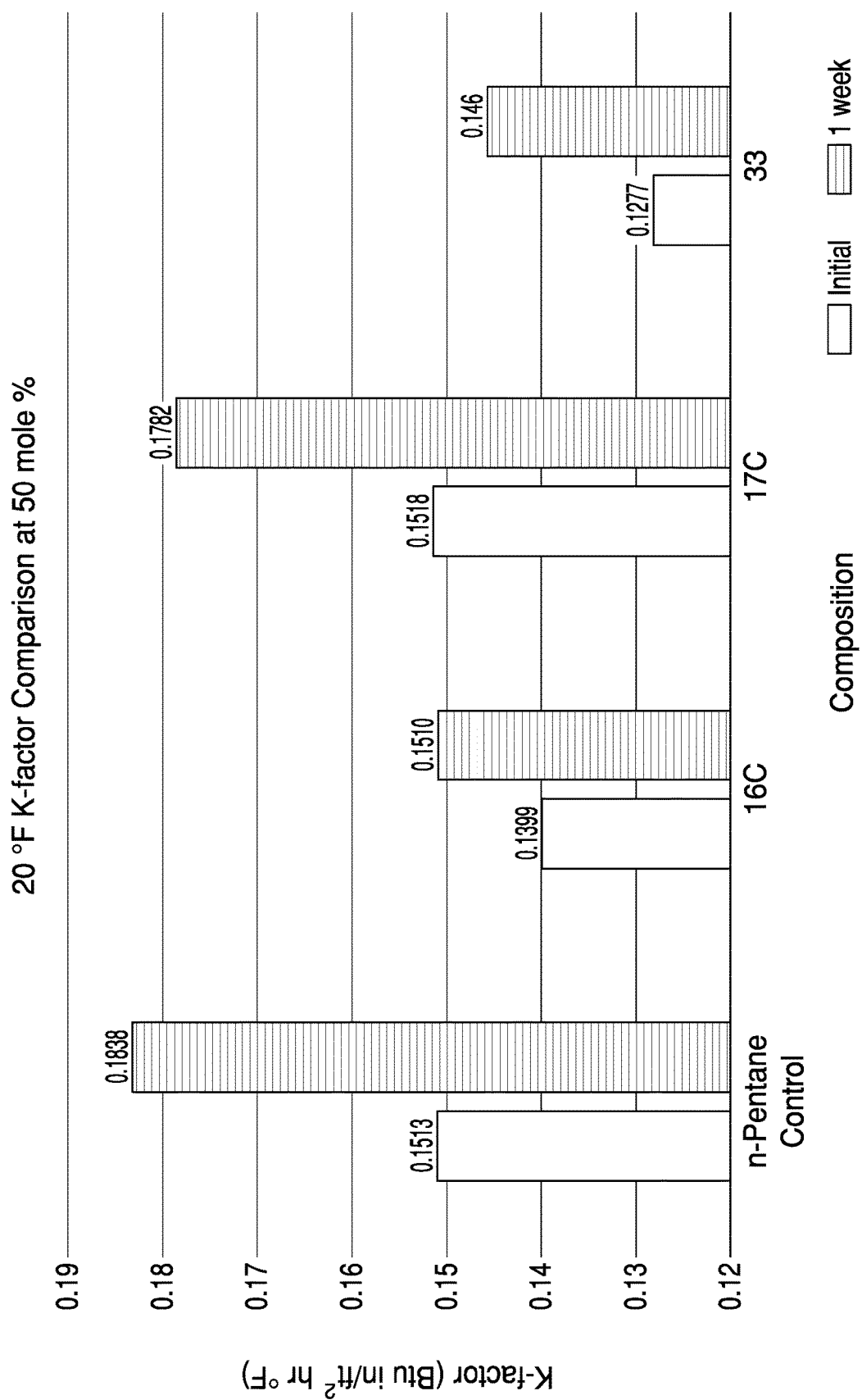
Figure 20A:
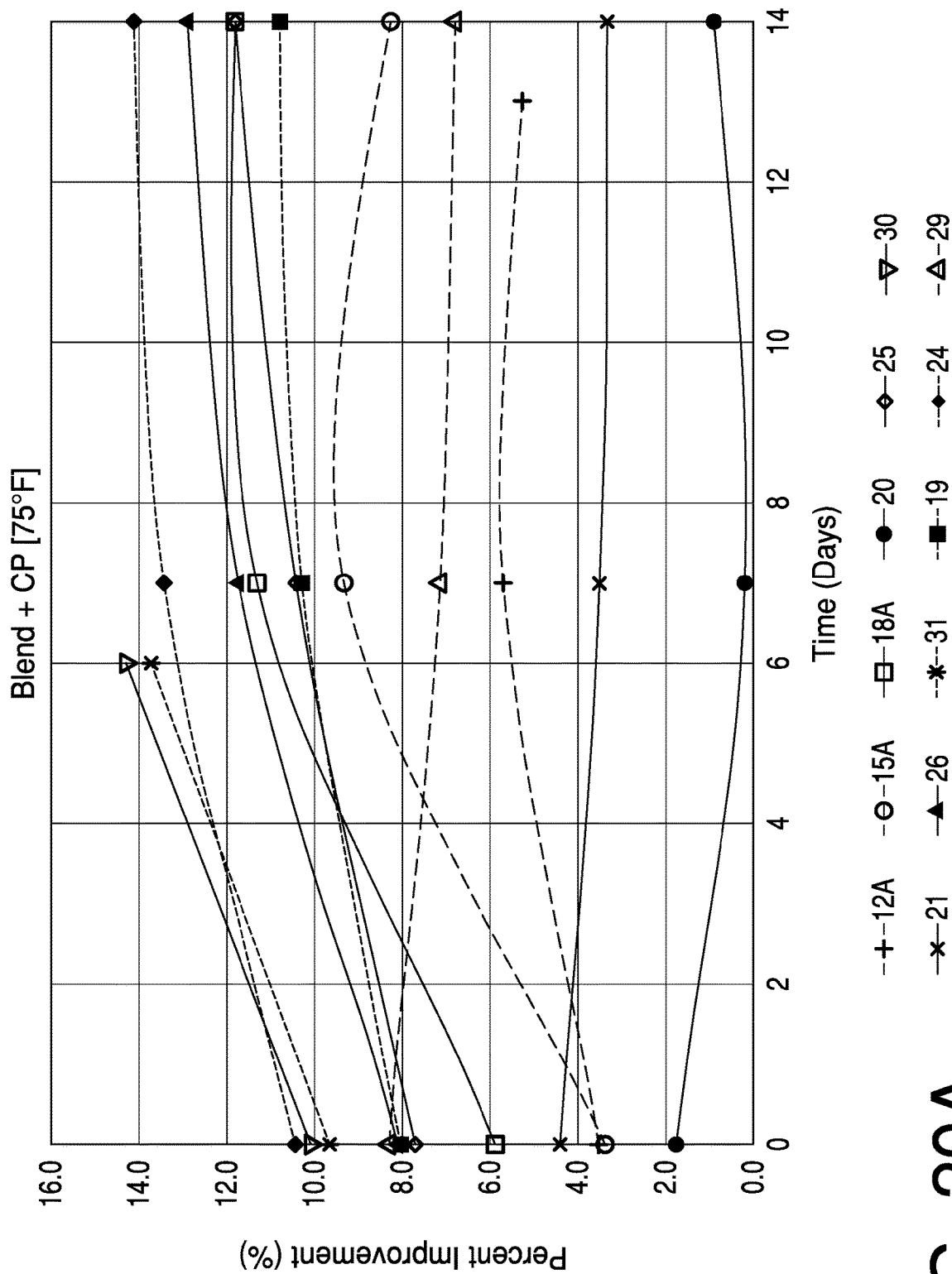
Figure 20B:
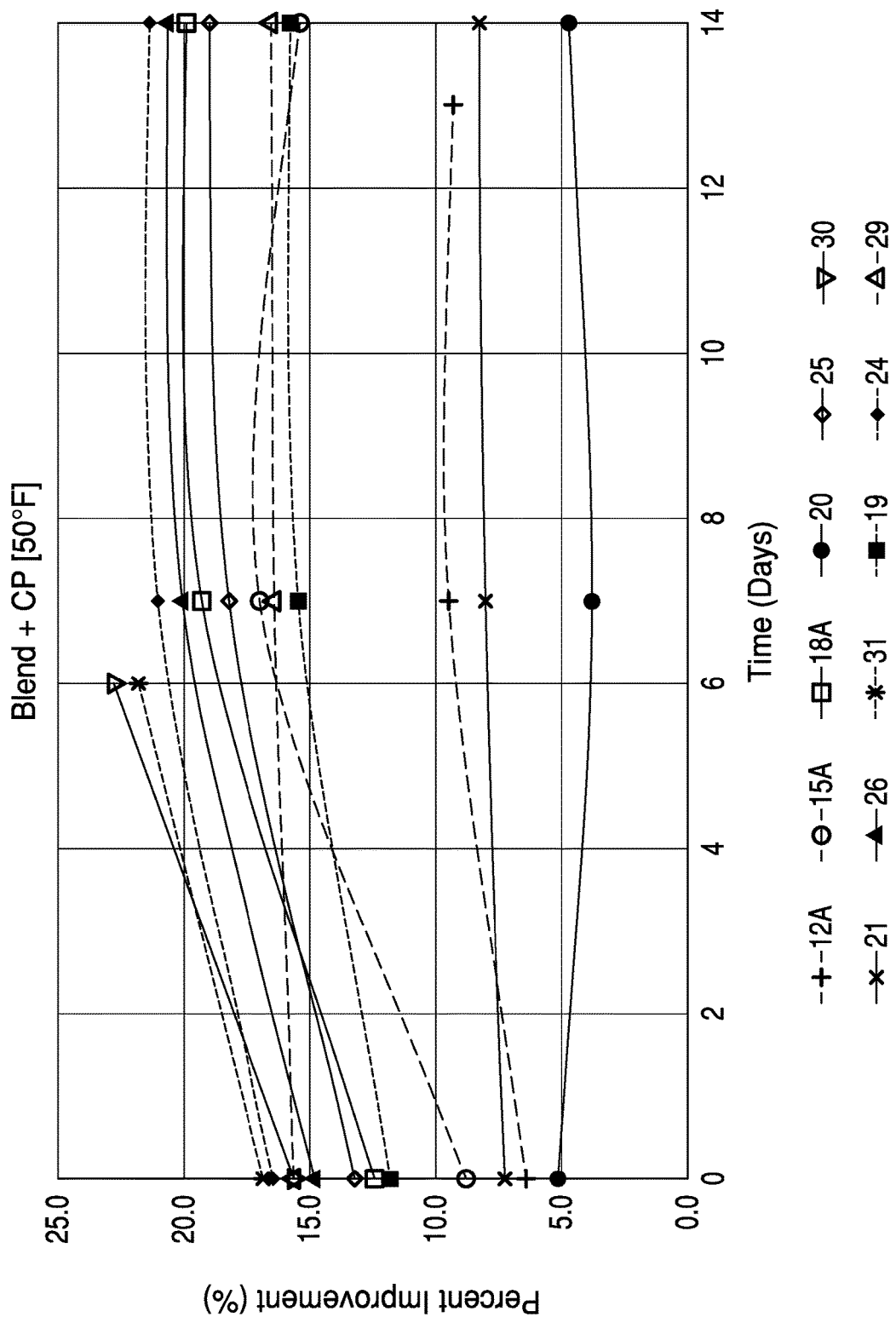

Exemplary foams of Example 3 were further analyzed for thermal conductivity (at 75° F., 50° F., and 20° F.) after aging at 70° C. over a period of 14 days. Results of the aging analysis studies are shown below in Tables 24-26 as % improvement in K-factor relative to a foam prepared by a control mixture, and in FIGS. 11A-20C.

TABLE 24 k-factor % Improvement at 75° F. vs C$_5$ Alkane Control Composition

| Days | 0 | 1 | 2 | 6 | 7 | 8 | 14 |
|---|---|---|---|---|---|---|---|
| Cyclopentane Control K-Factor (Btu in/ft2 hr ° F.) | 0.1415 | | | | 0.1595 | | 0.1665 |
| 10A | 2.1 | | | | 8.9 | | 10.5 |
| 13A | 7.0 | | | | 12.0 | | 12.6 |
| 16A | 9.7 | | | | 14.1 | | 15.0 |
| 11A | 6.5 | | | | 10.2 | | 10.8 |
| 14A | 7.4 | | | | 1.6 | | 2.2 |
| 17A | 7.1 | | | | 10.8 | | 10.8 |
| 19 | 8.0 | | | | 10.3 | | 10.8 |
| 24 | 10.4 | | | | 13.4 | | 14.1 |
| 29 | 8.3 | | | | 7.1 | | 6.8 |
| Isopentane Control K-Factor (Btu in/ft2 hr ° F.) | 0.1525 | | 0.1637 | 0.1743 | | | |
| 10B | 1.6 | | 1.8 | 1.7 | | | |
| 13B | 5.0 | | 8.8 | 11.8 | | | |
| 16B | 2.6 | 0.1498 | 5.6 | | 7.8 | | |
| 11B | 0.9 | | | | | −2.6 | |
| 14B | 6.7 | | | | | 8.7 | |
| 17B | −6.7 | | | | −18.0 | | −15.9 |
| 22 | 1.7 | | | | 0.0 | | 0.5 |
| 27 | 6.6 | | | | 11.4 | | 10.7 |
| 32 | 9.0 | | | | 12.3 | | 11.3 |
| n-Pentane Control K-Factor (Btu in/ft2 hr ° F.) | 0.1497 | | | | 0.1701 | | 0.1751 |
| 10C | 1.5 | | | | 4.0 | | 4.2 |
| 13C | 4.9 | | | | 11.6 | | 12.1 |
| 16C | 5.9 | | | | 12.2 | | 13.0 |
| 11C | −0.5 | | | | −1.1 | | −0.9 |
| 14C | 4.4 | | | | 4.8 | | 4.3 |
| 17C | −13.0 | | | | −18.7 | | −16.9 |
| 23 | 0.9 | | | | −2.2 | | −1.5 |
| 28 | 4.8 | | | | 9.6 | | 9.5 |
| 33 | 6.3 | | | | 8.2 | | 7.9 |

TABLE 25 k-factor % Improvement at 50° F. vs C$_5$ Alkane Control Composition

| Days | 0 | 1 | 2 | 6 | 7 | 8 | 14 |
|---|---|---|---|---|---|---|---|
| Cyclopentane Control K-Factor (Btu in/ft2 hr ° F.) | 0.1407 | | | | 0.1646 | | 0.1730 |
| 10A | 4.0 | | | | 13.4 | | 14.7 |
| 13A | 13.2 | | | | 19.7 | | 19.8 |
| 16A | 14.9 | | | | 21.3 | | 22.0 |
| 11A | 9.1 | | | | 15.3 | | 15.5 |
| 14A | 12.2 | | | | 9.1 | | 10.6 |

TABLE 25-continued k-factor % Improvement at 50° F. vs C$_5$ Alkane Control Composition

| Days | 0 | 1 | 2 | 6 | 7 | 8 | 14 |
|---|---|---|---|---|---|---|---|
| 17A | 14.1 | | | | 20.1 | | 20.6 |
| 19 | 11.8 | | | | 15.5 | | 15.8 |
| 24 | 16.5 | | | | 21.0 | | 21.4 |
| 29 | 15.7 | | | | 16.4 | | 16.6 |
| Isopentane Control K-Factor (Btu in/ft2 hr ° F.) | 0.1449 | | 0.1581 | 0.1691 | | | |
| 10B | 3.5 | | 3.9 | 3.7 | | | |
| 13B | 7.9 | | 12.7 | 15.8 | | | |
| 16B | 3.9 | 0.1 | 8.0 | | 10.9 | | |
| 11B | 2.5 | | | | | −0.6 | |
| 14B | 10.5 | | | | | 11.9 | |
| 17B | −3.8 | | | | −13.6 | | −11.4 |
| 22 | 3.7 | | | | 2.7 | | 3.6 |
| 27 | 10.1 | | | | 15.8 | | 15.2 |
| 32 | 12.7 | | | | 16.6 | | 16.0 |
| n-Pentane Control K-Factor (Btu in/ft2 hr ° F.) | 0.1457 | | | | 0.1693 | | 0.1747 |
| 10C | 2.9 | | | | 6.9 | | 7.0 |
| 13C | 10.0 | | | | 17.4 | | 17.5 |
| 16C | 9.9 | | | | 17.6 | | 18.3 |
| 11C | 0.6 | | | | 0.6 | | 1.2 |
| 14C | 9.1 | | | | 10.4 | | 10.1 |
| 17C | −8.0 | | | | −11.6 | | −9.5 |
| 23 | 3.1 | | | | 0.2 | | 0.9 |
| 28 | 9.3 | | | | 15.4 | | 14.8 |
| 33 | 11.9 | | | | 15.1 | | 14.5 |

TABLE 26 k-factor % Improvement at 20° F. vs C$_5$ Alkane Control Composition

| Days | 0 | 1 | 2 | 6 | 7 | 8 | 14 |
|---|---|---|---|---|---|---|---|
| Cyclopentane Control K-Factor (Btu in/ft2 hr ° F.) | 0.1382 | | | | 0.1701 | | 0.1793 |
| 10A | 5.5 | | | | 16.7 | | 16.6 |
| 13A | 16.3 | | | | 24.3 | | 23.4 |
| 16A | 11.9 | | | | 21.2 | | 20.4 |
| 11A | 13.0 | | | | 18.3 | | 17.6 |
| 14A | 16.9 | | | | 13.2 | | 14.8 |
| 17A | 20.0 | | | | 26.2 | | 26.3 |
| 19 | 13.6 | | | | 18.4 | | 17.7 |
| 24 | 19.9 | | | | 25.7 | | 25.4 |
| 29 | 15.7 | | | | 17.9 | | 18.0 |
| Isopentane Control K-Factor (Btu in/ft2 hr ° F.) | 0.1525 | | 0.1740 | 0.1863 | | | |
| 10B | 7.8 | | 8.9 | 7.4 | | | |
| 13B | 13.0 | | 19.3 | 21.8 | | | |
| 16B | −0.7 | 0.1 | 6.0 | | 9.1 | | |
| 11B | 6.0 | | | | | 5.7 | |
| 14B | 19.2 | | | | | 21.6 | |
| 17B | 5.7 | | | | 2.8 | | 5.2 |
| 22 | 6.4 | | | | 7.2 | | 8.7 |
| 27 | 16.4 | | | | 24.0 | | 22.9 |
| 32 | 18.5 | | | | 24.5 | | 24.2 |
| n-Pentane Control K-Factor (Btu in/ft2 hr ° F.) | 0.1513 | | | | 0.1838 | | 0.1895 |
| 10C | 4.1 | | | | 8.8 | | 8.2 |
| 13C | 14.3 | | | | 22.9 | | 22.5 |
| 16C | 7.5 | | | | 17.8 | | 17.9 |
| 11C | 0.7 | | | | 3.2 | | 4.3 |
| 14C | 14.5 | | | | 17.1 | | 16.9 |
| 17C | −0.3 | | | | 3.0 | | 5.3 |
| 23 | 6.0 | | | | 3.3 | | 4.5 |
| 28 | 14.5 | | | | 21.5 | | 19.9 |
| 33 | 15.6 | | | | 20.6 | | 19.5 |

OTHER EMBODIMENTS

1. In some embodiments, the present application provides a process of forming a foam, comprising reacting or extruding a foamable composition comprising i) about 3.0 to about 15.0 weight percent of a compound selected from E-$CF_3$CH=CHCF$_3$ (HFO-1336mzz-E), Z—$CF_3$CH=CHCF$_3$ (HFO-1336mzz-Z), and E-CHCl=CHCF$_3$ (HCFO-1233zd-E), or any mixture thereof, and ii) about 6.5 to about 14.0 weight percent $C_5$ hydrocarbon, under conditions effective to form a foam.
2. In some embodiments, the present application provides a process of forming a foam, comprising reacting or extruding a foamable composition comprising:
   i) about 3.0 to about 15.0 weight percent of a mixture of (a) E-$CF_3$CH=CHCF$_3$ (HFO-1336mzz-E) or Z—$CF_3$CH=CHCF$_3$ (HFO-1336mzz-Z); and (b) E-CHCl=CHCF$_3$ (HCFO-1233zd-E); and
   ii) about 6.5 to about 14.0 weight percent $C_5$ hydrocarbon;
under conditions effective to form a foam.
3. In some embodiments, the present application provides a process of forming a foam, comprising reacting or extruding a foamable composition comprising i) about 0.3 to about 16.5 weight percent E-$CF_3$CH=CHCF$_3$; and ii) about 6.5 to about 15.5 weight percent cyclopentane, under conditions effective to form a foam.
4. The process of any one of embodiments 1 to 3, wherein the foam has a K-factor of about 0.120 Btu in/ft$^2$·h·° F. or less at 20° F.
5. The process of any one of embodiments 1 to 3, wherein the foam has a K-factor of from about 0.120 Btu in/ft$^2$·h·° F. to about 0.110 Btu in/ft$^2$·h·° F. at 20° F.
6. The process of any one of embodiments 1 to 5, wherein the foamable composition comprises about 3.5 to about 16.5 weight percent E-$CF_3$CH=CHCF$_3$.
7. The process of any one of embodiments 1 to 5, wherein the foamable composition comprises about 6.9 to about 13.5 weight percent cyclopentane.
8. The process of any one of embodiments 1 to 5, wherein the foamable composition comprises about 3.5 to about 16.5 weight percent E-$CF_3$CH=CHCF$_3$ and about 6.9 to about 13.5 weight percent cyclopentane.
9. The process of any one of embodiments 1 to 3, wherein the foam has a K-factor of about 0.137 Btu in/ft$^2$·h·° F. or less at 75° F.
10. The process of any one of embodiments 1 to 3, wherein the foam has a K-factor of from about 0.137 Btu in/ft$^2$·h·° F. to about 0.131 Btu in/ft$^2$·h·° F. at 75° F.
11. The process of any one of embodiments 1 to 3, 9, and 10, wherein the foamable composition comprises about 0.3 to about 10.1 weight percent E-$CF_3$CH=CHCF$_3$.
12. The process of any one of embodiments 1 to 3, 9, and 10, wherein the foamable composition comprises about 10.1 to about 13.5 weight percent cyclopentane.
13. The process of any one of embodiments 1 to 3, 9, and 10, wherein the foamable composition comprises about 0.3 to about 10.1 weight percent E-$CF_3$CH=CHCF$_3$ and about 10.1 to about 13.5 weight percent cyclopentane.
14. The process of any one of embodiments 1 to 13, wherein the foam has a cream time of about 20 to about 30 seconds.
15. The process of any one of embodiments 1 to 14, wherein the foam has a gel time of from about 30 seconds to about 40 seconds.
16. The process of any one of embodiments 1 to 15, wherein the foam has a rise time of from about 70 seconds to about 80 seconds.
17. The process of any one of embodiments 1 to 16, wherein the foam has a tack time of from about 70 seconds to about 80 seconds.
18. The process of any one of embodiments 1 to 17, wherein the foamable composition further comprises one or more additional components selected from at least one polyol, at least one catalyst, at least one surfactant, water, at least one flame retardant agent, and at least one nucleating agent.
19. The process of any one of embodiments 1 to 18, wherein the foamable composition further comprises at least one polyol.
20. The process of embodiment 18 or 19, wherein the polyol is a polyester polyol.
21. The process of any one of embodiments 18 to 20, wherein the polyol is a polyester polyol having a hydroxyl number of from about 200 mg KOH/g to about 300 mg KOH/g.
22. The process of any one of embodiments 18 to 20, wherein the polyol is a polyester polyol having a hydroxyl number of from about 230 mg KOH/g to about 250 mg KOH/g.
23. The process of any one of embodiments 1 to 22, wherein the foamable composition further comprises at least one catalyst.
24. The process of any one of embodiments 1 to 22, wherein the foamable composition comprises a metal catalyst and an amine catalyst.
25. The process of any one of embodiments 1 to 24, wherein the foamable composition further comprises a surfactant.
26. The process of any one of embodiments 18 to 25, wherein the surfactant is a silicone surfactant.
27. The process of any one of embodiments 1 to 26, wherein the foamable composition further comprises water.
28. The process of any one of embodiments 1 to 27, wherein the foamable composition comprises a flame retardant agent.
29. The process of any one of embodiments 18 to 27, wherein the flame retardant agent is tris(chloropropyl) phosphate.
30. The process of any one of embodiments 1 to 29, wherein the foamable composition comprises a nucleating agent.
31. The process of any one of embodiments 1 to 29, wherein the process is performed in the absence of a nucleating agent.
32. The process of any one of embodiments 1 to 31, wherein the foam is a spray foam.
33. The process of any one of embodiments 1 to 31, wherein the foam is a thermoset foam.
34. The process of any one of embodiments 1 to 33, wherein the foam is a polyurethane foam or a polyisocyanurate foam.
35. The process of any one of embodiments 1 to 34, wherein the foam is a closed cell foam.
36. The process of any one of embodiments 1 to 3, wherein the foamable composition comprises:
    about 0.3 to about 0.4 weight percent E-$CF_3$CH=CHCF$_3$ and about 15.1 to about 15.2 weight percent cyclopentane; or about 3.5 to about 3.6 weight percent E-CF$_3$CH=CHCF$_3$ and about 13.5 to about 13.6 weight percent cyclopentane; or about 10.1 to about 10.2 weight percent E-CF$_3$CH=CHCF$_3$ and about 10.1 to about 10.2 weight percent cyclopentane; or about 16.2 to about 16.3 weight percent E-CF$_3$CH=CHCF$_3$ and about 6.9 to about 7.0 weight percent cyclopentane.

37. The process of any one of embodiments 1 to 3, wherein the foamable composition comprises about 0.3 to about 16.5 weight percent E-CF$_3$CH=CHCF$_3$, about 6.9 to about 13.5 weight percent cyclopentane, at least one polyol, at least one catalyst, at least one surfactant, water, at least one flame retardant agent, and at least one nucleating agent.

38. The process of any one of embodiments 1 to 3, wherein the foamable composition comprises about 3.5 to about 16.5 weight percent E-CF$_3$CH=CHCF$_3$, about 6.9 to about 13.5 weight percent cyclopentane, at least one polyol, at least one catalyst, at least one surfactant, water, at least one flame retardant agent, and at least one nucleating agent.

39. The process of embodiment 37 or 38, wherein the foamable composition comprises about:

about 0.3 to about 0.4 weight percent E-CF$_3$CH=CHCF$_3$ and about 15.1 to about 15.2 weight percent cyclopentane; or about 3.5 to about 3.6 weight percent E-CF$_3$CH=CHCF$_3$ and about 13.5 to about 13.6 weight percent cyclopentane; or about 10.1 to about 10.2 weight percent E-CF$_3$CH=CHCF$_3$ and about 10.1 to about 10.2 weight percent cyclopentane; or about 16.2 to about 16.3 weight percent E-CF$_3$CH=CHCF$_3$ and about 6.9 to about 7.0 weight percent cyclopentane.

40. A foam prepared according to the process of any one of embodiments 1 to 39.

41. A closed cell polyisocyanurate foam prepared according to the process of any one of embodiments 1 to 39.

42. A closed cell polyurethane foam prepared according to the process of any one of embodiments 1 to 39.

It is to be understood that while the invention has been described in conjunction with the detailed description thereof, the foregoing description is intended to illustrate and not limit the scope of the invention, which is defined by the scope of the appended claims. Other aspects, advantages, and modifications are within the scope of the following claims. It should be appreciated by those persons having ordinary skill in the art(s) to which the present invention relates that any of the features described herein in respect of any particular aspect and/or embodiment of the present invention can be combined with one or more of any of the other features of any other aspects and/or embodiments of the present invention described herein, with modifications as appropriate to ensure compatibility of the combinations. Such combinations are considered to be part of the present invention contemplated by this disclosure.

What is claimed is:

1. A process of forming a foam, comprising reacting or extruding a foamable composition comprising about 3.0 to about 4.0 weight percent of a mixture of E-CHCl=CHCF$_3$ and E-CF$_3$CH=CHCF$_3$ and about 13.0 to about 14.0 weight percent cyclopentane; or about 10 to about 11 weight percent of a mixture of E-CHCl=CHCF$_3$ and E-CF$_3$CH=CHCF$_3$ and about 9.0 to about 10.0 weight percent cyclopentane; or about 14.0 to about 15.0 weight percent of a mixture of E-CHCl=CHCF$_3$ and E-CF$_3$CH=CHCF$_3$ and about 7.0 to about 8.0 weight percent cyclopentane;

under conditions effective to form a foam, and wherein the foamable composition further comprises one or more additional components selected from at least one polyol, at least one catalyst, at least one surfactant, water, at least one flame retardant agent, and at least one nucleating agent.

2. The process of claim 1, wherein the foam has a cream time of about 20 to about 30 seconds.

3. The process of claim 1, wherein the foam has a gel time of from about 30 seconds to about 40 seconds.

4. The process of claim 1, wherein the foam has a rise time of from about 70 seconds to about 80 seconds.

5. The process of claim 1, wherein the foam has a tack time of from about 70 seconds to about 80 seconds.

6. The process of claim 1, wherein the foamable composition comprises at least one polyol.

7. The process of claim 6, wherein the at least one polyol is a polyester polyol.

8. The process of claim 7, wherein the at least one polyol is a polyester polyol having a hydroxyl number of from about 200 mg KOH/g to about 300 mg KOH/g.

9. The process of claim 1, wherein the foamable composition comprises at least one catalyst.

10. The process of claim 9, wherein the foamable composition comprises a metal catalyst and an amine catalyst.

11. The process of claim 1, wherein the foamable composition comprises a surfactant.

12. The process of claim 11, wherein the surfactant is a silicone surfactant.

13. The process of claim 1, wherein the foamable composition comprises water.

14. The process of claim 1, wherein the foamable composition comprises a flame retardant agent.

15. The process of claim 14, wherein the flame retardant agent is tris(chloropropyl)phosphate.

16. The process of claim 1, wherein the foamable composition comprises a nucleating agent.

17. The process of claim 1, wherein the process is performed in the absence of a nucleating agent.

18. The process of claim 1, wherein the foamable composition comprises at least one polyol, at least one catalyst, at least one surfactant, water, at least one flame retardant agent, and at least one nucleating agent.

19. A foam prepared according to the process of claim 1.

* * * * *